United States Patent
Maeda et al.

(10) Patent No.: US 10,230,993 B2
(45) Date of Patent: Mar. 12, 2019

(54) IMAGE DECODING DEVICE AND METHOD OF CHROMINANCE CORRECTION WITH LINEAR-INTERPOLATION

(71) Applicant: CANON KABUSHIKI KAISHA, Tokyo (JP)

(72) Inventors: Mitsuru Maeda, Tokyo (JP); Masato Shima, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 129 days.

(21) Appl. No.: 14/758,187

(22) PCT Filed: Dec. 25, 2013

(86) PCT No.: PCT/JP2013/007563
§ 371 (c)(1),
(2) Date: Jun. 26, 2015

(87) PCT Pub. No.: WO2014/103292
PCT Pub. Date: Jul. 3, 2014

(65) Prior Publication Data
US 2015/0334424 A1 Nov. 19, 2015

(30) Foreign Application Priority Data

Dec. 28, 2012 (JP) ................................ 2012-287786
Oct. 11, 2013 (JP) ................................ 2013-213990

(51) Int. Cl.
*H04N 7/12* (2006.01)
*H04N 19/895* (2014.01)
(Continued)

(52) U.S. Cl.
CPC ......... *H04N 19/895* (2014.11); *H04N 19/103* (2014.11); *H04N 19/107* (2014.11);
(Continued)

(58) Field of Classification Search
CPC .......................... H04N 19/103; H04N 19/895
(Continued)

(56) References Cited

U.S. PATENT DOCUMENTS

| 2007/0182848 A1* | 8/2007 | Wyman | H04N 7/012 |
| | | | 348/450 |
| 2012/0140821 A1* | 6/2012 | Drugeon | H04N 19/105 |
| | | | 375/240.12 |

FOREIGN PATENT DOCUMENTS

| WO | 2010/001999 A1 | 1/2010 |
| WO | 2011-142801 A1 | 11/2011 |
| WO | 2012/096150 A1 | 7/2012 |

OTHER PUBLICATIONS

Maani et al., "Improvement of Adaptive Intra Smoothing by switching interpolation filters", Joint Collaborative Team on Video Coding (JCT-VC) of ITU-T SG16 WP3 and ISO/IEC JTC1/SC29/WG11 4th Meeting: Daegu, KR, Jan. 20-28, 2011, pp. 1-3, Document:JCTVC-D391 r1.

(Continued)

*Primary Examiner* — Richard T Torrente
(74) *Attorney, Agent, or Firm* — Canon U.S.A., Inc. I.P. Division

(57) ABSTRACT

A linear interpolation filter used for intra-prediction is applied to not only a luminance signal, but also a chrominance signal. A noise like contouring, which may occur in the chrominance signal, is reduced by performing control independently on the chrominance signal. Also, only a square block has been supported in related art. However, a rectangular block is also supported. Accordingly, 4:2:2 can be applied.

7 Claims, 52 Drawing Sheets

(51) Int. Cl.
*H04N 19/176* (2014.01)
*H04N 19/44* (2014.01)
*H04N 19/50* (2014.01)
*H04N 19/124* (2014.01)
*H04N 19/91* (2014.01)
*H04N 19/107* (2014.01)
*H04N 19/103* (2014.01)
*H04N 19/186* (2014.01)
*H04N 19/162* (2014.01)
*H04N 19/59* (2014.01)

(52) U.S. Cl.
CPC ......... *H04N 19/124* (2014.11); *H04N 19/162* (2014.11); *H04N 19/176* (2014.11); *H04N 19/186* (2014.11); *H04N 19/44* (2014.11); *H04N 19/50* (2014.11); *H04N 19/59* (2014.11); *H04N 19/91* (2014.11)

(58) Field of Classification Search
USPC .................................................... 375/240.02
See application file for complete search history.

(56) References Cited

OTHER PUBLICATIONS

Zhu, Hongbo, "Sum-128 Luma/Chroma Interpolation Filter", Joint Collaborative Team on Video Coding (JCT-VC) of ITU-T SG 16 WP 3 and ISO/IEC JTC1/SC29/WG11, 9th Meeting: Geneva, CH, Apr. 27-May 7, 2012, pp. 1-3, Document: JCTVC-I0550.

Bross, et al., "High Efficiency Video Coding (HEVC) text specification draft 9", Joint Collaborative Team on Video Coding (JCT-VC) of ITU-T SG16 WP3 and ISO/IEC JTC1/SC29/WG11, 11th Meeting, JCTVC-K1003_v13, Oct. 2012.

Silcock, et al., "Extension of HM7 to Support Additional Chroma Formats", Joint Collaborative Team on Video Coding (JCT-VC) of ITU-T SG16 WP3 and ISO/IEC JTC1/SC29/WG11, 10th Meeting, JCTVC-J0191, Jul. 2012.

Benjamin Bross, et al.,"High Efficiency Video Coding (HEVC) text specification draft 9", Joint Collaborative Team on Video Coding (JCT-VC) of ITU-T SG16 WP3 and ISO/IEC JTC1/SC29/WG11, 11th Meeting: Shanghai, CN, Oct. 10-19, 2012 (this is a refiling of the reference that the Examiner didn't consider on May 2, 2017 because of missing sates).

Tk Tan, et al.,"Contouring artefact and solution", Joint Collaborative Team on Video Coding (JCT-VC) of ITU-T SG 16 WP 3 and ISO/IEC JTC 1/SC 29/WG 11, 11th Meeting: Shanghai, CN, Oct. 10-19, 2012 (this is a refiling of the reference that the Examiner didn't consider on May 2, 2017 because of missing dates).

\* cited by examiner

[Fig. 1]
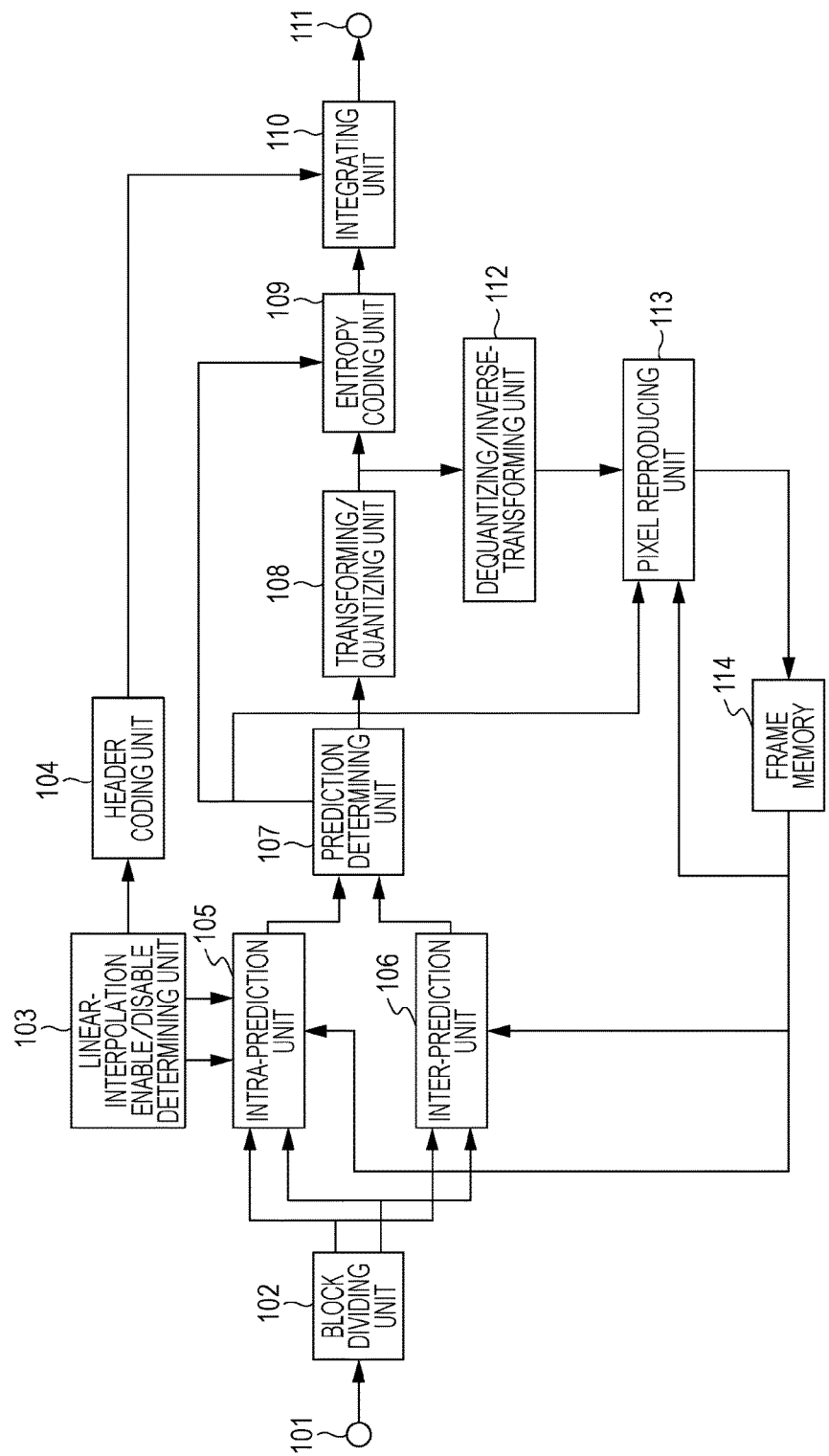

[Fig. 2]

| seq_parameter_set_rbsp( ) { | Descriptor |
|---|---|
|    video_parameter_set_id | u(4) |
|    sps_max_sub_layers_minus1 | u(3) |
|    sps_temporal_id_nesting_flag | u(1) |
|    sps_reserved_zero_bit | u(1) |
|    profile_tier_level( 1, sps_max_sub_layers_minus1 ) | |
|    seq_parameter_set_id | ue(v) |
|    chroma_format_idc | ue(v) |
|    if( chroma_format_idc = = 3 ) | |
|       separate_colour_plane_flag | u(1) |
|    ... | |
|    strong_intra_smoothing_enable_flag | u(1) |
|    strong_intra_smoothing_chroma_enable_flag | u(1) |
|    ... | |
| } | |

[Fig. 3]
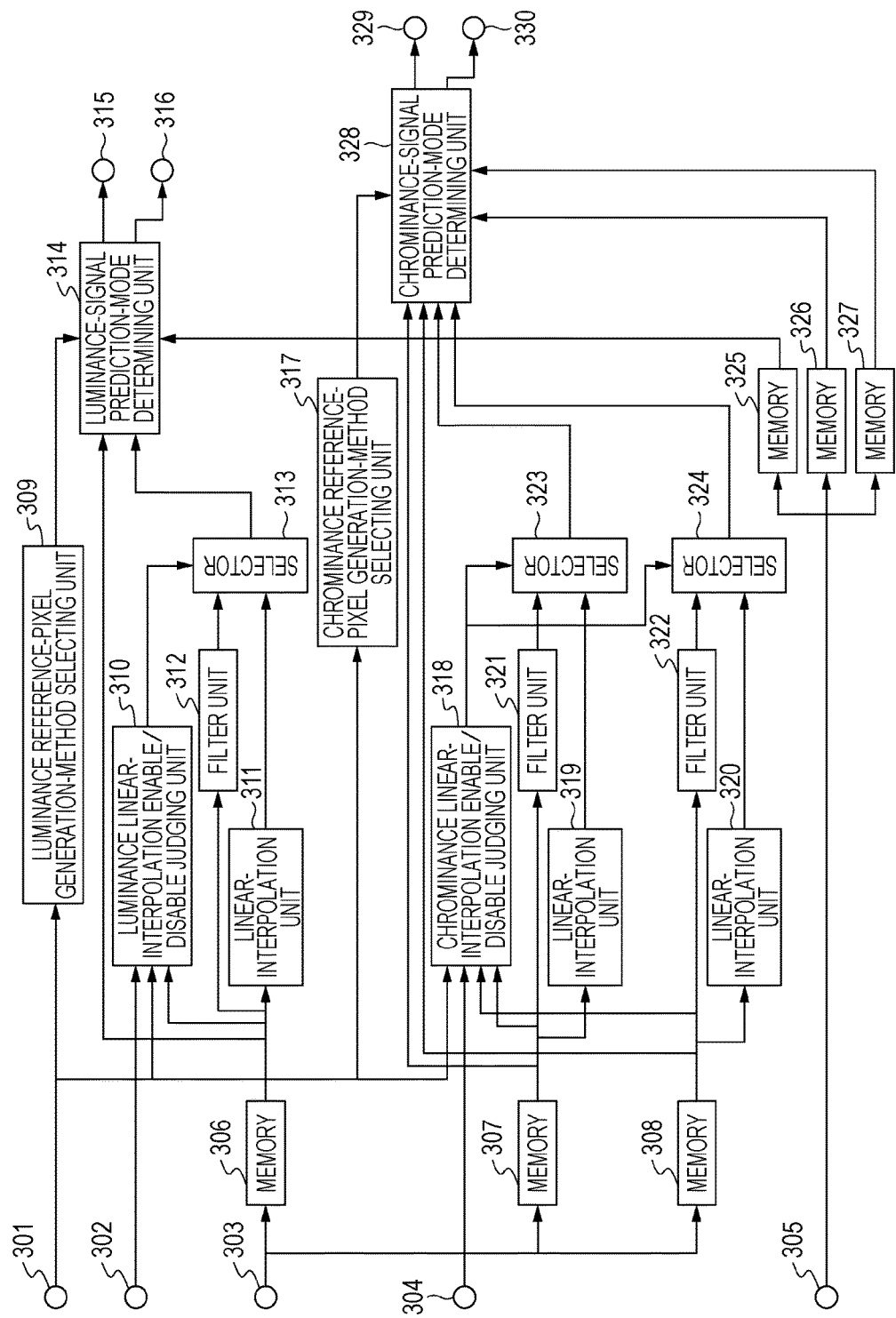

[Fig. 4A]
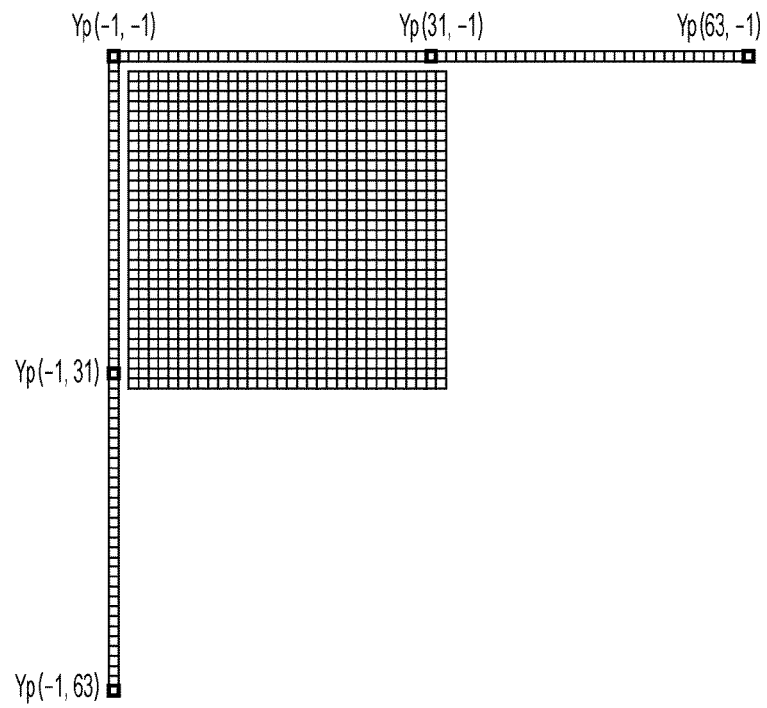
[Fig. 4B]
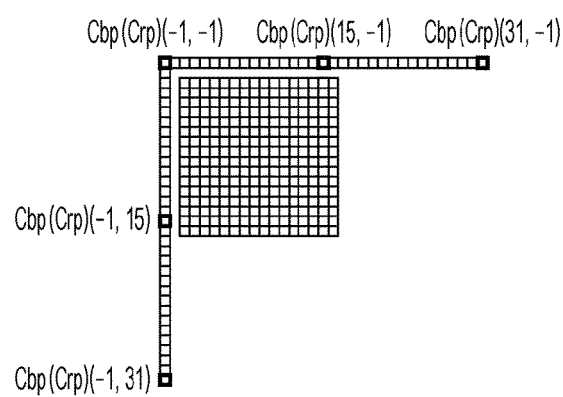

[Fig. 5]
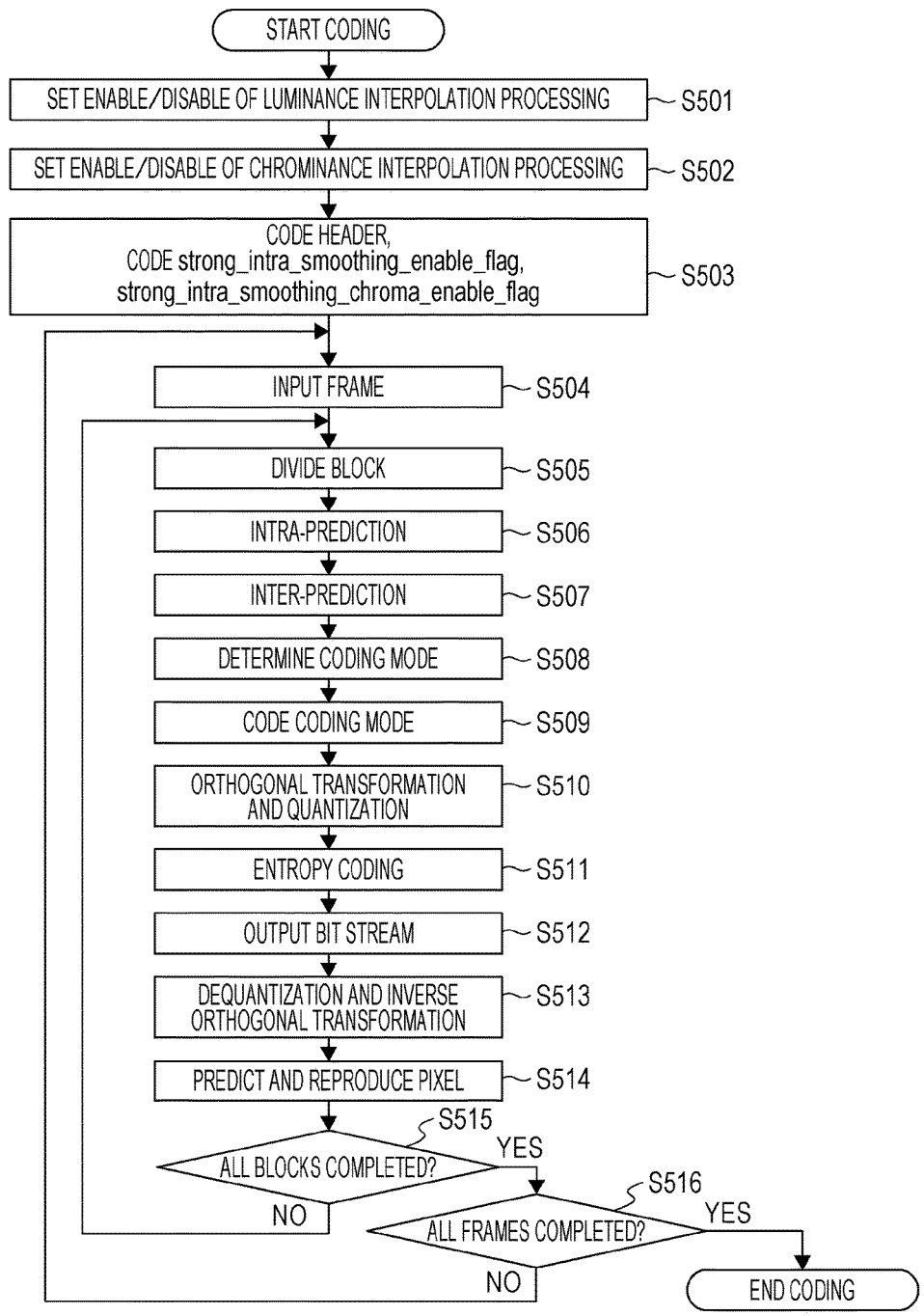

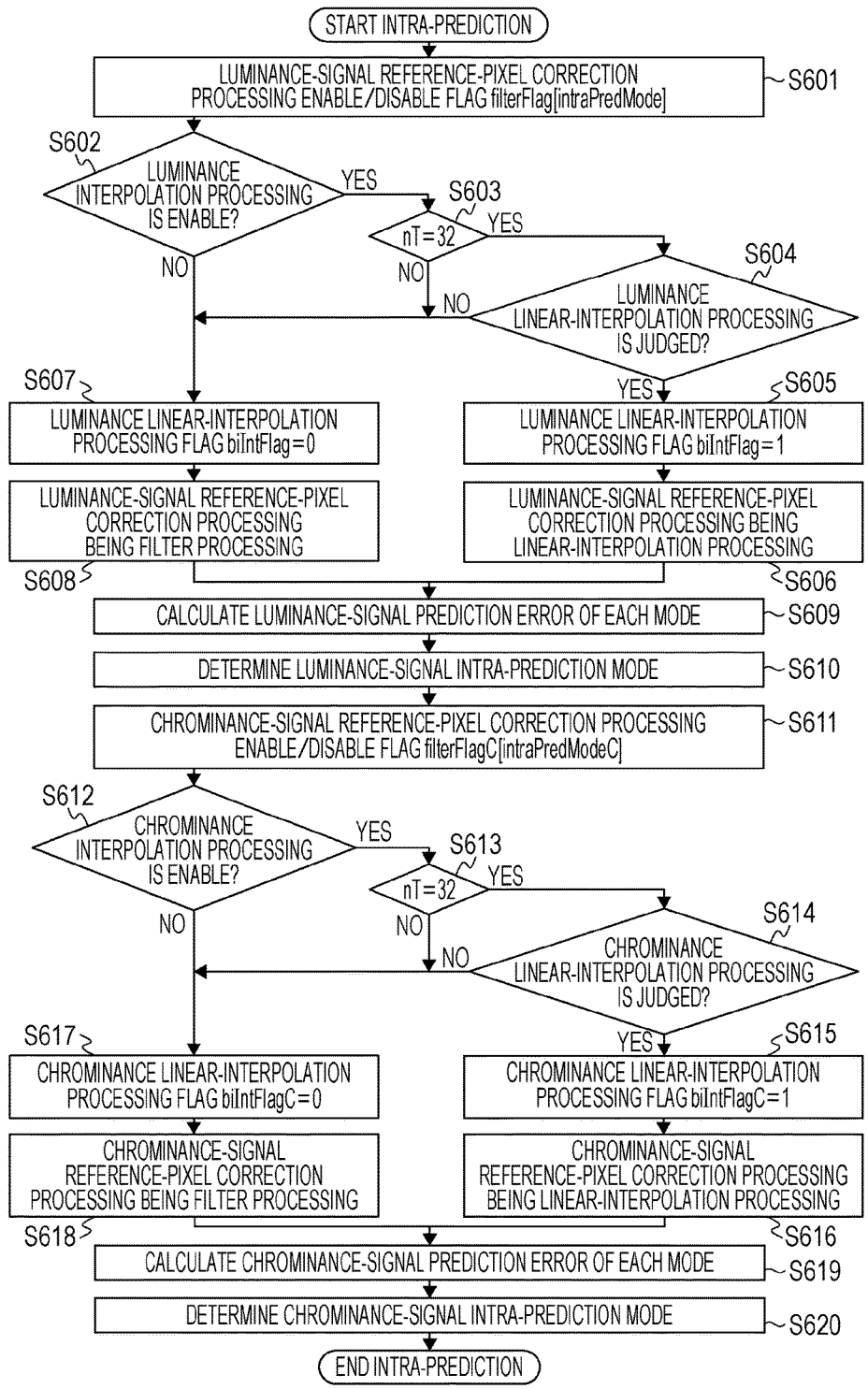

[Fig. 7]
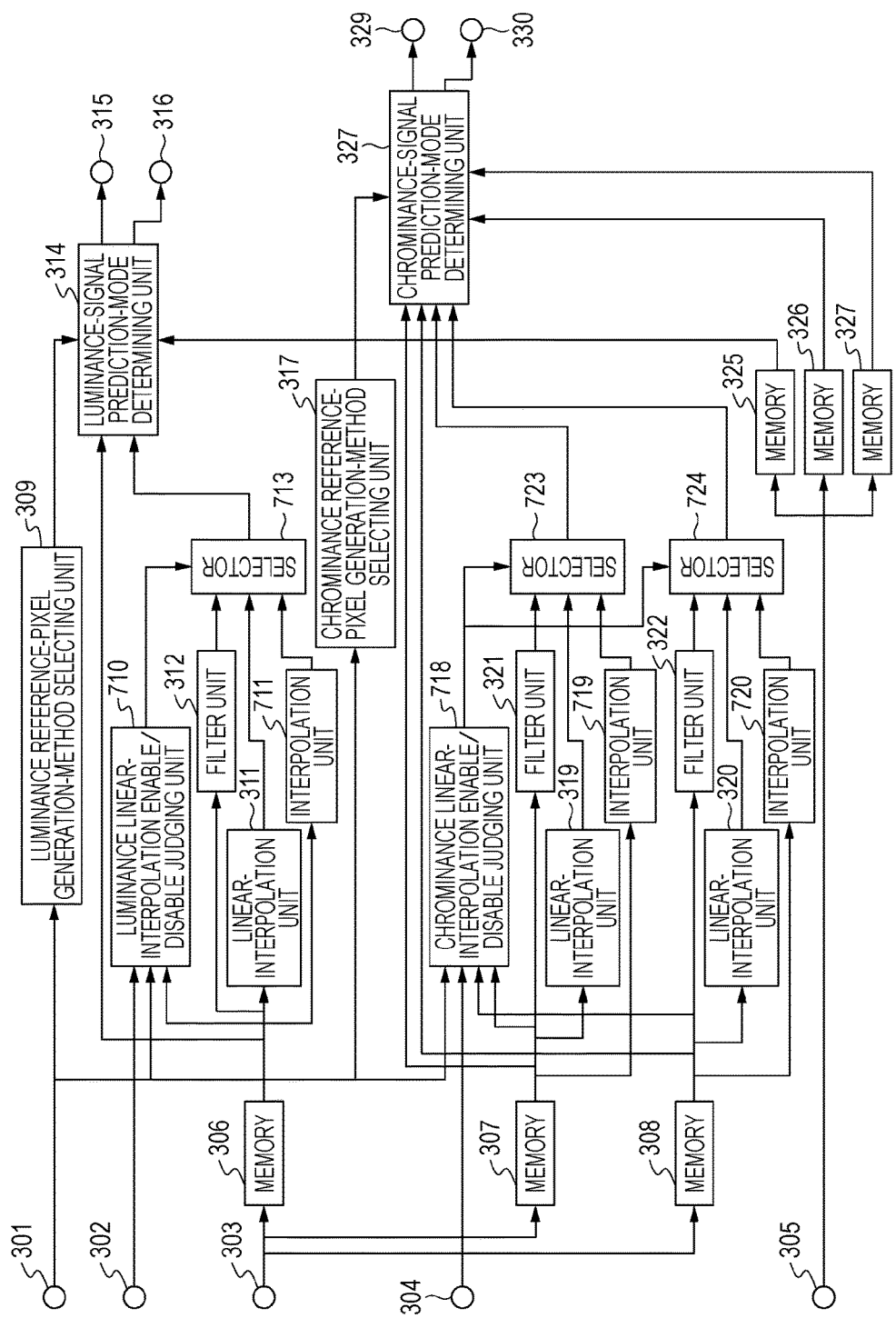

[Fig. 8]
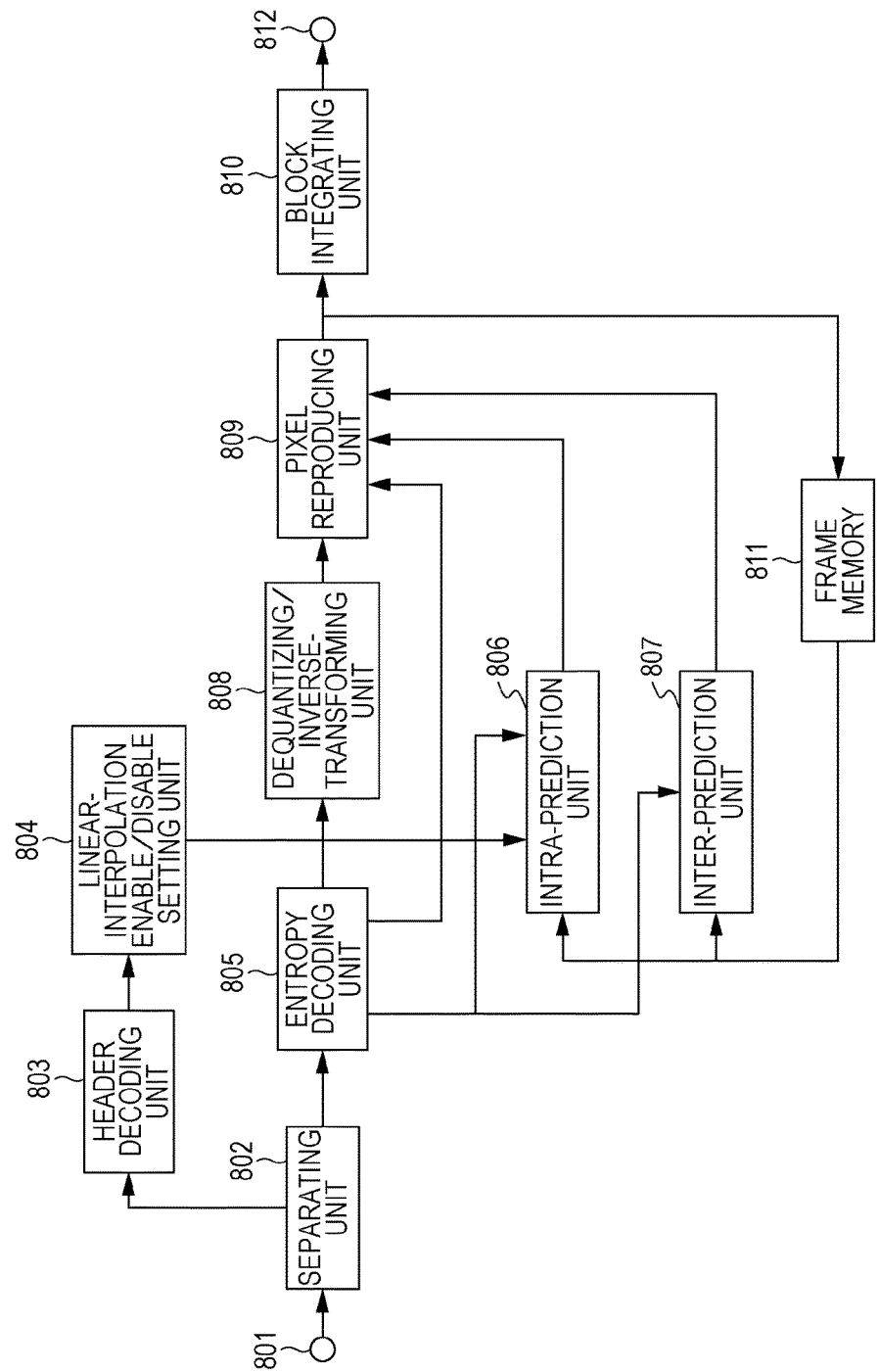

[Fig. 9]
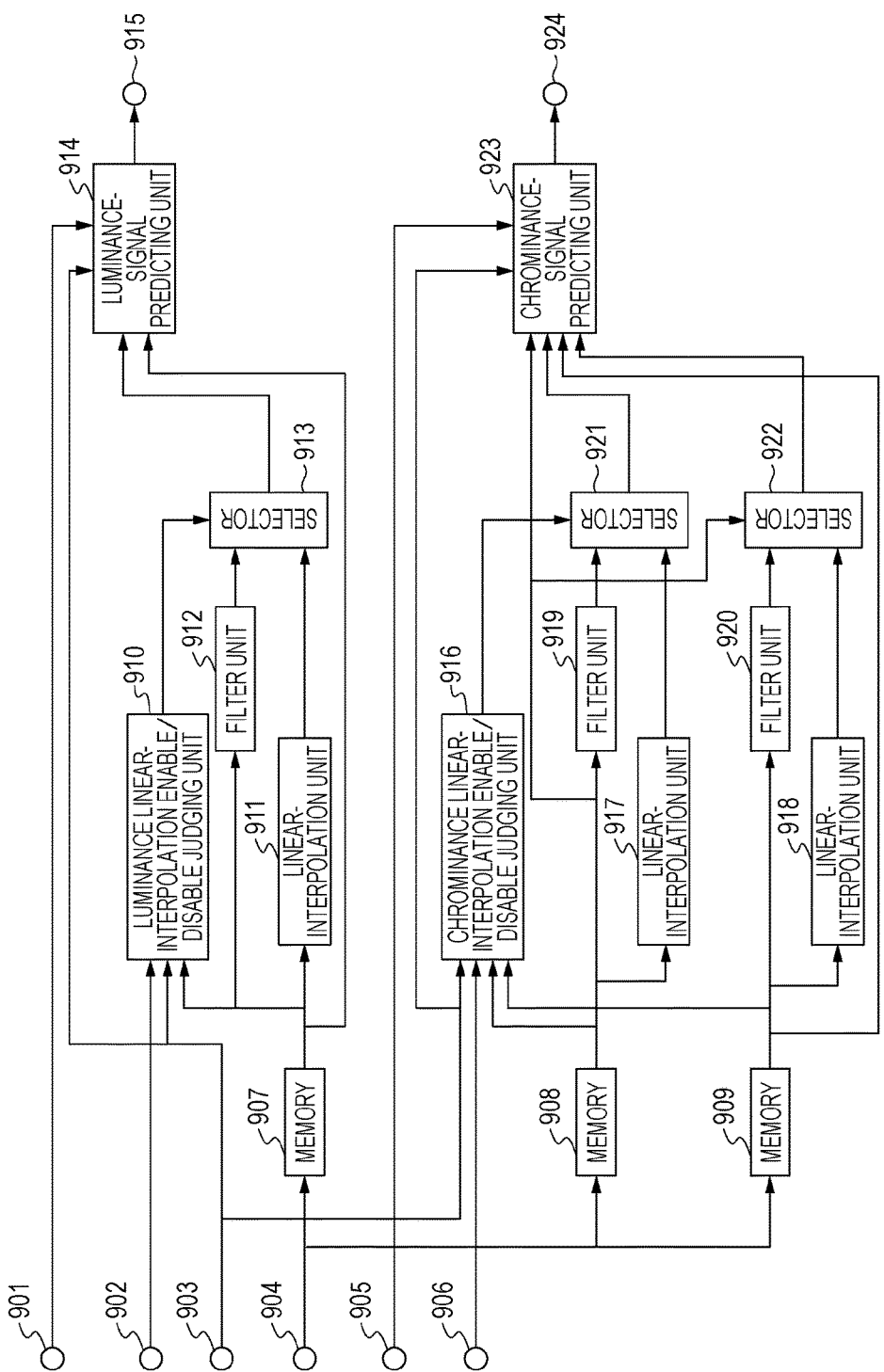

[Fig. 10]
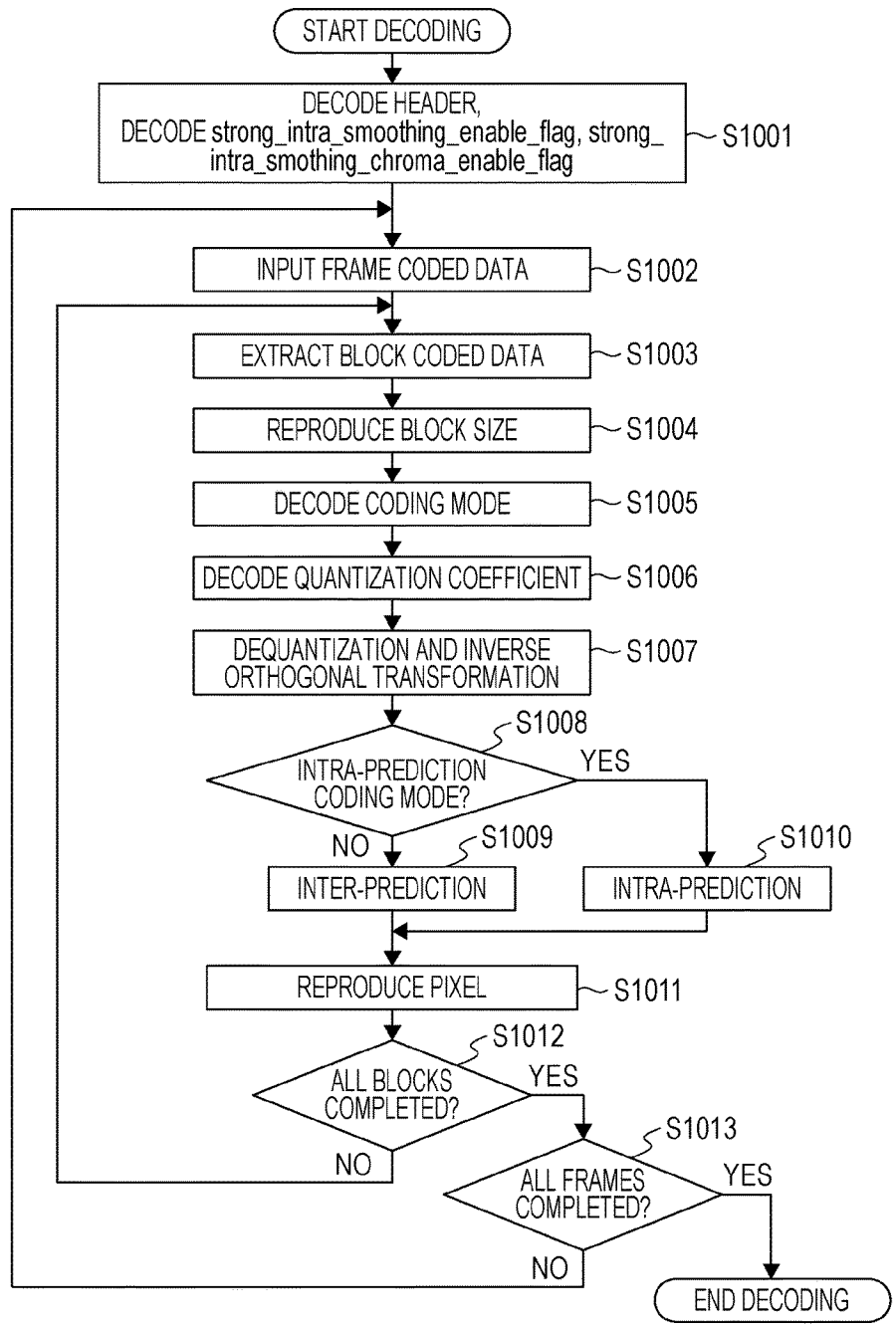

[Fig. 11A]
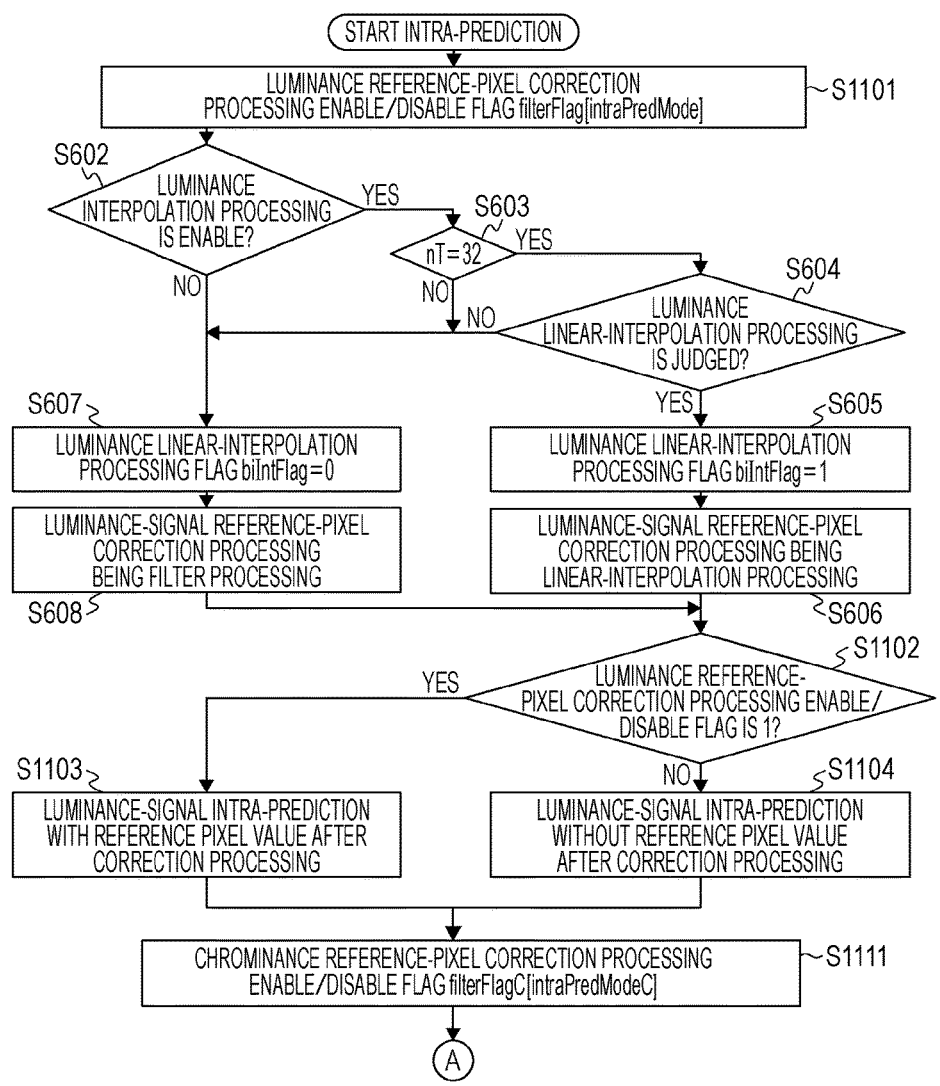

[Fig. 11B]
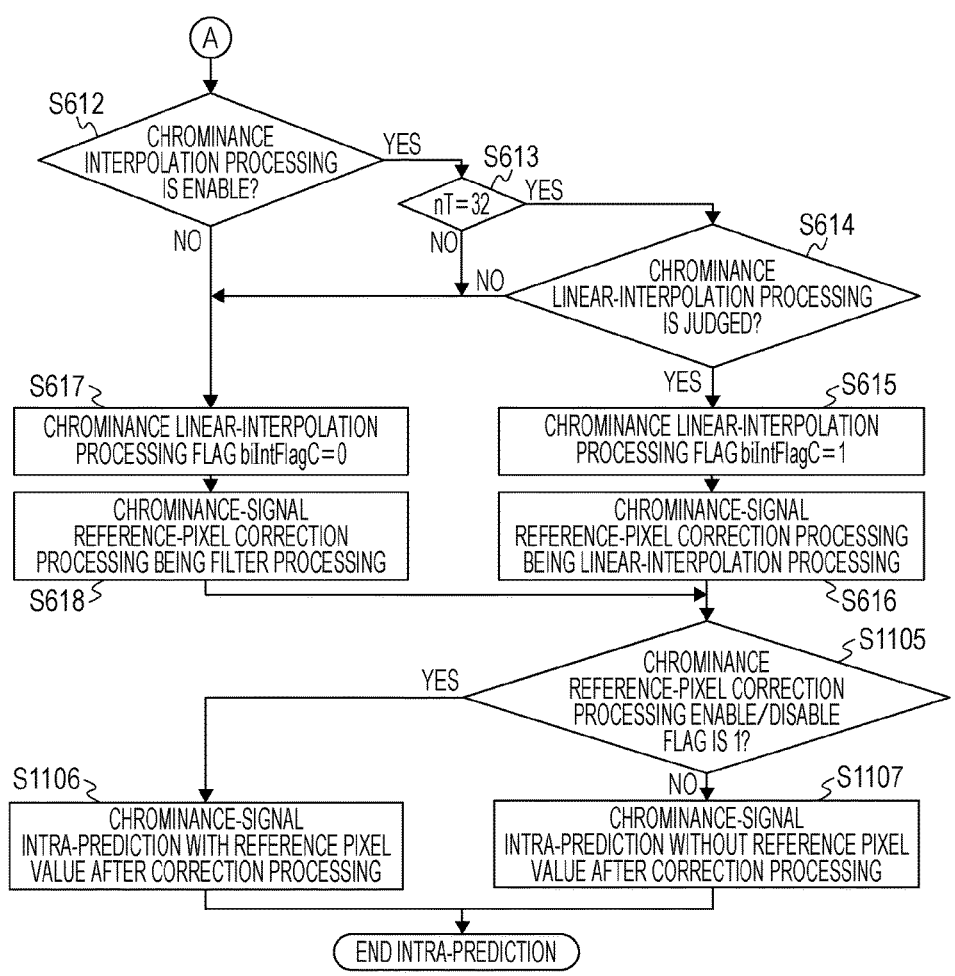

[Fig. 12]

| seq_parameter_set_rbsp( ) { | Descriptor |
|---|---|
| video_parameter_set_id | u(4) |
| sps_max_sub_layers_minus1 | u(3) |
| sps_temporal_id_nesting_flag | u(1) |
| sps_reserved_zero_bit | u(1) |
| profile_tier_level( 1, sps_max_sub_layers_minus1 ) | |
| seq_parameter_set_id | ue(v) |
| chroma_format_idc | ue(v) |
| if( chroma_format_idc == 3 ) | |
|     separate_colour_plane_flag | u(1) |
| ... | |
| log2_min_luma_coding_block_size_minus3 | ue(v) |
| log2_diff_max_min_luma_coding_block_size | ue(v) |
| | |
| ... | |
| strong_intra_smoothing_enable_flag | u(1) |
| ... | |
| } | |

[Fig. 13]
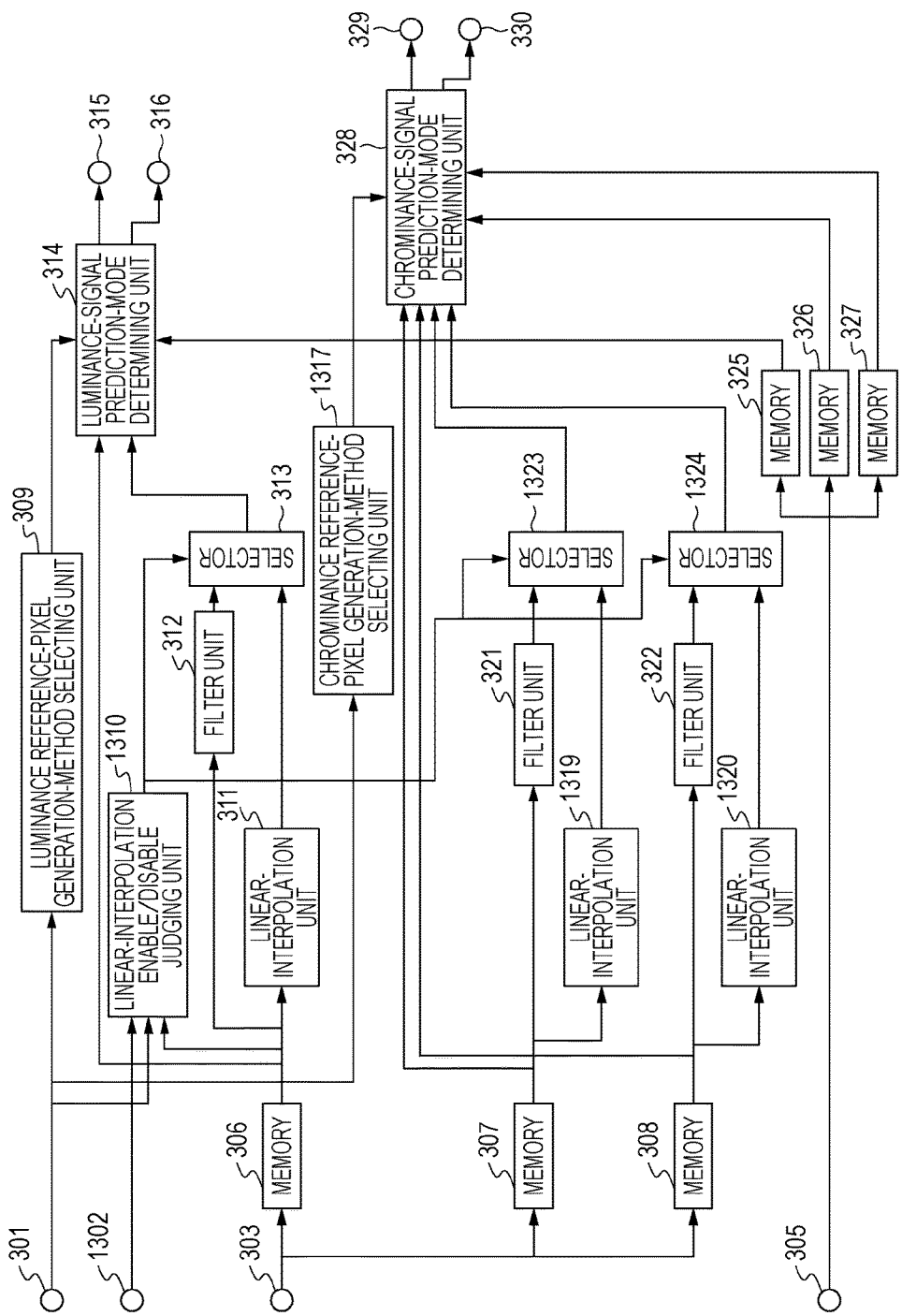

[Fig. 14A]
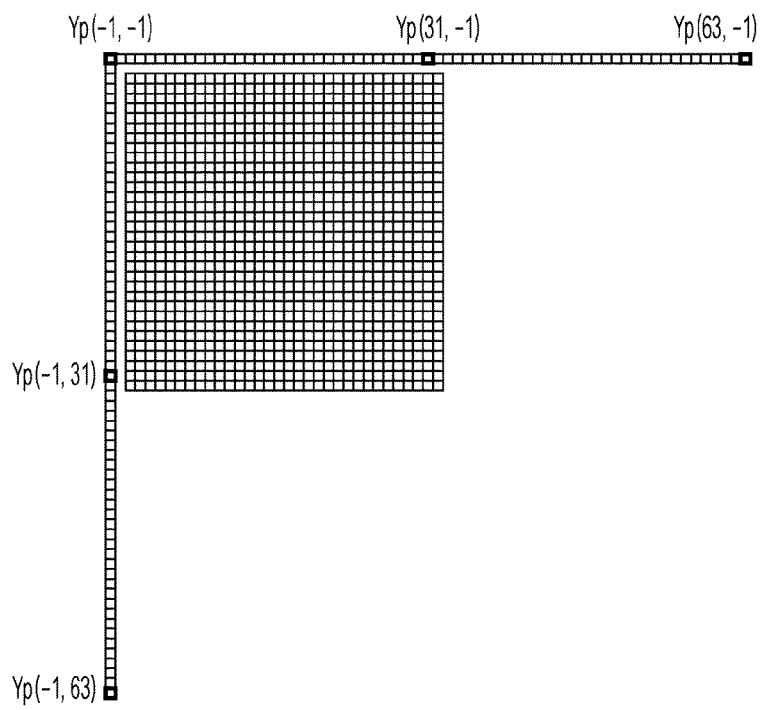
[Fig. 14B]
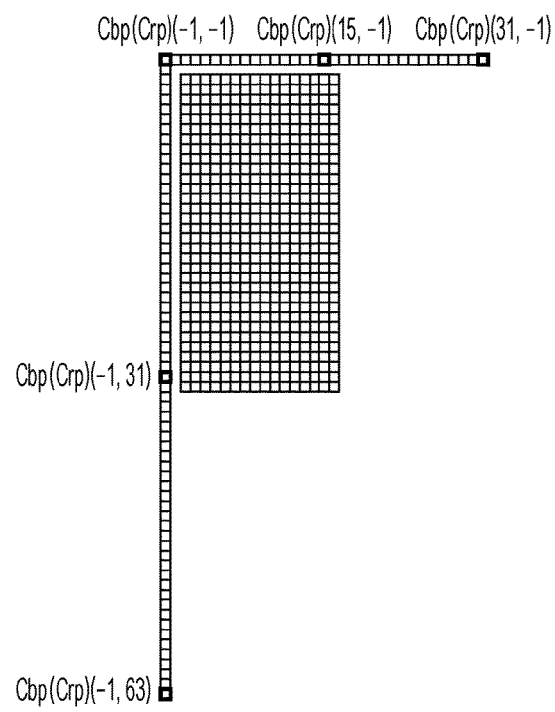

[Fig. 15]
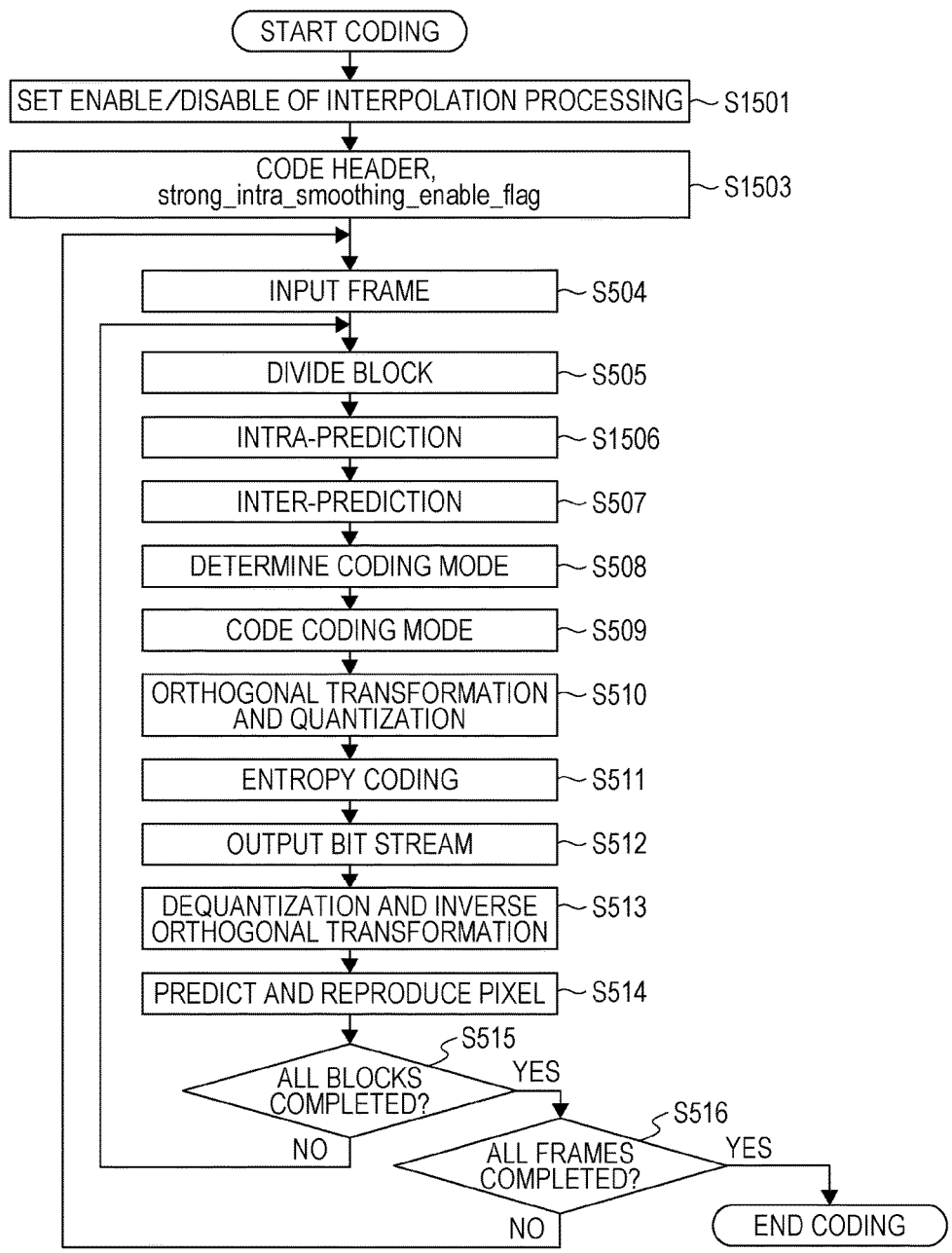

[Fig. 16]
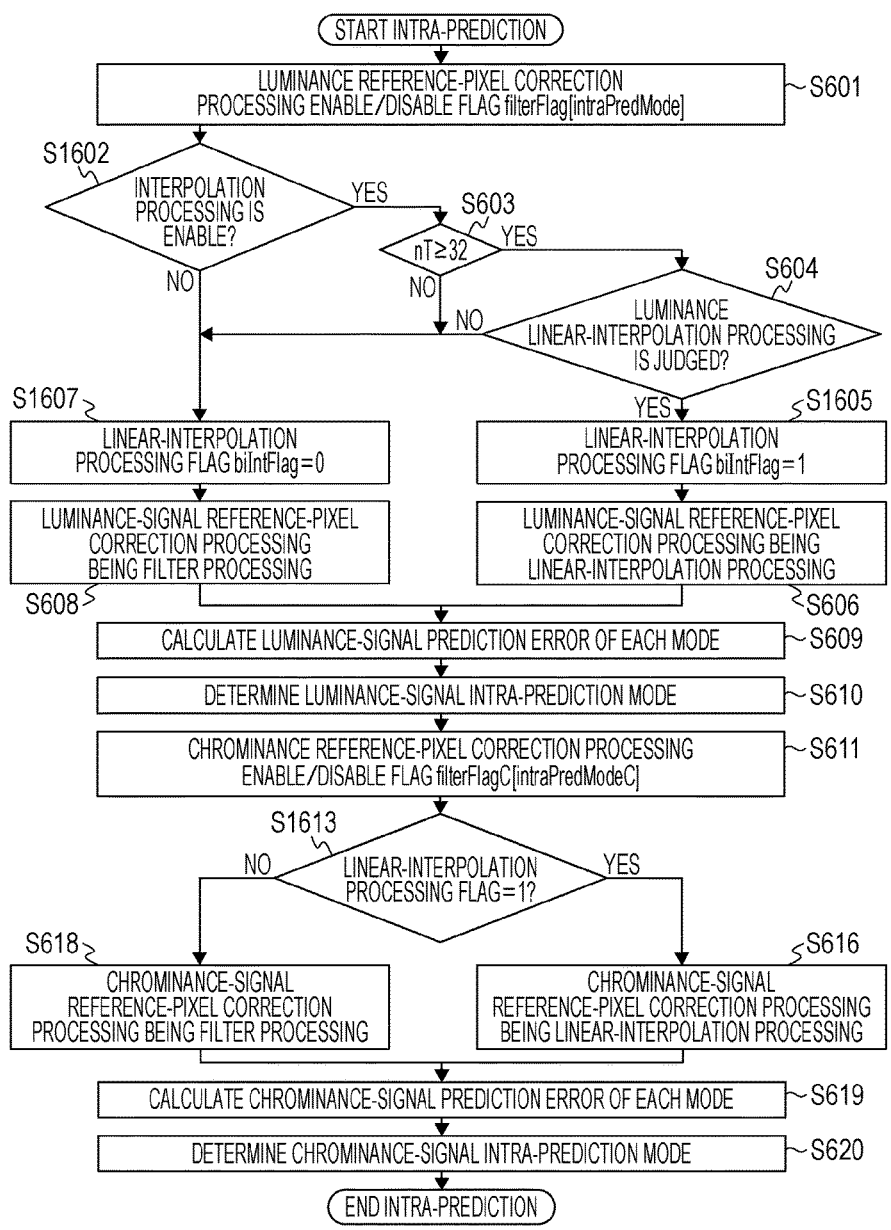

[Fig. 17]
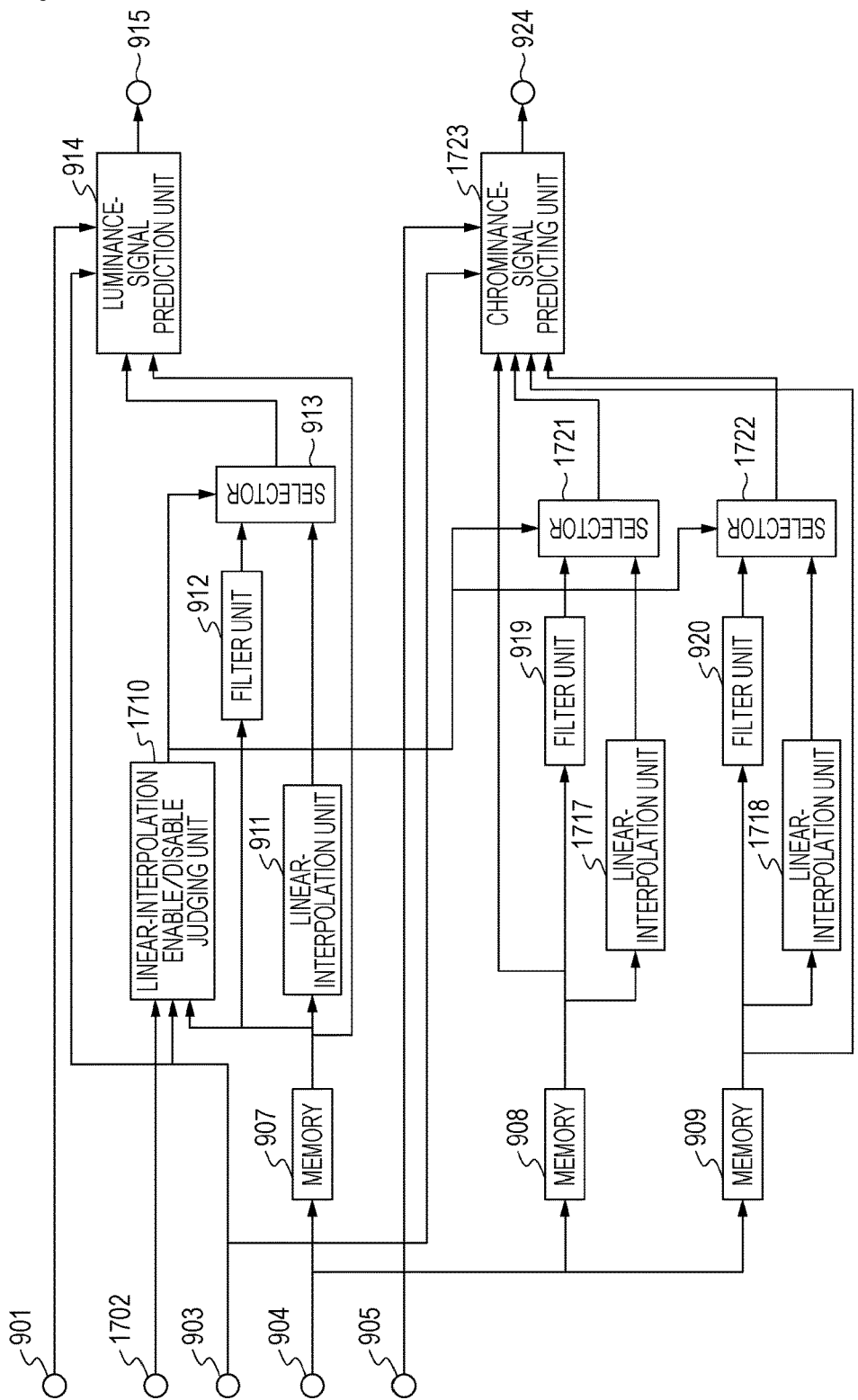

[Fig. 18]
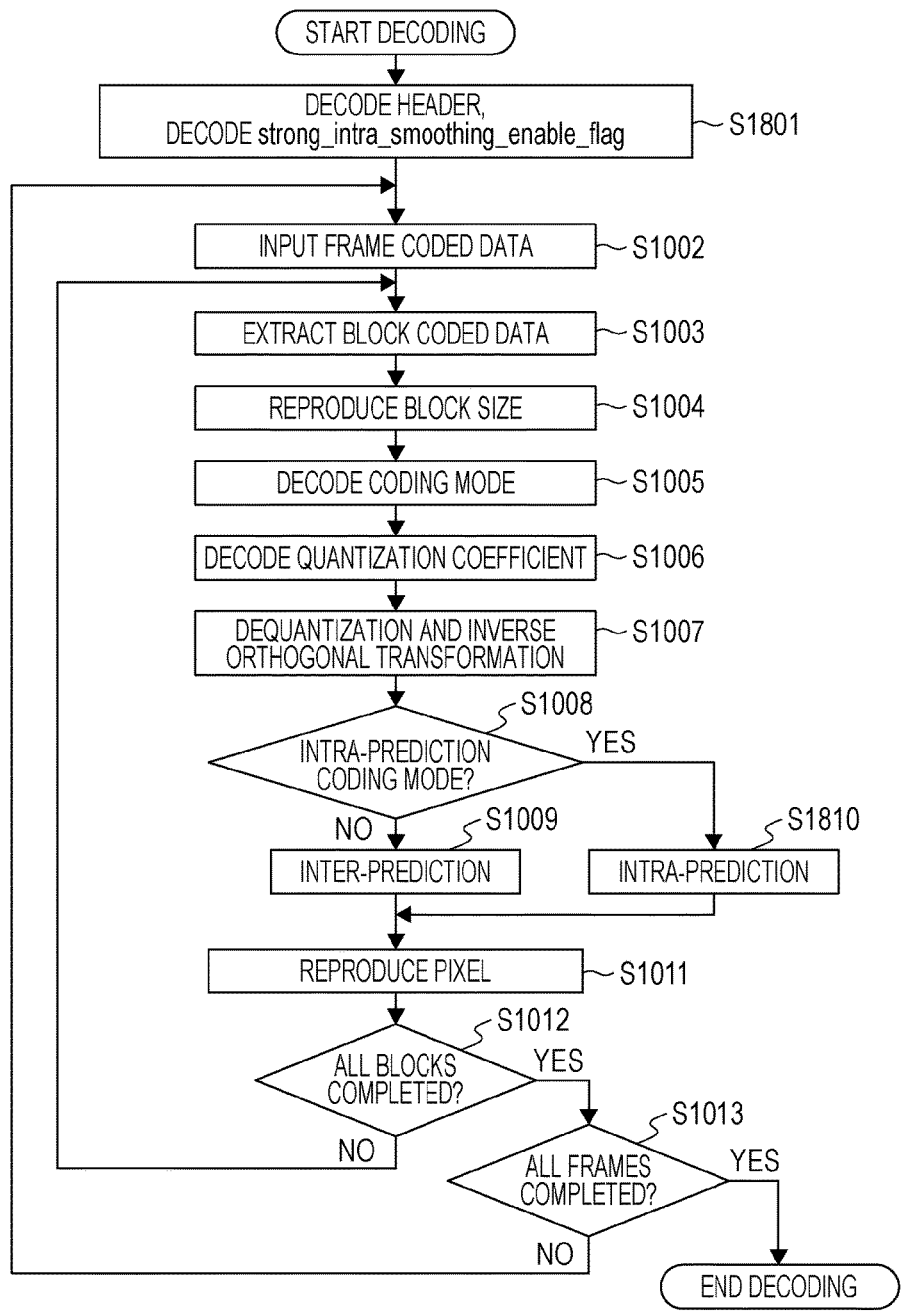

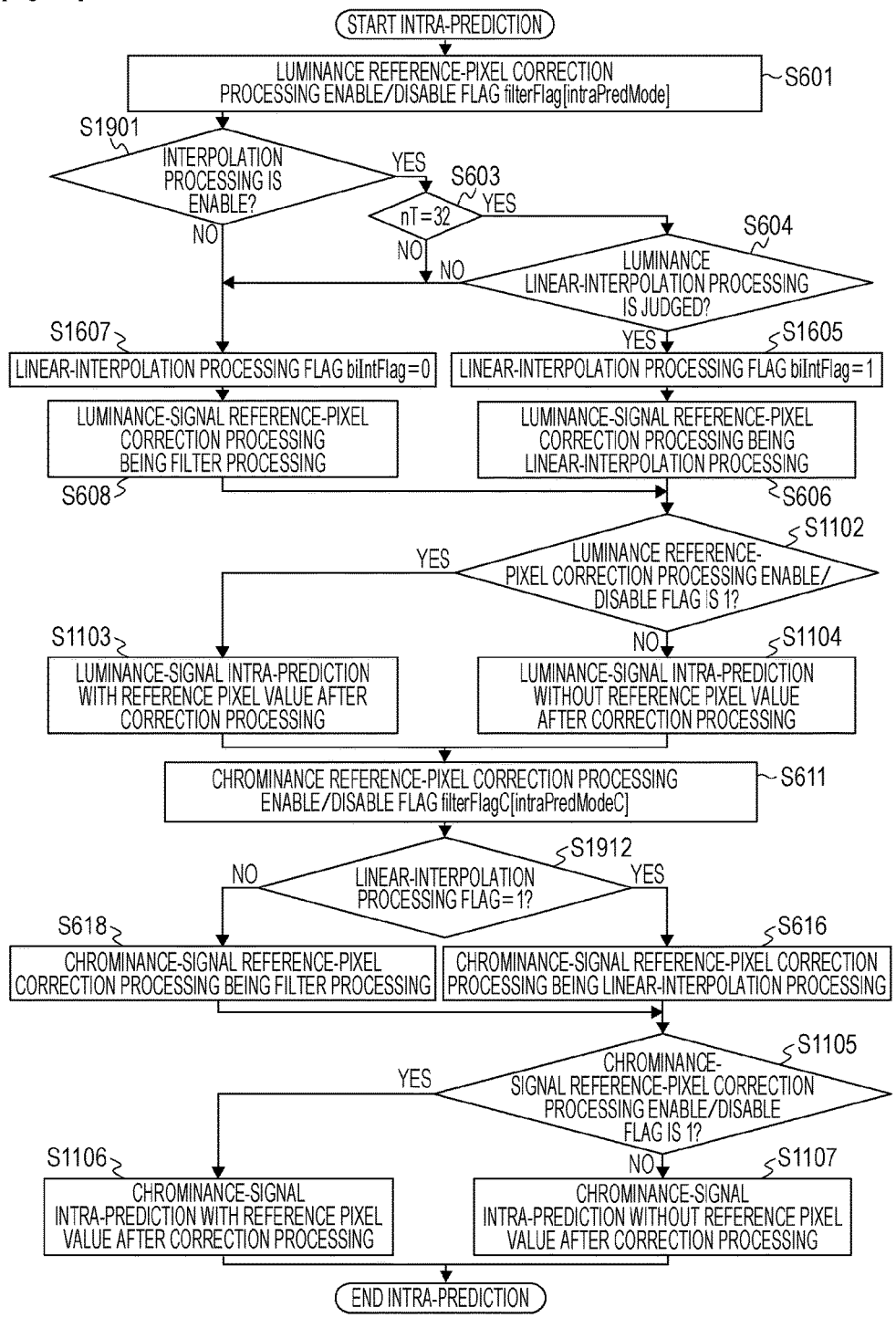
[Fig. 19]

[Fig. 20]

| seq_parameter_set_rbsp( ) { | Descriptor |
|---|---|
| video_parameter_set_id | u(4) |
| sps_max_sub_layers_minus1 | u(3) |
| sps_temporal_id_nesting_flag | u(1) |
| sps_reserved_zero_bit | u(1) |
| profile_tier_level( 1, sps_max_sub_layers_minus1 ) | |
| seq_parameter_set_id | ue(v) |
| chroma_format_idc | ue(v) |
| if( chroma_format_idc == 3 ) | |
|     separate_colour_plane_flag | u(1) |
| ... | |
| strong_intra_smoothing_enable_flag | u(1) |
| if( strong_intra_smoothing_enabel_flag == 1 ) | |
|     strong_intra_smoothing_chroma_enable_flag | u(1) |
|   else | |
|     strong_intra_smoothing_chroma_enable_flag=0 | |
| ... | |
| } | |

[Fig. 21]
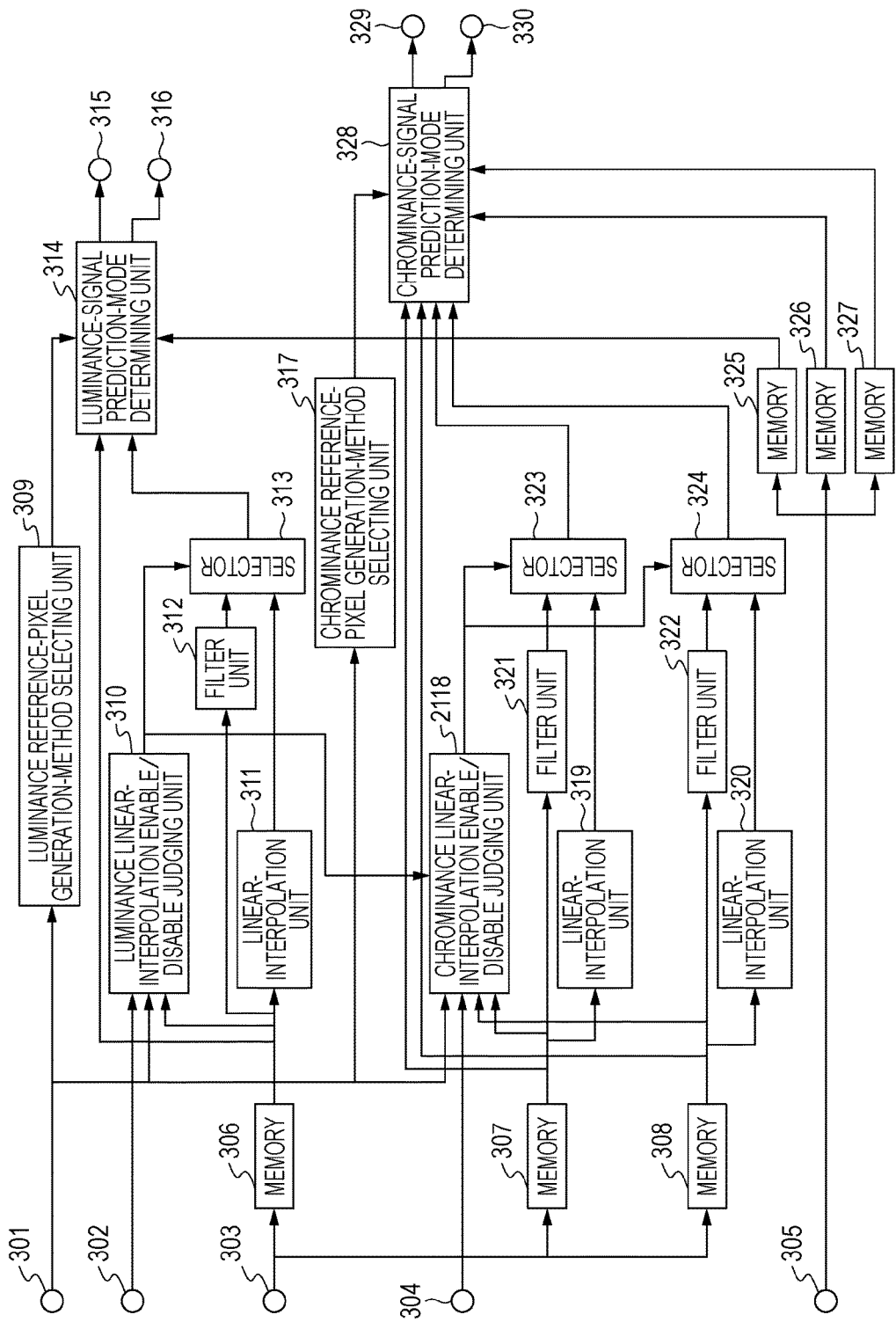

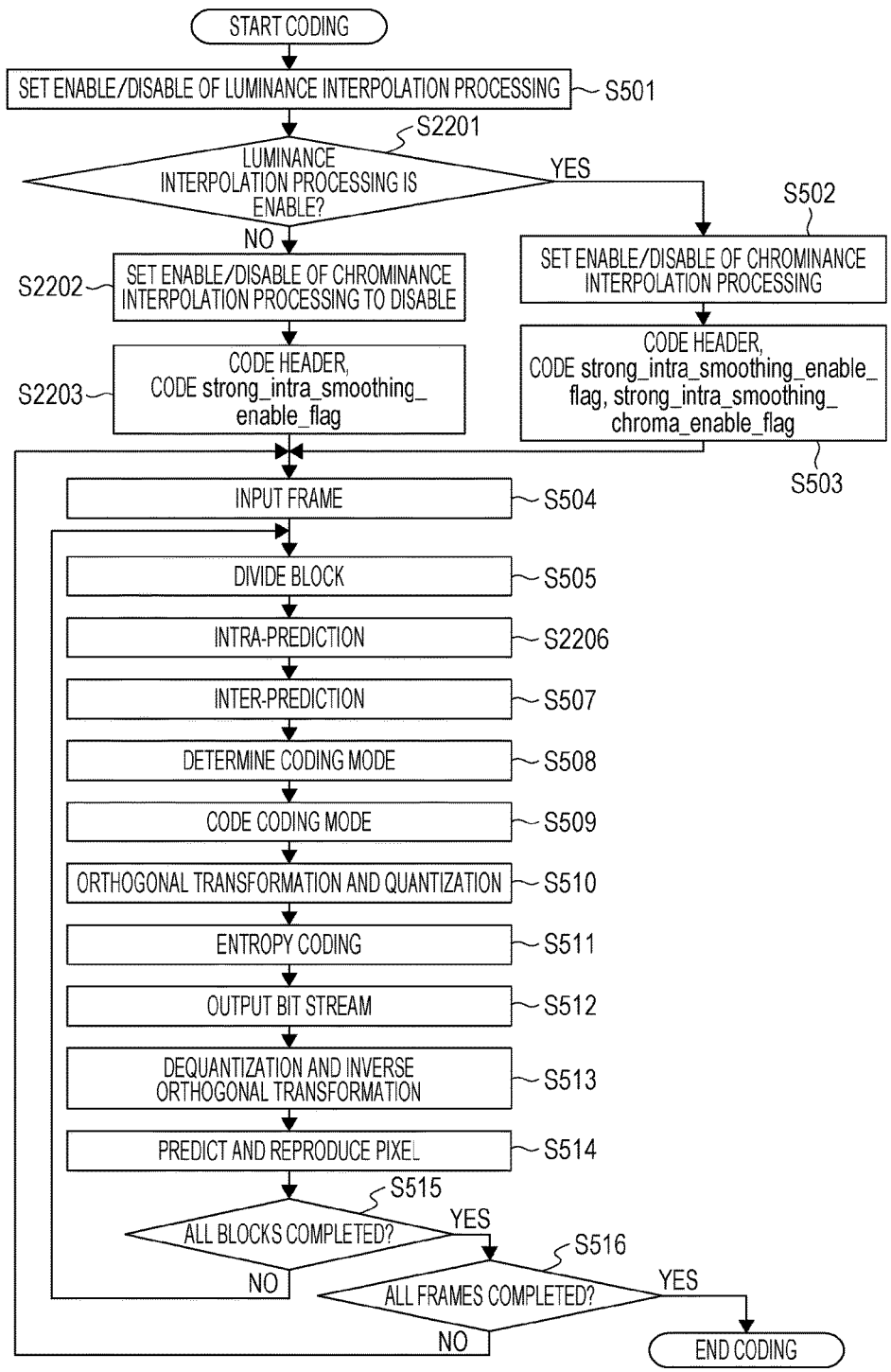
[Fig. 22]

[Fig. 23A]
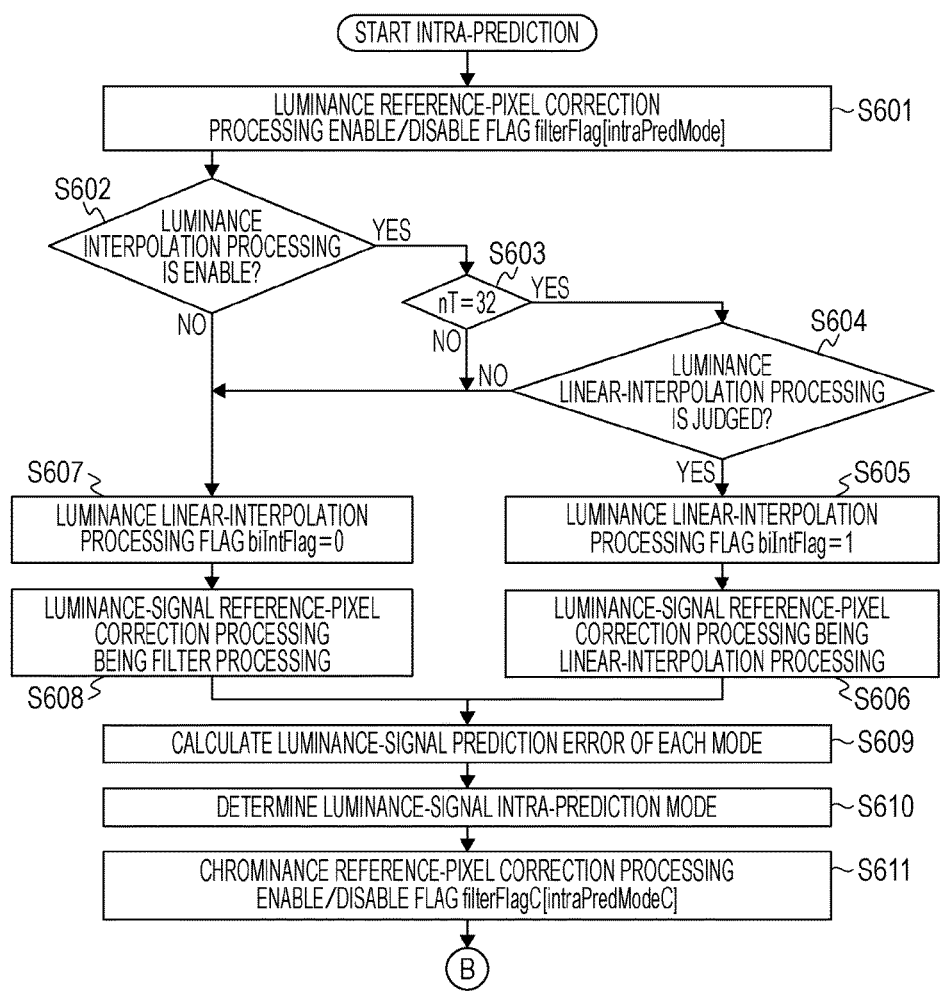

[Fig. 23B]
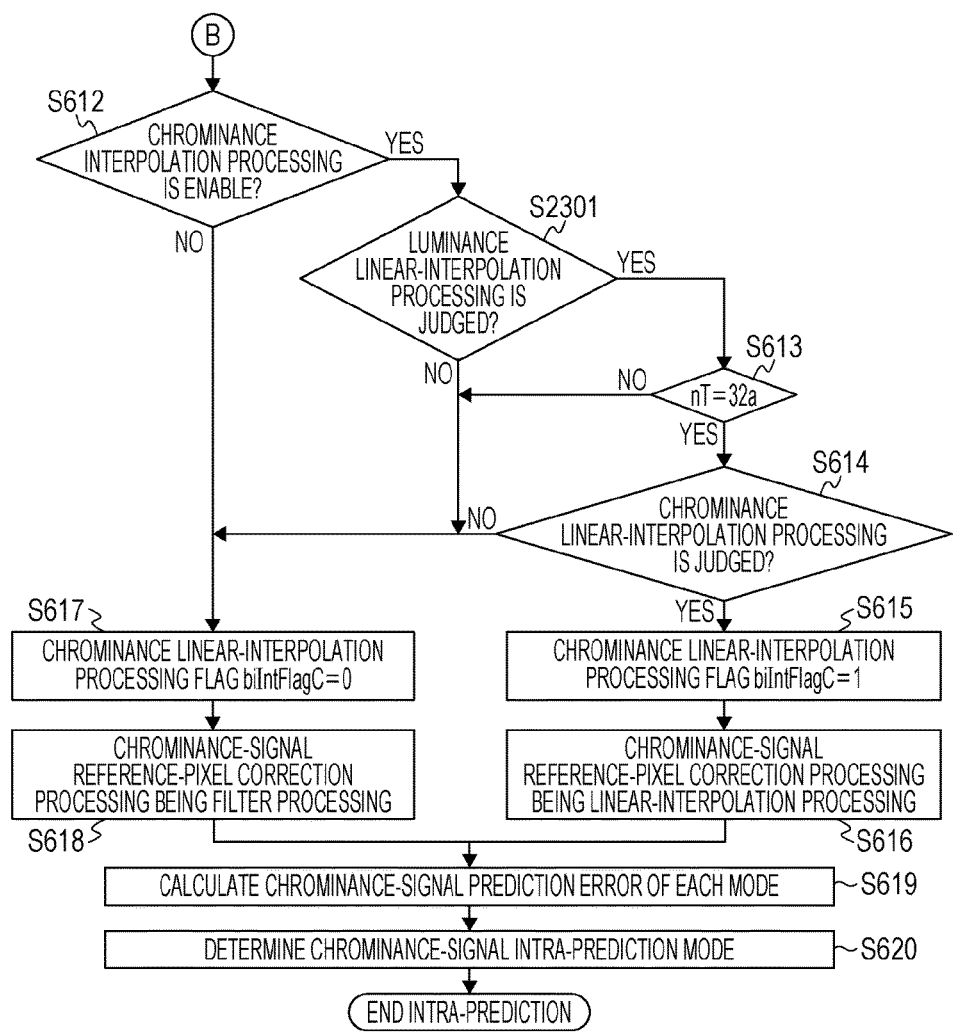

[Fig. 24]
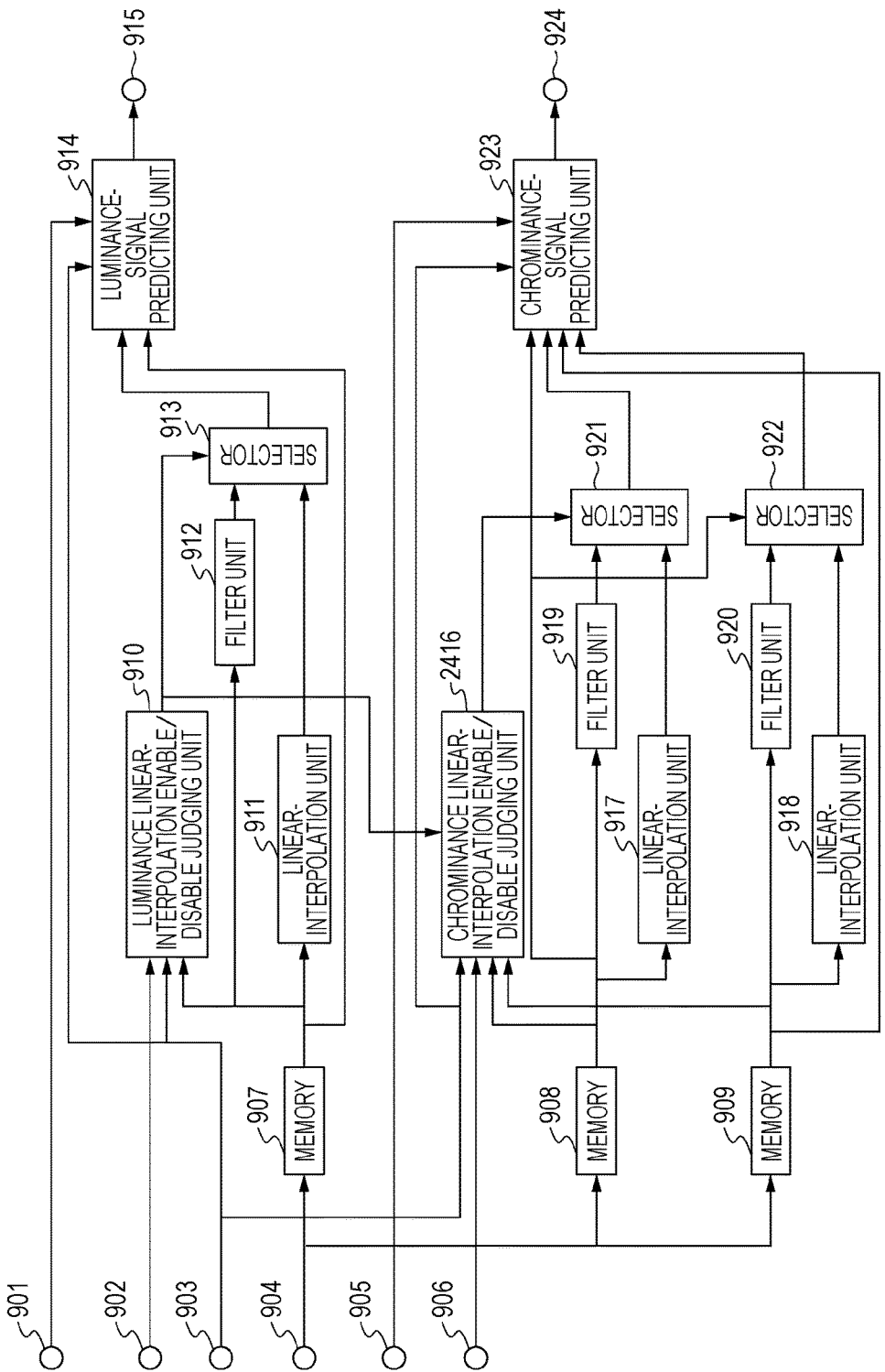

[Fig. 25]
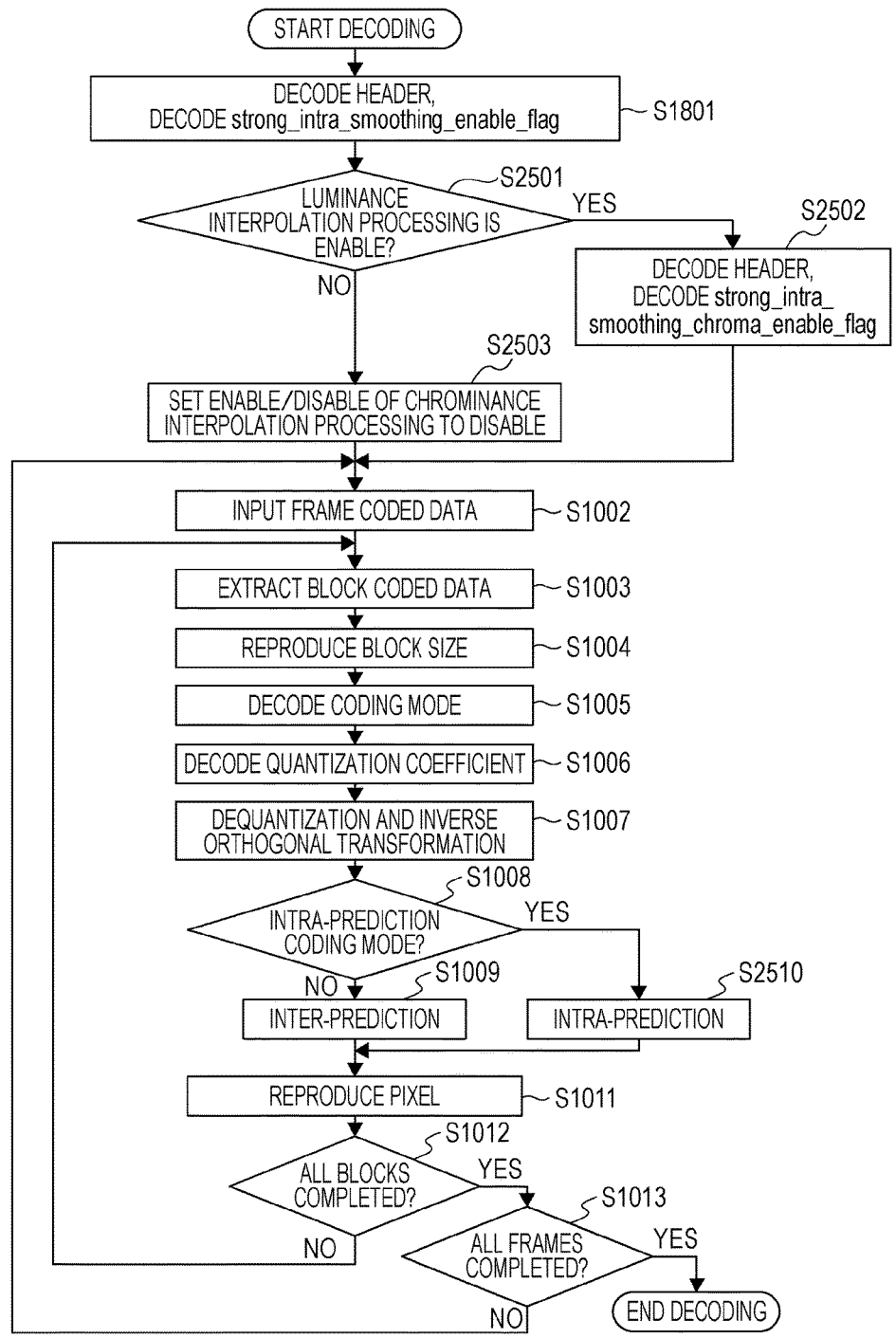

[Fig. 26A]
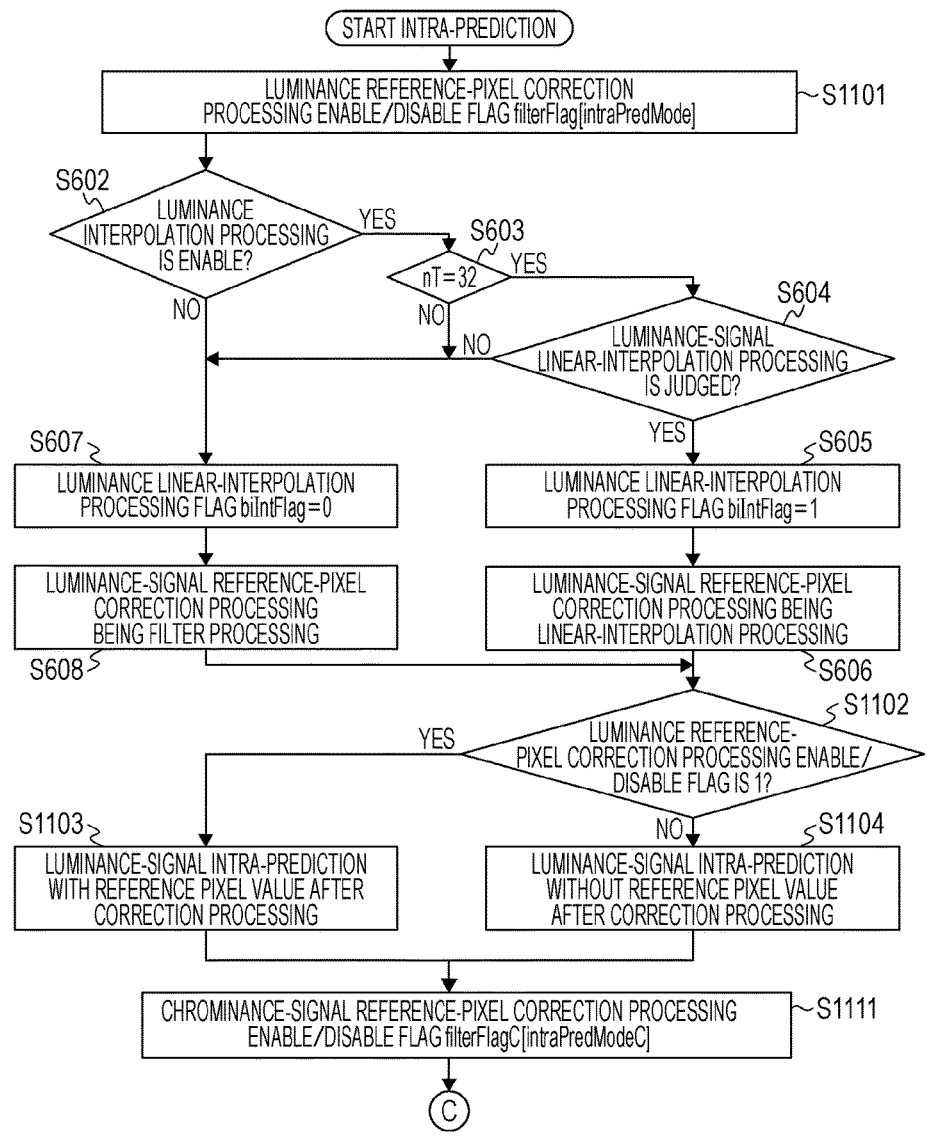

[Fig. 26B]
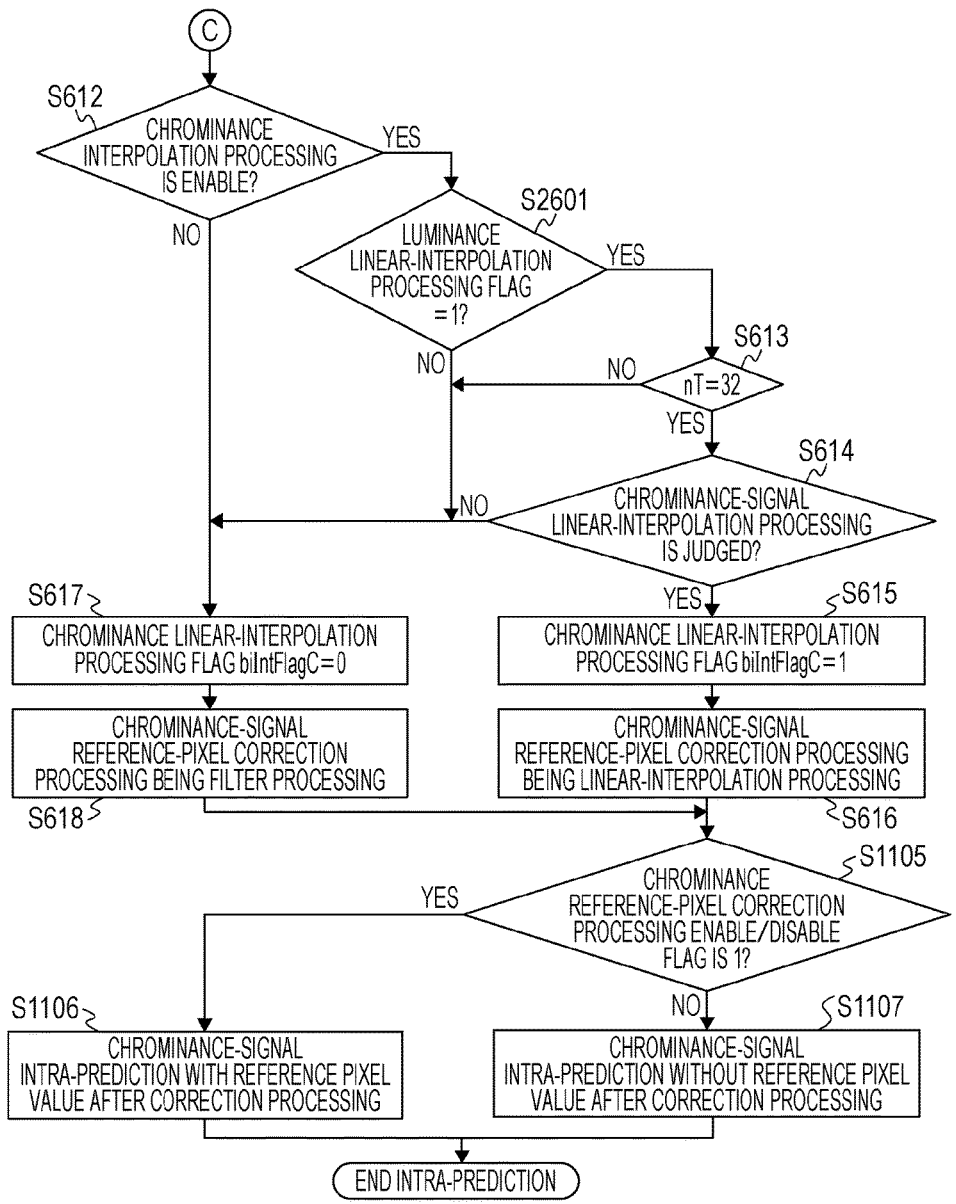

[Fig. 27]

| seq_parameter_set_rbsp( ) { | Descriptor |
|---|---|
| video_parameter_set_id | u(4) |
| sps_max_sub_layers_minus1 | u(3) |
| sps_temporal_id_nesting_flag | u(1) |
| sps_reserved_zero_bit | u(1) |
| profile_tier_level( 1, sps_max_sub_layers_minus1 ) | |
| seq_parameter_set_id | ue(v) |
| chroma_format_idc | ue(v) |
| if( chroma_format_idc == 3 ) | |
|     separate_colour_plane_flag | u(1) |
| ... | |
| strong_intra_smoothing_enable_flag | u(1) |
| if( strong_intra_smoothing_enable_flag == 1 )  { | |
|     strong_intra_smoothing_cb_enable_flag | u(1) |
|     strong_intra_smoothing_cr_enable_flag | u(1) |
|   } else { | |
|     strong_intra_smoothing_cb_enable_flag = 0 | |
|     strong_intra_smoothing_cr_enable_flag = 0 | |
|   } | |
| ... | |
| } | |

[Fig. 28]
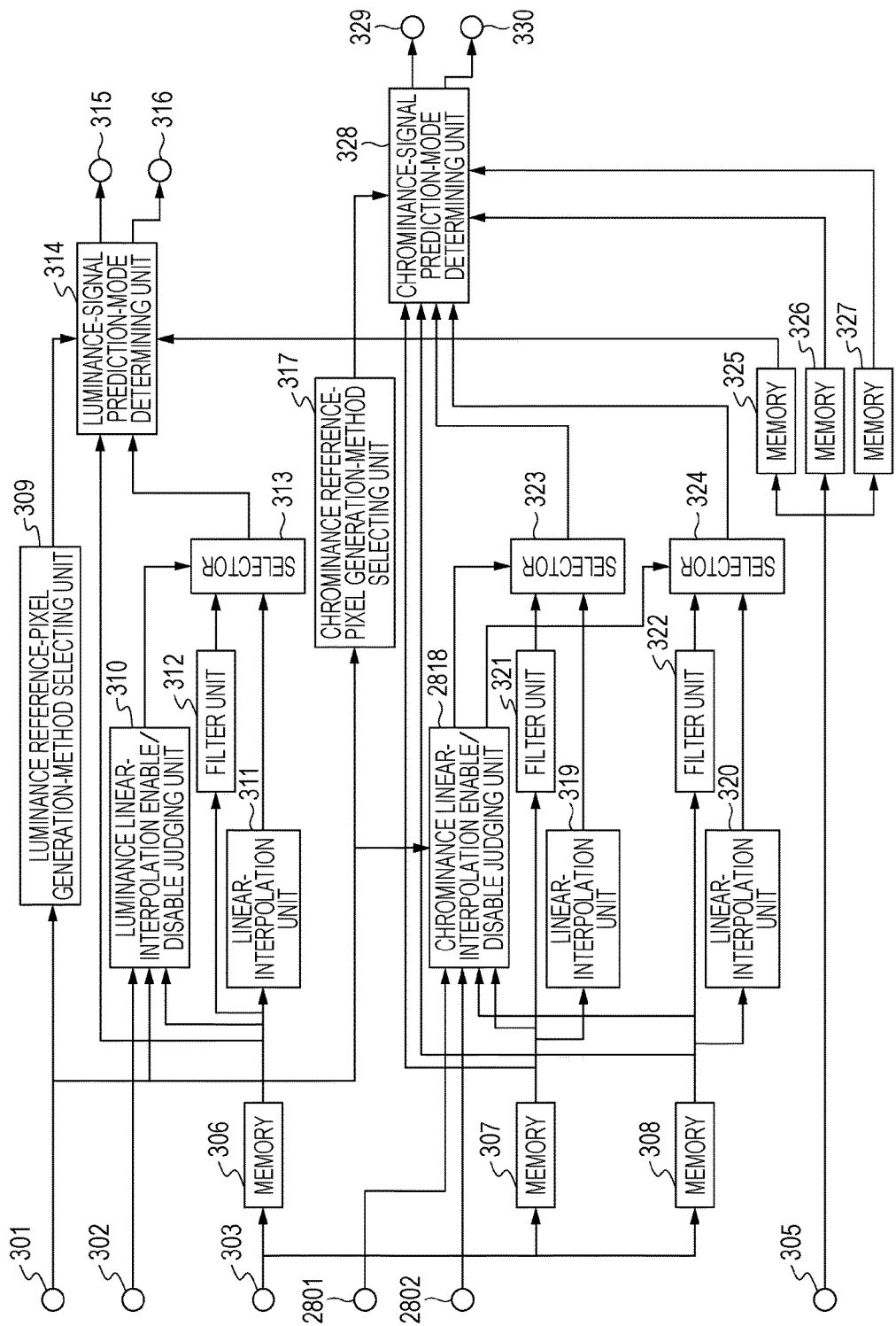

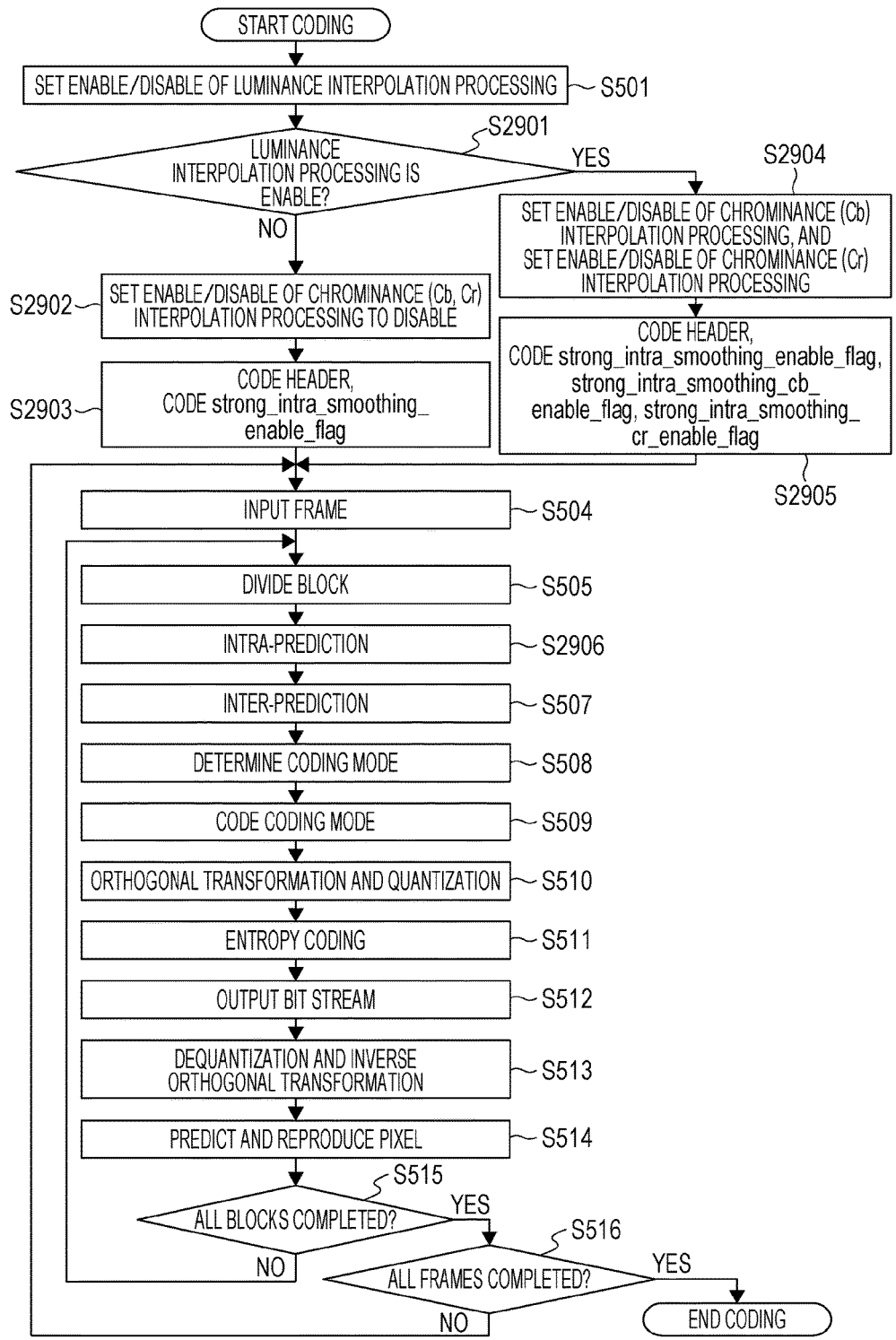

[Fig. 30A]
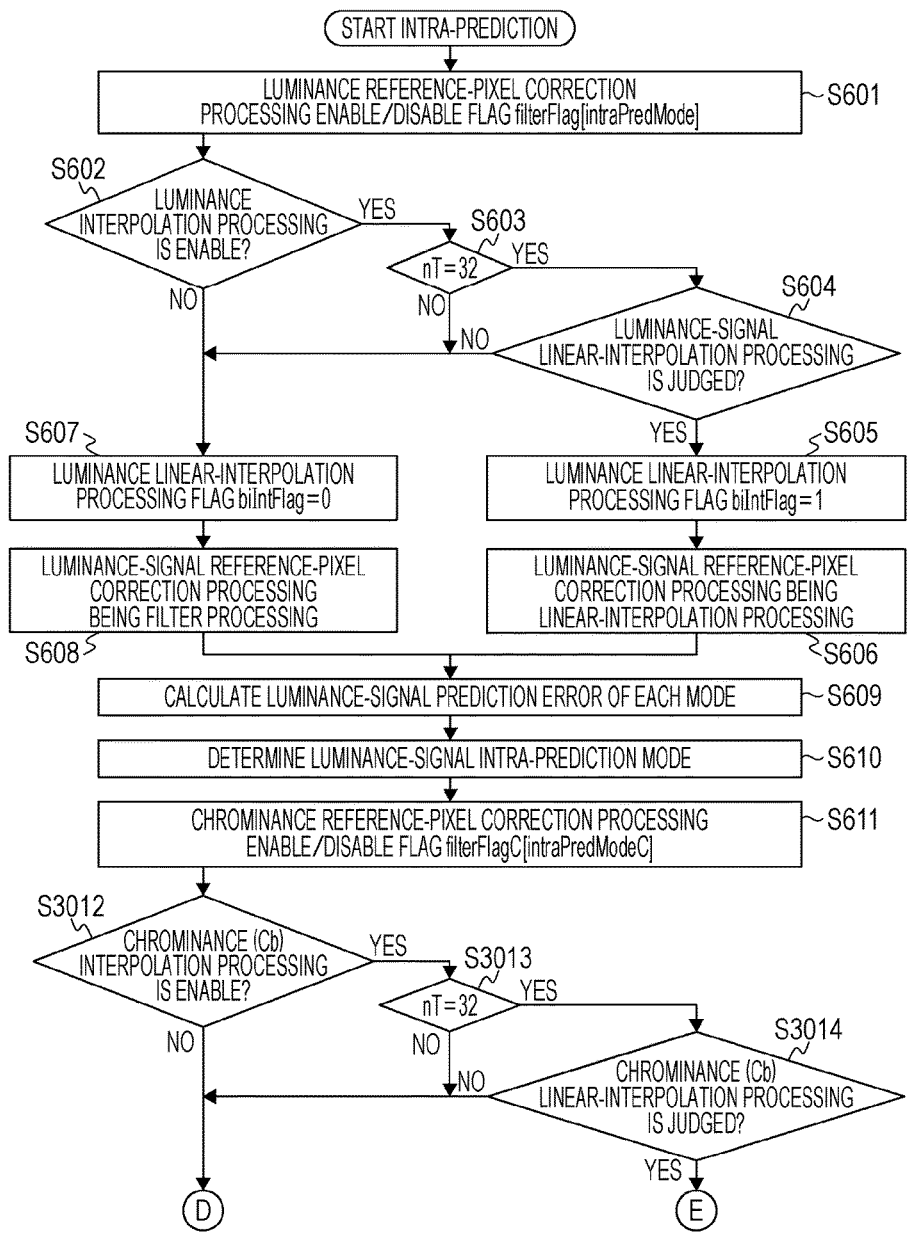

[Fig. 30B]
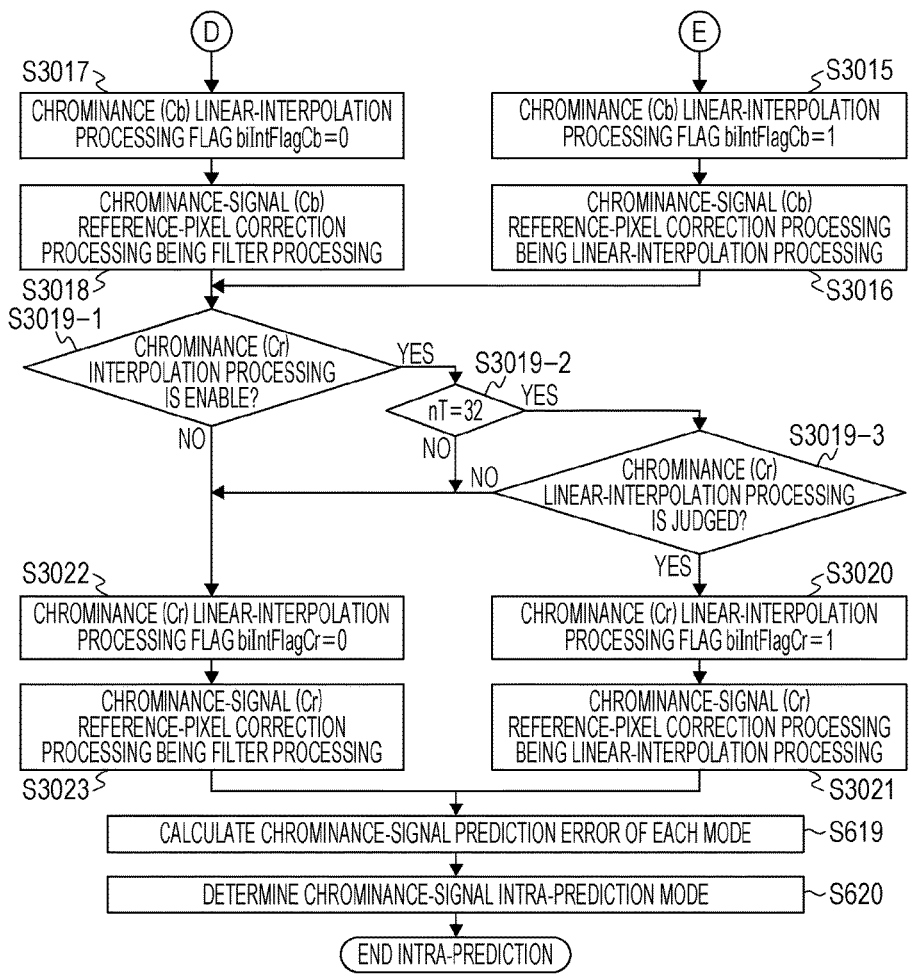

[Fig. 31]
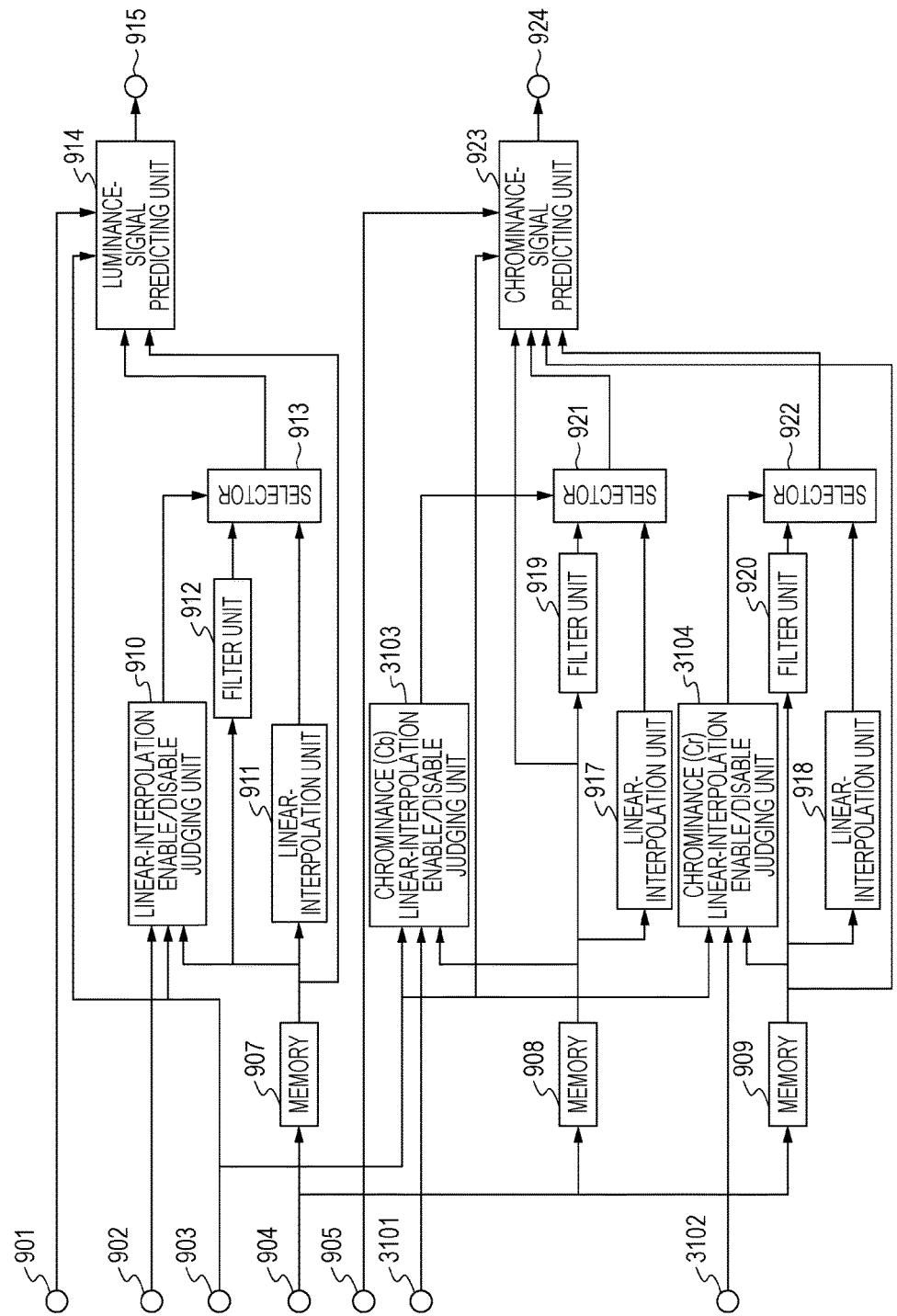

[Fig. 32]
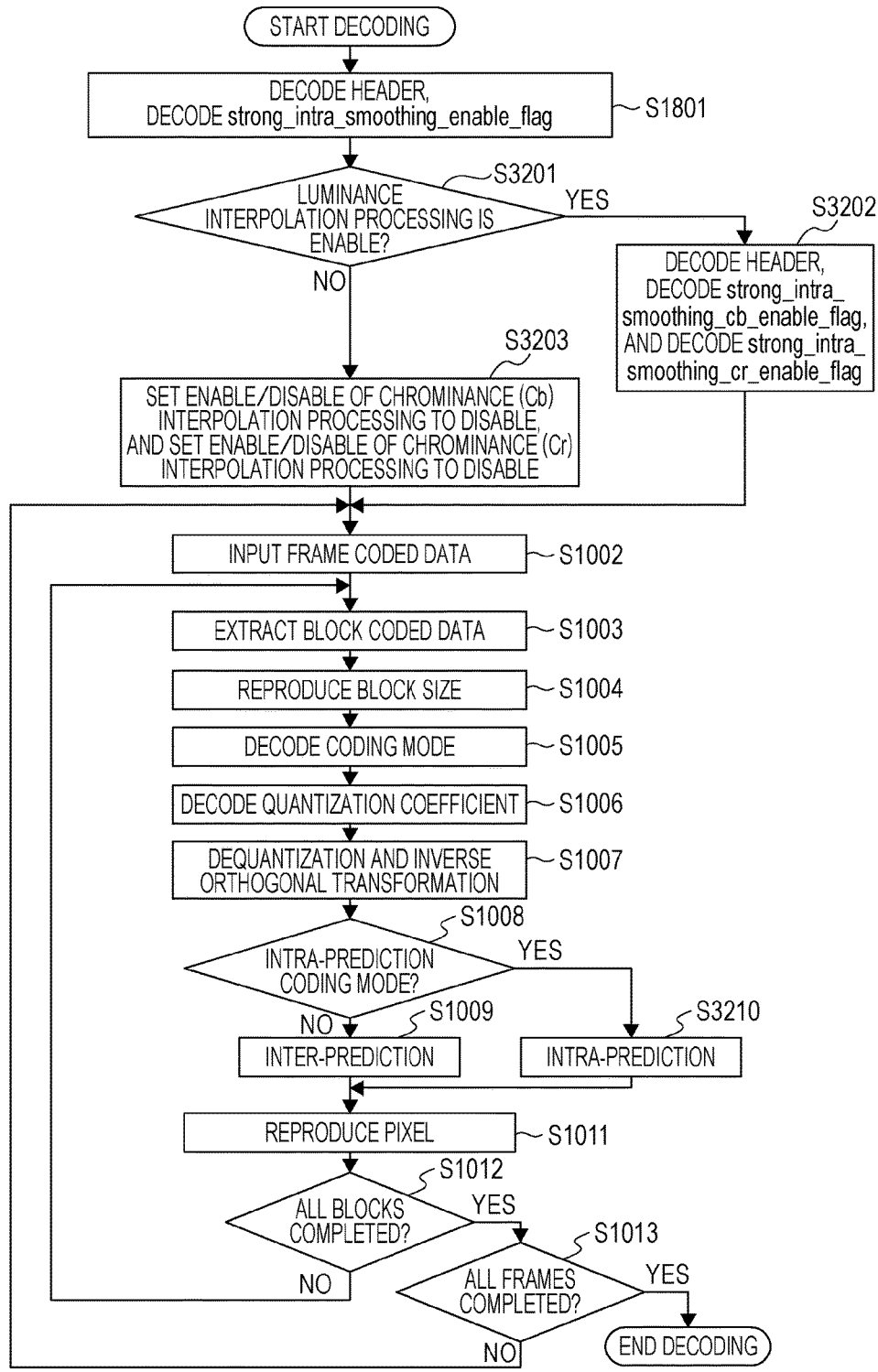

[Fig. 33A]
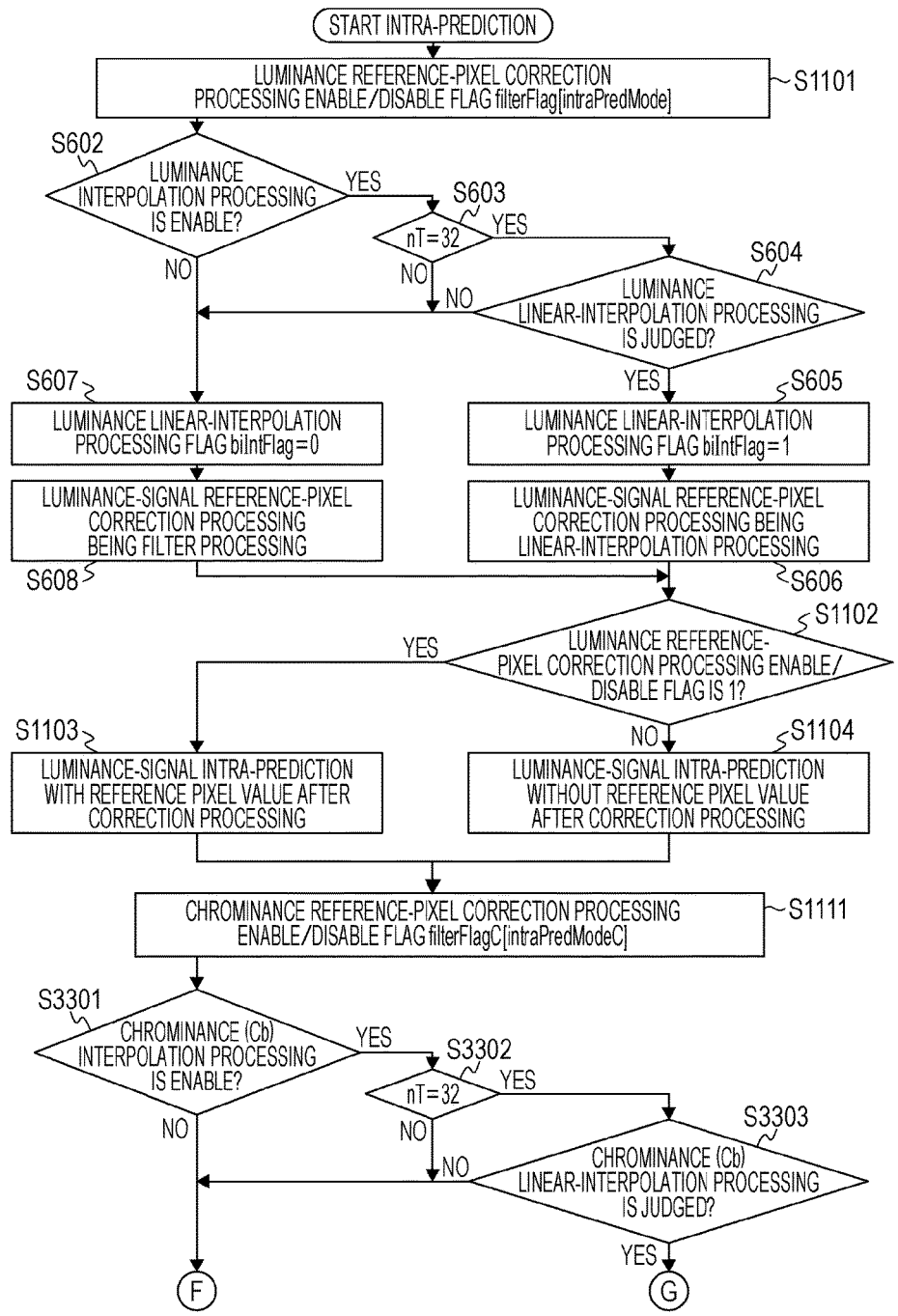

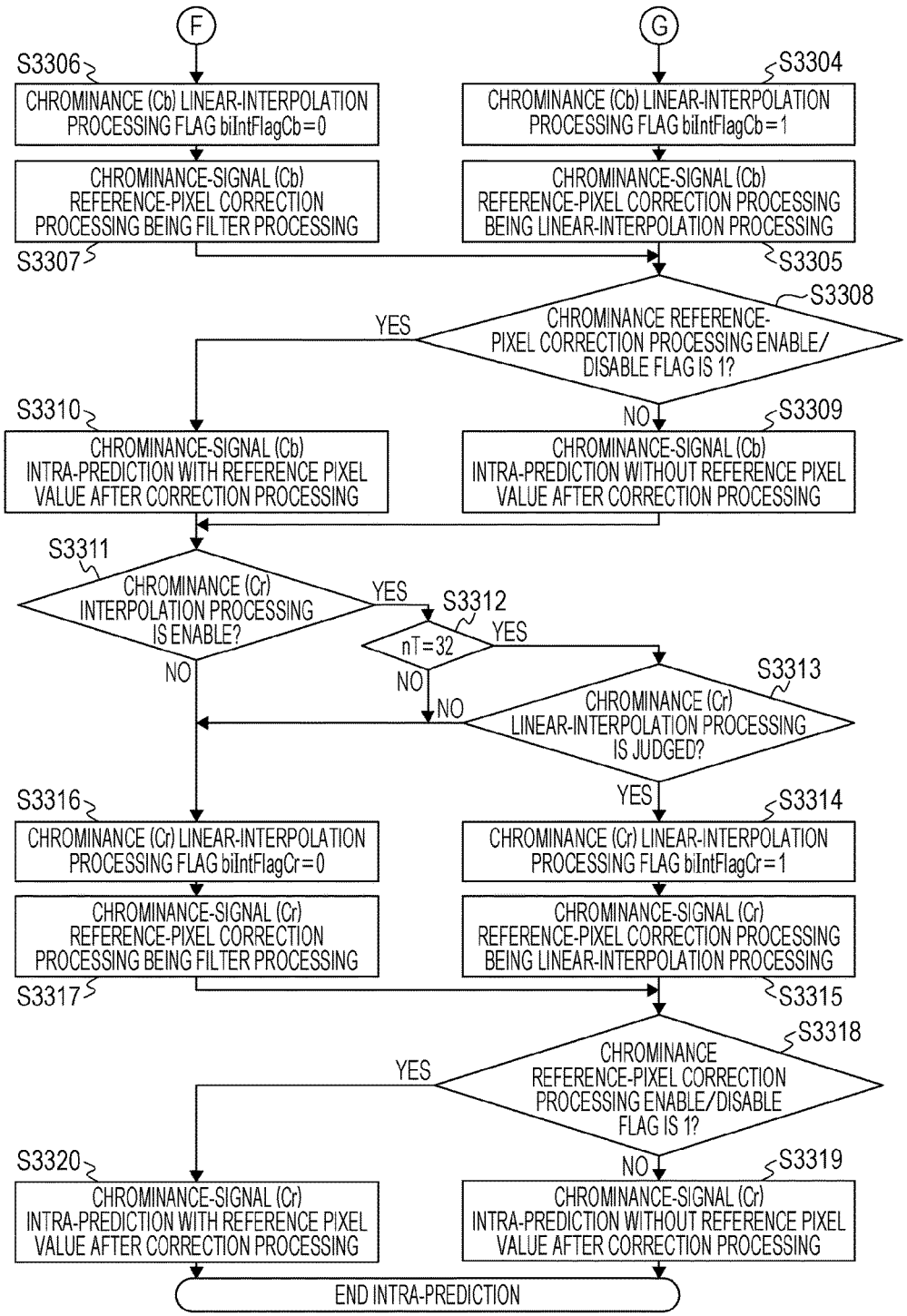
[Fig. 33B]

[Fig. 34]

| seq_parameter_set_rbsp( ) { | Descriptor |
|---|---|
| video_parameter_set_id | u(4) |
| sps_max_sub_layers_minus1 | u(3) |
| sps_temporal_id_nesting_flag | u(1) |
| sps_reserved_zero_bit | u(1) |
| profile_tier_level( 1, sps_max_sub_layers_minus1 ) | |
| seq_parameter_set_id | ue(v) |
| chroma_format_idc | ue(v) |
| if( chroma_format_idc == 3 ) | |
|     separate_colour_plane_flag | u(1) |
| ... | |
| strong_intra_smoothing_enable_flag | u(1) |
| strong_intra_smoothing_cb_enable_flag | u(1) |
| strong_intra_smoothing_cr_enable_flag | u(1) |
| ... | |
| } | |

[Fig. 35]
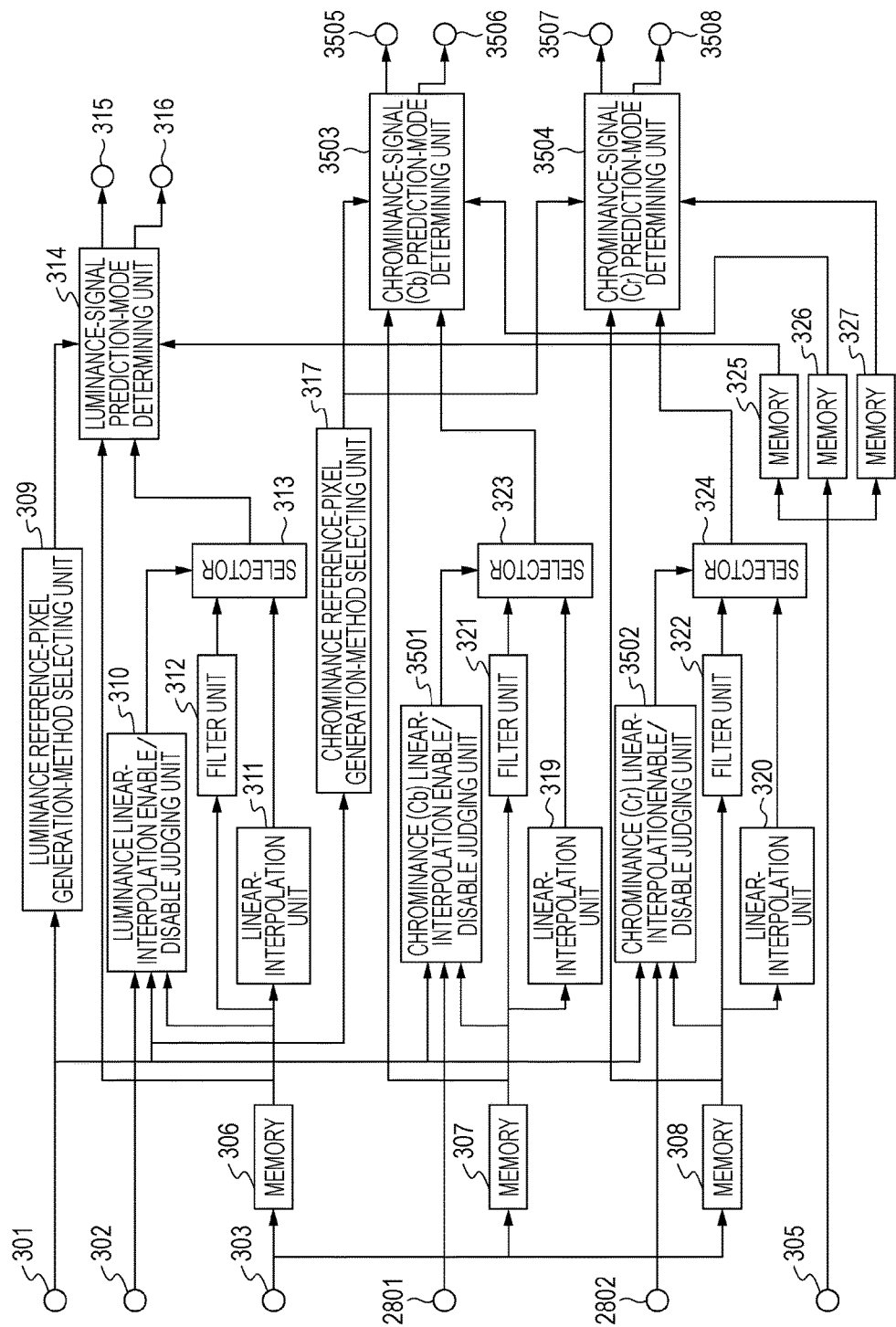

[Fig. 36]
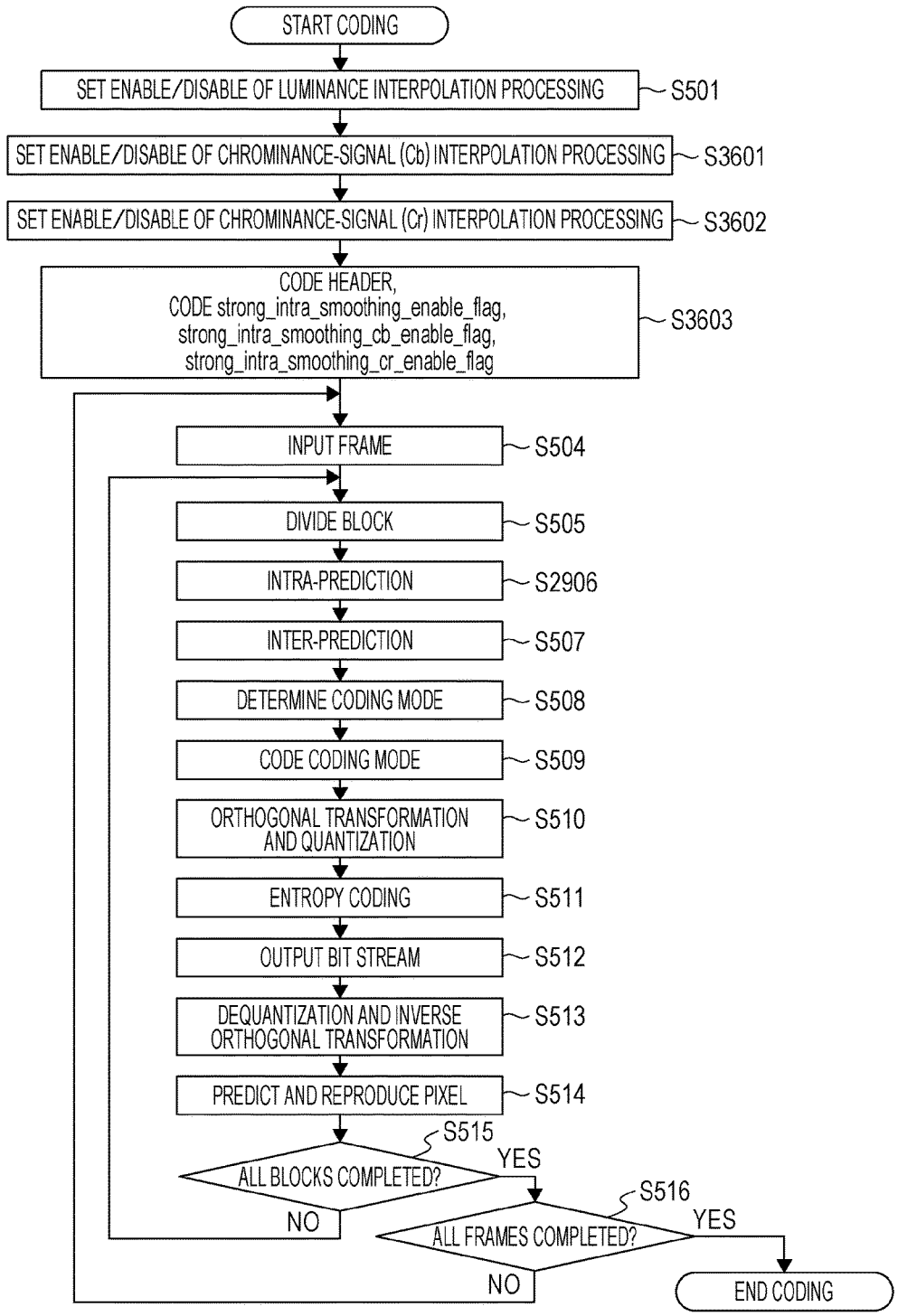

[Fig. 37]
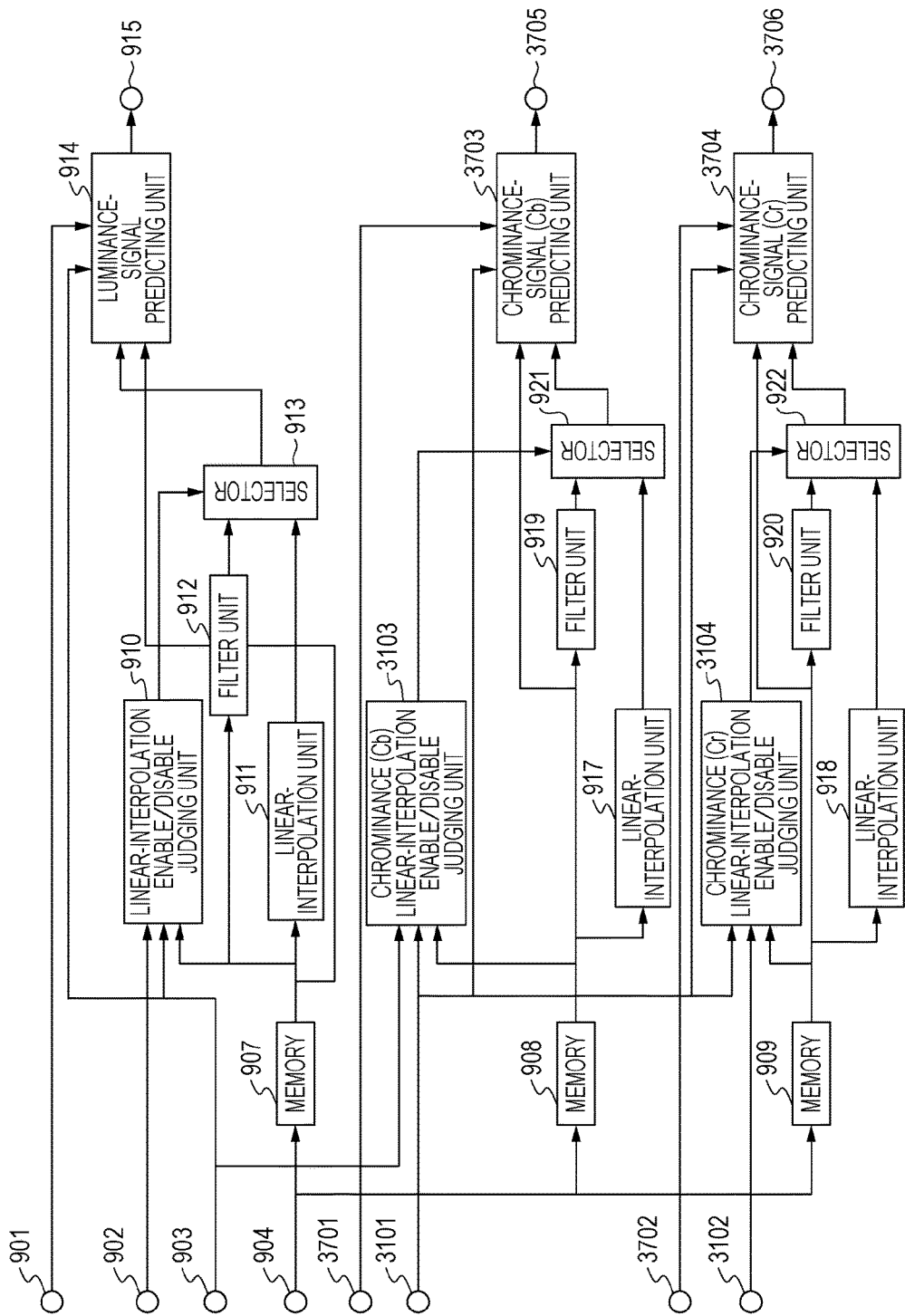

[Fig. 38]
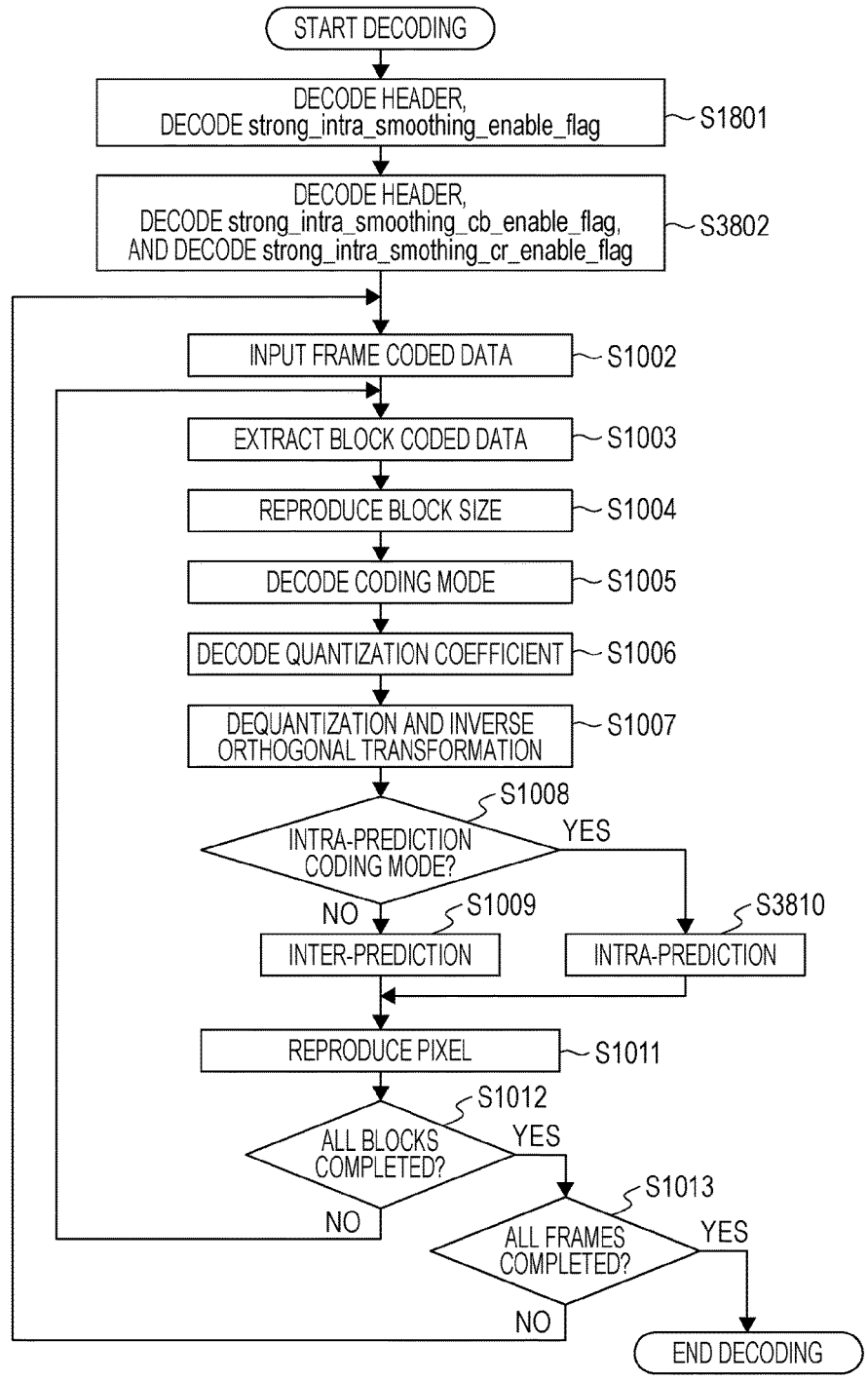

[Fig. 39A]
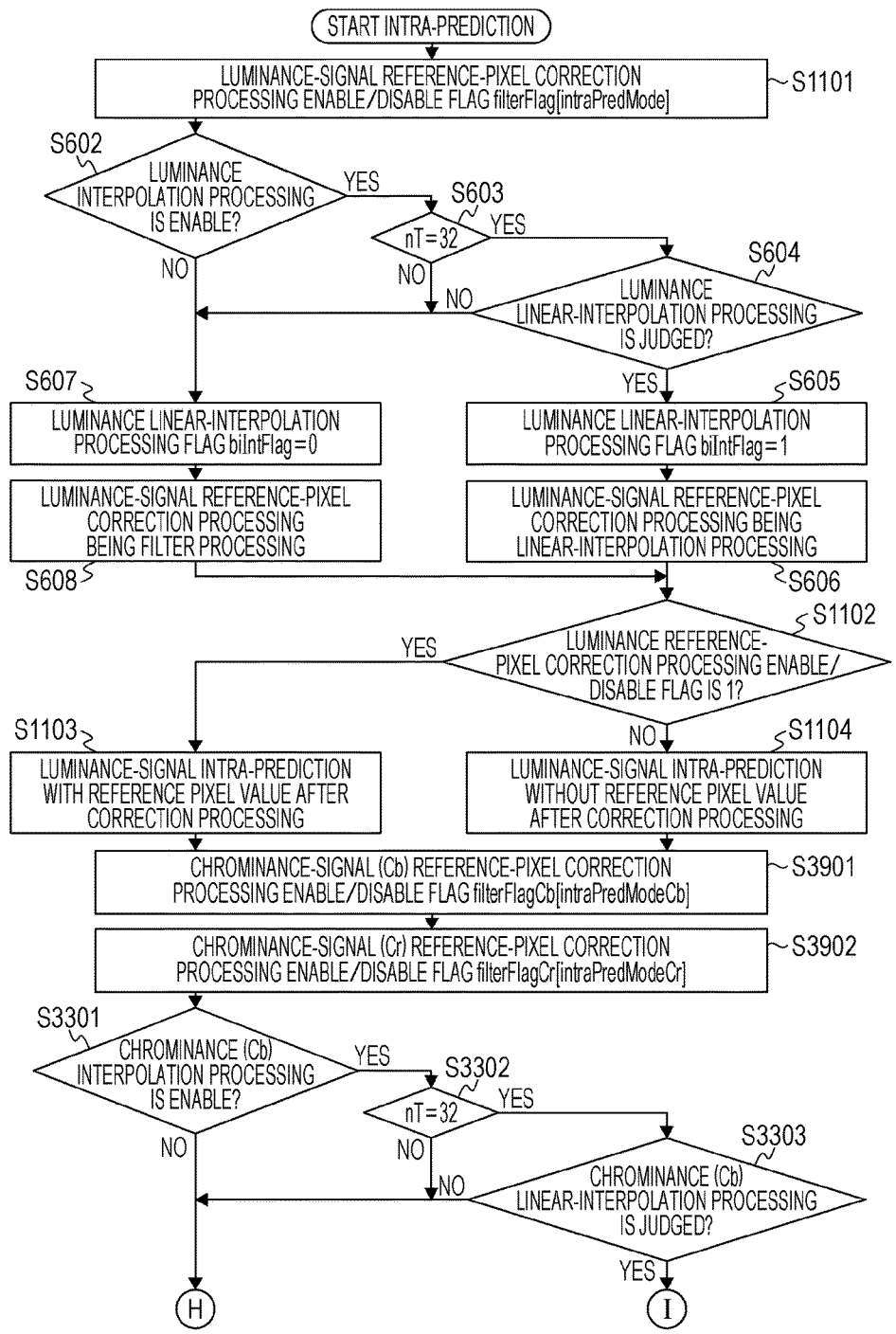

[Fig. 39B]
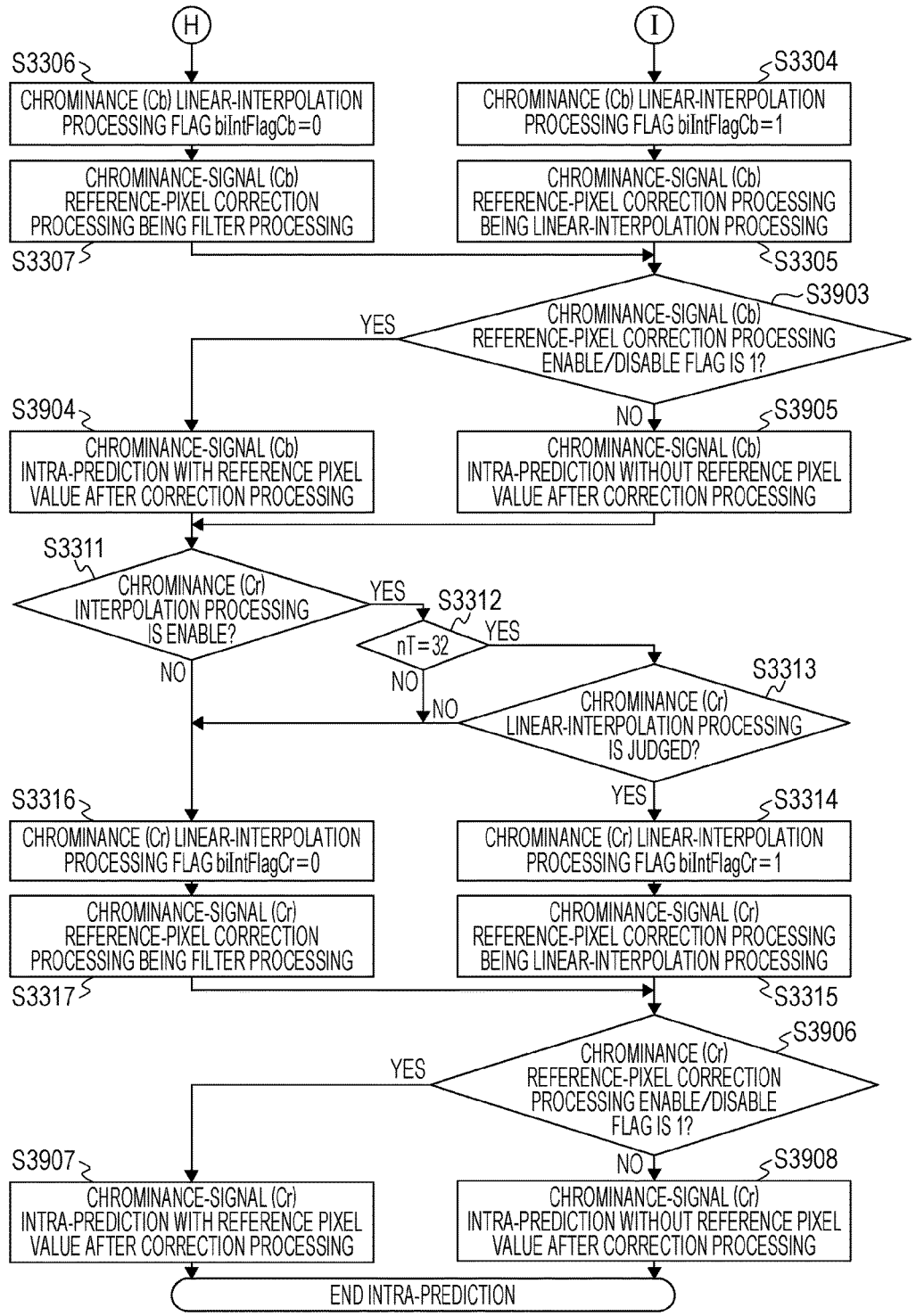

[Fig. 40]
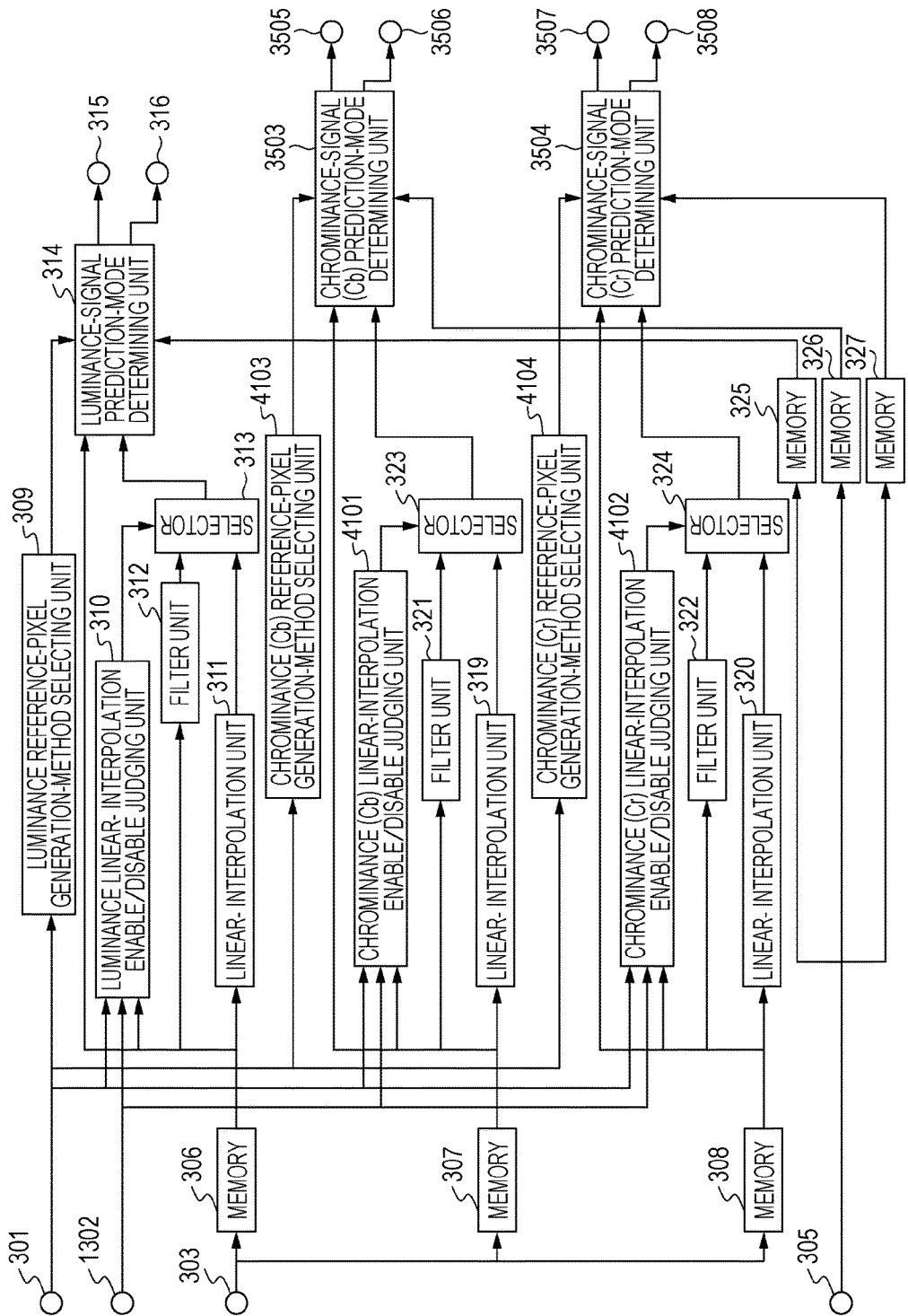

[Fig. 41A]
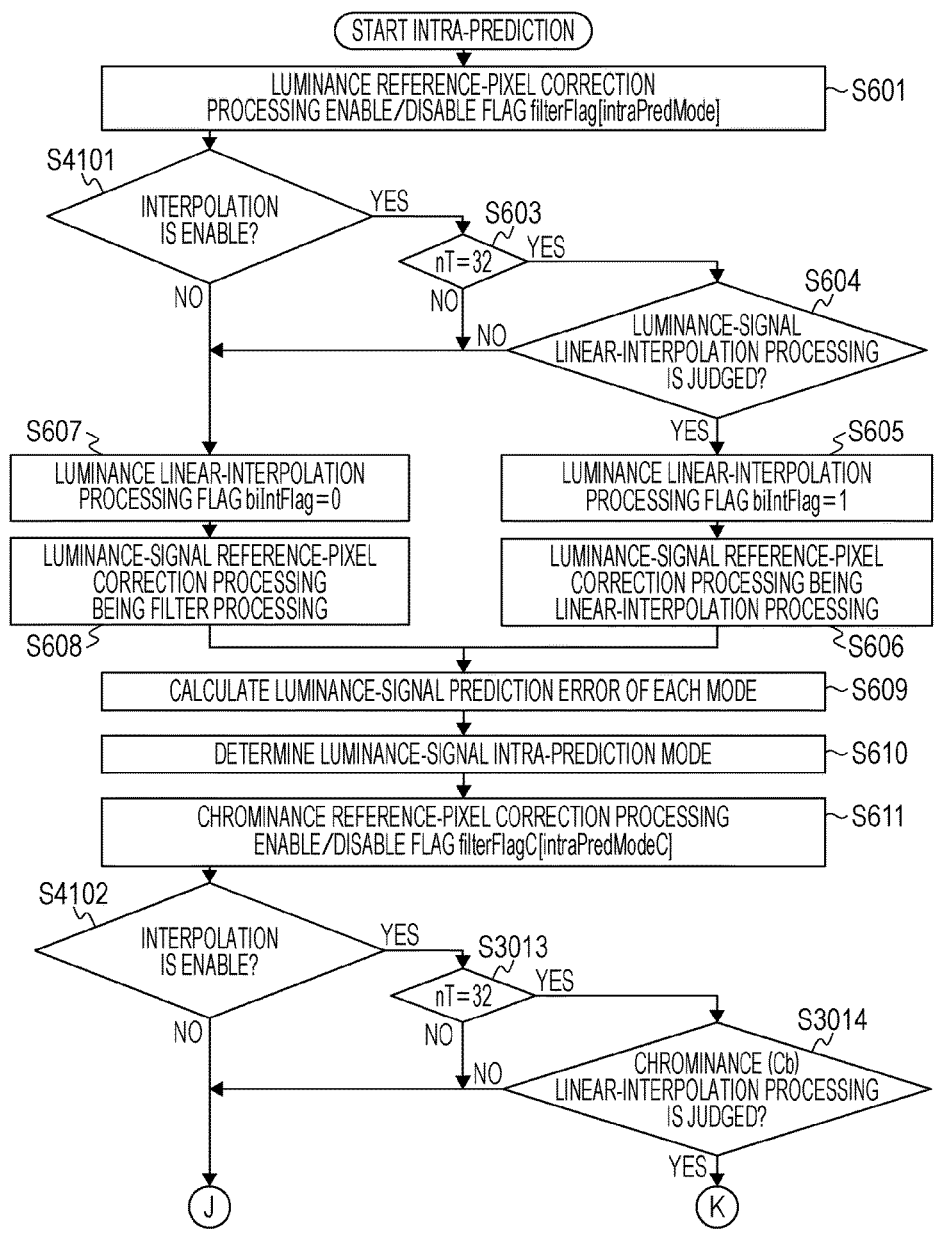

[Fig. 41B]
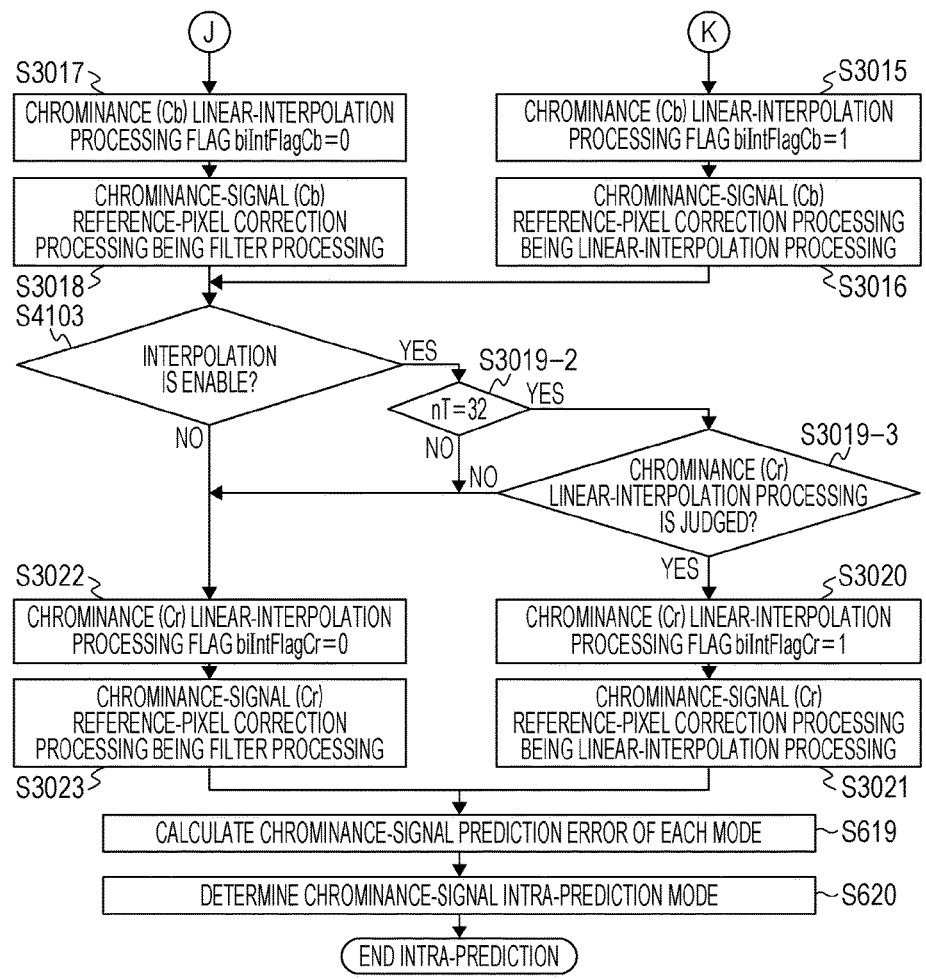

[Fig. 42]
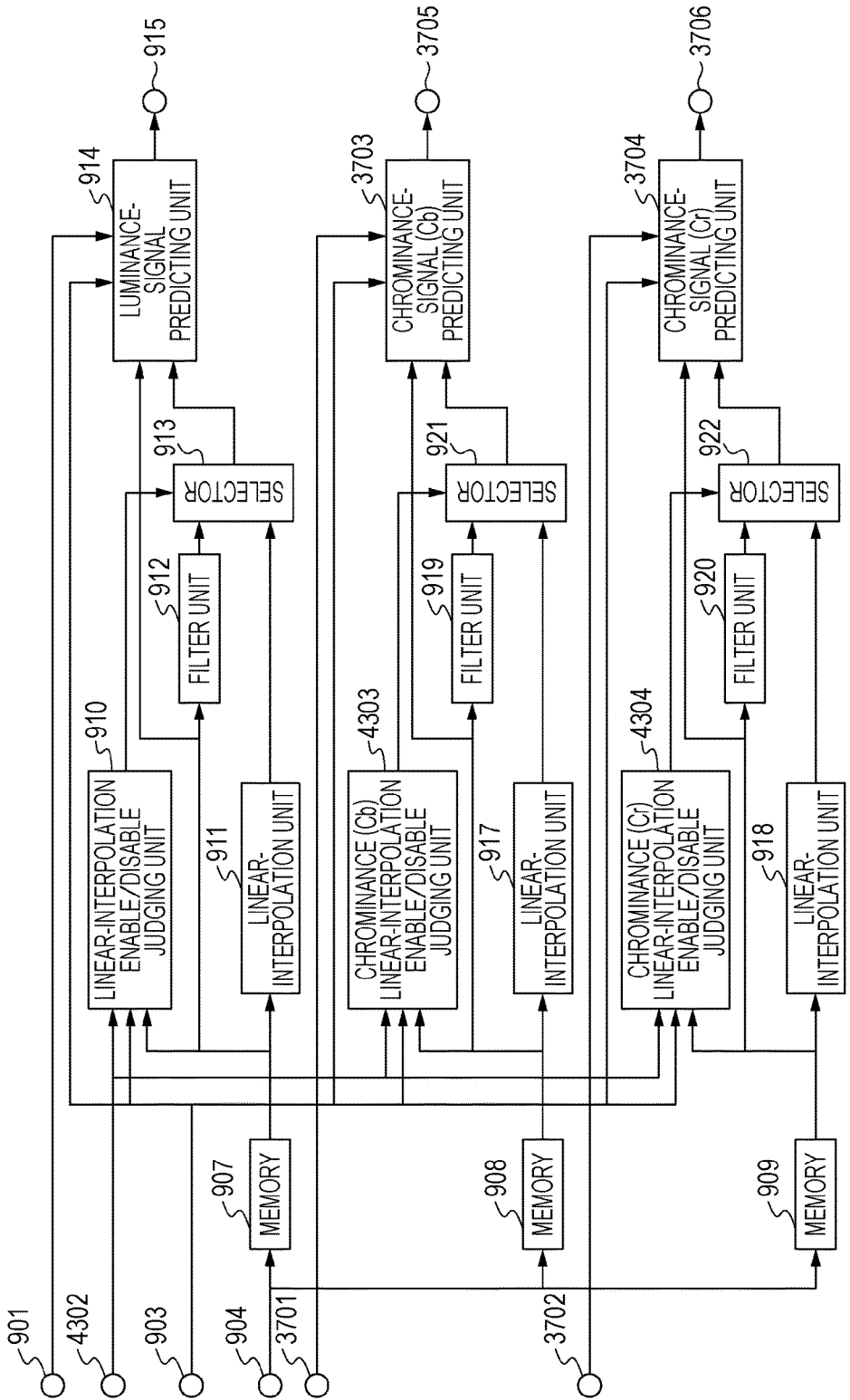

[Fig. 43A]
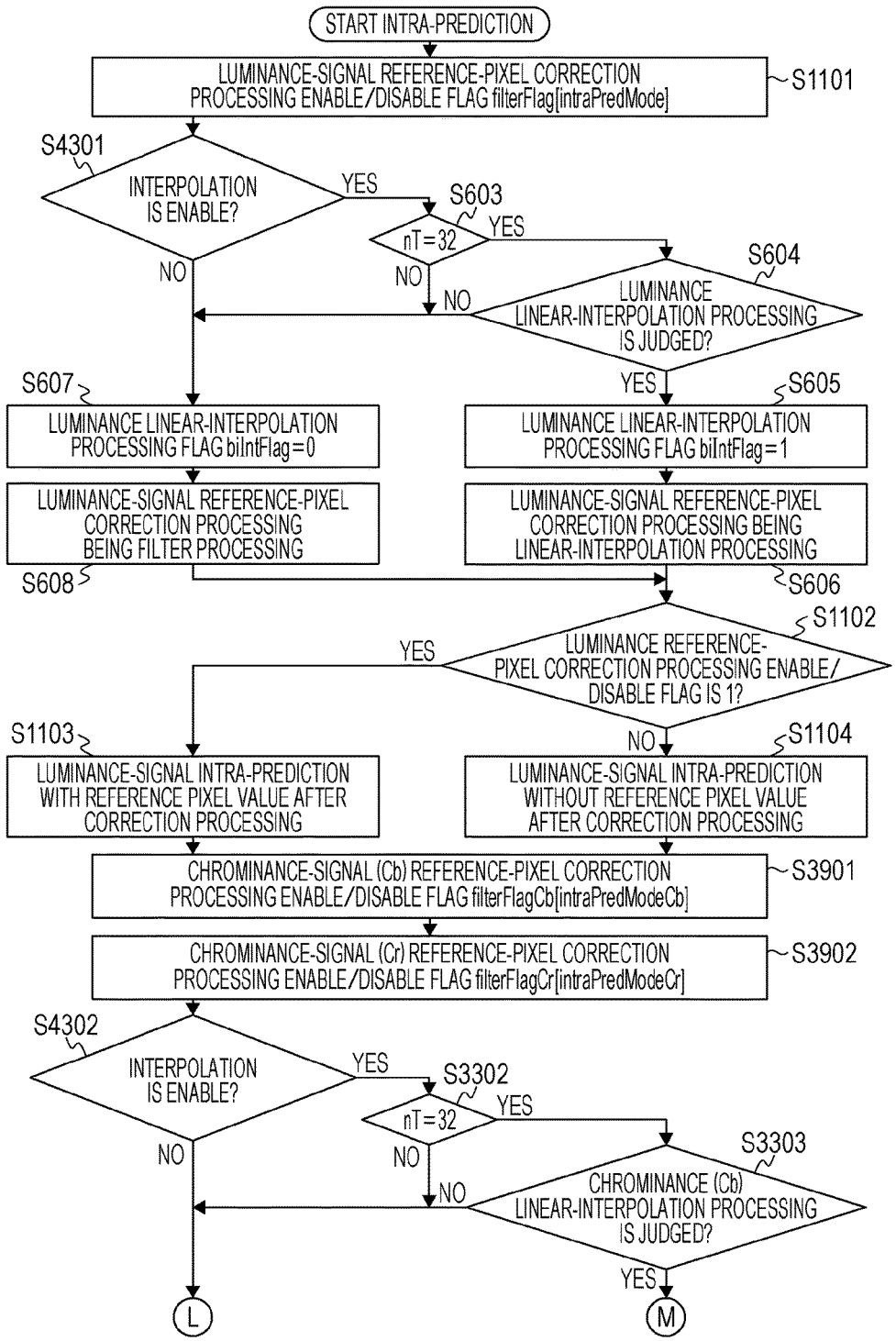

[Fig. 43B]
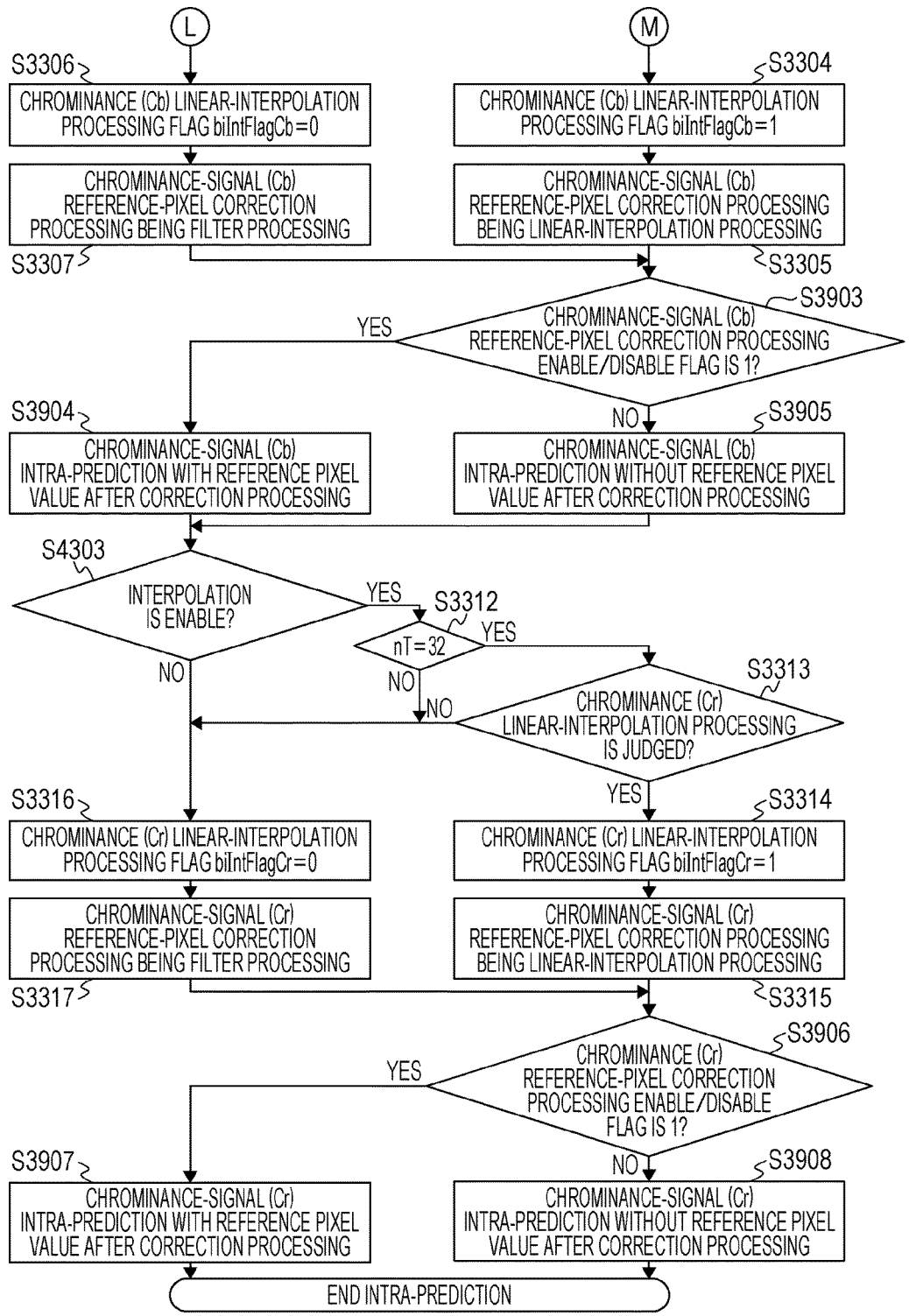

[Fig. 44]
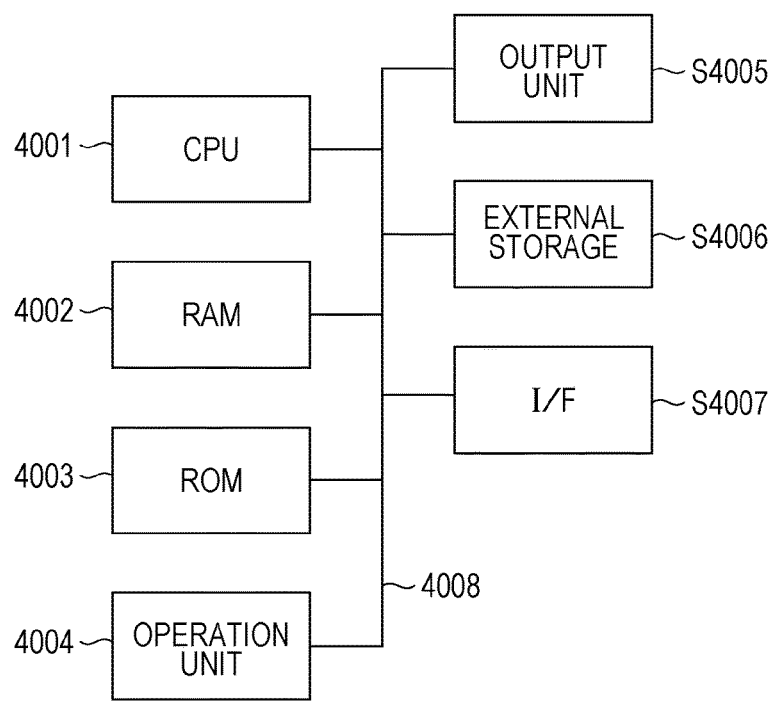

IMAGE DECODING DEVICE AND METHOD OF CHROMINANCE CORRECTION WITH LINEAR-INTERPOLATION

TECHNICAL FIELD

The present invention relates to an image coding device, an image coding method, a program thereof, an image decoding device, an image decoding method, and a program thereof. In particular, the invention relates to a coding method and a decoding method each of which performs linear-interpolation processing on a pixel which is referenced during intra-prediction of a chrominance signal.

BACKGROUND ART

In recent years, working on promoting international standardization of a highly efficient coding scheme as a successor to H.264/MPEG-4 Part 10 Advanced Video Coding (H.264/MPEG-4 AVC, hereinafter, called H.264) has been started. Owing to this, Joint Collaborative Team on Video Coding (JCT-VC) has been established between International Organization for Standardization (ISO)/International Electrotechnical Commission (IEC) and International Telecommunication Union Telecommunication Standardization Sector (ITU-T). JCT-VC advances standardization of High Efficiency Video Coding scheme (hereinafter, called HEVC).

For standardization of HEVC, various coding tools have been developed, and high coding efficiencies have been provided. In particular, HEVC provides coding on the large block basis, such as a block of 32×32 pixels, as compared with conventional H.264. Hence, HEVC can markedly improve the coding efficiency. In HEVC, the number of modes for intra-prediction is increased, and further highly efficient coding can be performed. For reference pixels of the intra-prediction, to improve the coding efficiency, three-tap filter processing may be performed on the reference pixels, as reference-pixel correction processing, in accordance with the prediction mode.

However, since the size of processing block is large, a new problem arises in which propagation of a noise such as contouring may become noticeable in a flat portion of an intra-coding frame. To address this problem, reference-pixel linear-interpolation processing in which coding is performed on a unit of large block such as a 32×32 block has been proposed (See NPL 1). That is, if coded or decoded neighboring luminance pixel values of a block being coded does not have a large gap in pixel values, linear-interpolation processing is performed as the reference-pixel correction processing to obtain a smooth monotone gradient. Accordingly, the block being coded is predicted with reference to the pixel value with the monotone gradient. The linear-interpolation processing is described in detail in NPL 1. Referring to NPL 1, a change in pixel value is judged by using 1×65 pixels in an upper portion and 65×1 pixels in a left portion of the 32×32 block of the luminance signal. If a rapid change is not present as the result of judgment, pixel values at both ends of 1×65 pixels or both ends of 65×1 pixels are used, weighted average values are calculated in accordance with the distance between the pixel values, and the calculated values serves as pixel values of 63 pixels inbetween. With this linear-interpolation processing, the luminance decoded pixel values have a smooth gradient, and a noise such as contouring can be reduced.

Referring to NPL 2, the reference-pixel linear-interpolation processing is applied only to the luminance signal. Also, a condition, in which the block size of the luminance signal is 32×32 or larger, is added to the criterion for application of the reference-pixel linear-interpolation processing. At this time, a block with a smooth gradient is reproduced by the reference-pixel linear-interpolation processing for the luminance; however, a noise such as contouring remains in chrominance. Hence, degradation in image quality occurs. Also, Main profile defined in NPL 1 supports an image with luminance and chrominance signals being 4:2:0. Hence, in case of expansion to 4:4:4 or the like, the luminance and chrominance signals have the same block size. However, since the processing is applied only to the luminance, a noise such as contouring may become noticeable. Further, with H.264, in addition to the combination of luminance and chrominance signals, three primary colors of red, green, blue (RGB) may be used as appropriate signals and may be coded. When a similar function is provided by HEVC, the reference-pixel linear-interpolation processing is performed on only one of the three primary colors. Hence, the processed color does not match other two colors. Also, in case of 4:2:2, the chrominance signal may form a rectangular block, and hence the reference-pixel linear-interpolation processing may not be performed since the processing only supports a square.

CITATION LIST

Non Patent Literature

NPL 1: JCT-VC, contributed article, JCTVC-K0139.doc, Internet <http://phenix.int-evry.fr/jct/doc_end_user/documents/11_Shanghai/wg11/>

NPL 2: JCT-VC, contributed article, JCTVC-K1003_v9.doc, Internet <http://phenix.int-evry.fr/jct/doc_end_user/documents/11_Shanghai/wg11/>

SUMMARY OF INVENTION

To address the above-described problems, the invention provides an image decoding device configured to decode coded data, which is generated by predicting a pixel value of a block being decoded from a pixel in the neighbor of the block being decoded, and coding the pixel value. The image decoding device includes a decoding unit configured to decode the coded data and reproduce a prediction error; a chrominance interpolation unit configured to perform linear-interpolation processing on a chrominance signal of a decoded pixel in the neighbor of the block being decoded; a chrominance interpolation enable/disable information generating unit configured to generate chrominance interpolation enable/disable information representing whether or not the linear-interpolation processing is performed on the decoded chrominance signal on the block basis; a control unit configured to control the chrominance interpolation unit in accordance with the chrominance interpolation enable/disable information; a chrominance-signal predicting unit configured to predict a chrominance signal of the block being decoded from a chrominance signal output from the chrominance interpolation unit or a chrominance signal of the decoded pixel in the neighbor without the linear-interpolation processing; and a reproducing unit configured to reproduce a pixel value of the block being decoded from a result of the prediction for the chrominance signal and the prediction error.

The invention also provides an image coding device configured to predict a pixel value of a block being coded from a pixel in the neighbor of the block being coded, and code the pixel value. The image coding device includes a chrominance interpolation unit configured to perform linear-interpolation processing on a coded chrominance signal in the neighbor of the block being coded; a chrominance interpolation enable/disable information generating unit configured to generate chrominance interpolation enable/disable information representing whether or not the linear-interpolation processing is performed based on the coded chrominance signal on the block basis; a control unit configured to control the chrominance interpolation unit in accordance with the chrominance interpolation enable/disable information; a chrominance-signal predicting unit configured to predict a chrominance signal of a pixel of the block being coded from a chrominance signal output from the chrominance interpolation unit or a coded chrominance signal in the neighbor without the linear-interpolation processing; a calculating unit configured to calculate a prediction error from a result of the prediction of the chrominance signal and a pixel value of the block being coded; and a coding unit configured to code the prediction error and generate coded data.

Further features of the present invention will become apparent from the following description of exemplary embodiments with reference to the attached drawings.

BRIEF DESCRIPTION OF DRAWINGS

FIG. 1 is a block diagram showing a configuration of an image coding device according to a first embodiment.

FIG. 2 is an illustration representing an example of a coding data format according to the first embodiment.

FIG. 3 is a detailed block diagram of an intra-prediction unit in the image coding device according to the first embodiment.

FIG. 4A is an illustration representing a state of pixels used for reference-pixel linear-interpolation according to the first embodiment.

FIG. 4B is an illustration representing a state of pixels used for reference-pixel linear-interpolation according to the first embodiment.

FIG. 5 is a flowchart representing a coding operation in the image coding device according to the first embodiment.

FIG. 6 is a flowchart representing intra-prediction processing in the image coding device according to the first embodiment.

FIG. 7 is a detailed block diagram of a modification of the intra-prediction unit in the image coding device according to the first embodiment.

FIG. 8 is a block diagram showing a configuration of an image decoding device according to a second embodiment.

FIG. 9 is a detailed block diagram of an intra-prediction unit in the image decoding device according to the second embodiment.

FIG. 10 is a flowchart representing a decoding operation in the image decoding device according to the second embodiment.

FIG. 11A is a flowchart representing intra-prediction processing in the image decoding device according to the second embodiment.

FIG. 11B is the flowchart representing the intra-prediction processing in the image decoding device according to the second embodiment.

FIG. 12 is an illustration representing an example of a coding data format according to a third embodiment.

FIG. 13 is a detailed block diagram of an intra-prediction unit in an image coding device according to the third embodiment.

FIG. 14A is an illustration representing a state of pixels used for reference-pixel linear-interpolation according to the third embodiment.

FIG. 14B is an illustration representing a state of pixels used for reference-pixel linear-interpolation according to the third embodiment.

FIG. 15 is a flowchart representing a coding operation in the image coding device according to the third embodiment.

FIG. 16 is a flowchart representing intra-prediction processing in the image coding device according to the third embodiment.

FIG. 17 is a detailed block diagram of an intra-prediction unit in an image decoding device according to a fourth embodiment.

FIG. 18 is a flowchart representing a decoding operation in the image decoding device according to the fourth embodiment.

FIG. 19 is a flowchart representing intra-prediction processing in the image decoding device according to the fourth embodiment.

FIG. 20 is an illustration representing an example of a coding data format according to a fifth embodiment.

FIG. 21 is a detailed block diagram of an intra-prediction unit in an image decoding device according to the fifth embodiment.

FIG. 22 is a flowchart representing a coding operation in the image coding device according to the fifth embodiment.

FIG. 23A is a flowchart representing intra-prediction processing in the image coding device according to the fifth embodiment.

FIG. 23B is the flowchart representing the intra-prediction processing in the image coding device according to the fifth embodiment.

FIG. 24 is a detailed block diagram of an intra-prediction unit in an image decoding device according to a sixth embodiment.

FIG. 25 is a flowchart representing a decoding operation in the image decoding device according to the sixth embodiment.

FIG. 26A is a flowchart representing intra-prediction processing in the image decoding device according to the sixth embodiment.

FIG. 26B is the flowchart representing the intra-prediction processing in the image decoding device according to the sixth embodiment.

FIG. 27 is an illustration representing an example of a coding data format according to a seventh embodiment.

FIG. 28 is a detailed block diagram of an intra-prediction unit in an image coding device according to the seventh embodiment.

FIG. 29 is a flowchart representing a coding operation in the image coding device according to the seventh embodiment.

FIG. 30A is a flowchart representing intra-prediction processing in the image coding device according to the seventh embodiment.

FIG. 30B is the flowchart representing the intra-prediction processing in the image coding device according to the seventh embodiment.

FIG. 31 is a detailed block diagram of an intra-prediction unit in an image decoding device according to an eighth embodiment.

FIG. 32 is a flowchart representing a decoding operation in the image decoding device according to the eighth embodiment.

FIG. 33A is a flowchart representing intra-prediction processing in the image decoding device according to the eighth embodiment.

FIG. 33B is the flowchart representing the intra-prediction processing in the image decoding device according to the eighth embodiment.

FIG. 34 is an illustration representing an example of a coding data format according to a ninth embodiment.

FIG. 35 is a detailed block diagram of an intra-prediction unit in an image coding device according to the ninth embodiment.

FIG. 36 is a flowchart representing a coding operation in the image coding device according to the ninth embodiment.

FIG. 37 is a detailed block diagram of an intra-prediction unit in an image decoding device according to a tenth embodiment.

FIG. 38 is a flowchart representing a decoding operation in the image decoding device according to the tenth embodiment.

FIG. 39A is a flowchart representing intra-prediction processing in the image decoding device according to the tenth embodiment.

FIG. 39B is the flowchart representing the intra-prediction processing in the image decoding device according to the tenth embodiment.

FIG. 40 is a detailed block diagram of an intra-prediction unit in an image coding device according to an eleventh embodiment.

FIG. 41A is a flowchart representing intra-prediction processing in the image coding device according to the eleventh embodiment.

FIG. 41B is the flowchart representing the intra-prediction processing in the image coding device according to the eleventh embodiment.

FIG. 42 is a detailed block diagram of an intra-prediction unit in an image decoding device according to a twelfth embodiment.

FIG. 43A is a flowchart representing intra-prediction processing in the image decoding device according to the twelfth embodiment.

FIG. 43B is the flowchart representing the intra-prediction processing in the image decoding device according to the twelfth embodiment.

FIG. 44 is a block diagram showing a hardware configuration example of a computer that can be applied to an image coding device or an image decoding device according to the invention.

DESCRIPTION OF EMBODIMENTS

The invention of the subject application is described in detail below based on proper embodiments with reference to the accompanying drawings. It is to be noted that configurations described in the following embodiments are merely examples, and the invention is not limited to the illustrated configurations.

First Embodiment

An embodiment of the invention is described below with reference to the drawings. FIG. 1 is a block diagram showing an image coding device according to this embodiment. In FIG. 1, an image input unit 101 reads image data from an external device. In this embodiment, the image data is described as an image with luminance and chrominance signals being 4:2:0. However, it is not limited thereto. A block dividing unit 102 divides the read image data into blocks. In HEVC, the image data is first divided into blocks each having 64×64 pixels, and, if required, each of the blocks is divided into smaller blocks. A linear-interpolation enable/disable determining unit 103 sets whether reference-pixel linear-interpolation processing is enabled or disabled with a luminance signal or a chrominance signal for a sequence, which is set by a user (not shown) with use of this image coding device. Information representing whether the reference-pixel linear-interpolation processing with the luminance signal is enabled or disabled for the sequence to be coded is named luminance interpolation enable/disable information. Also, information representing whether the reference-pixel linear-interpolation processing with the chrominance signal is enabled or disabled is named chrominance interpolation enable/disable information. A header coding unit 104 generates coded data of a header of a sequence and coded data of a header of each frame. An intra-prediction unit 105 performs intra-prediction based on input block data and coded data of pixels. An inter-prediction unit 106 performs inter-prediction using motion compensation, based on input block data and coded data of pixels of a frame.

A prediction determining unit 107 determines whether the intra-prediction is performed or the inter-prediction is performed from the result of the intra-prediction unit 105 and the inter-prediction unit 106, and sets the determined prediction as a coding mode. Further, in case of an intra-prediction coding mode, the prediction determining unit 107 outputs a selected prediction mode and a prediction error. In case of an inter-prediction coding mode, the prediction determining unit 107 outputs reference information such as a motion vector, and a prediction error. A transforming/quantizing unit 108 performs orthogonal transformation for the input prediction error to obtain an orthogonal transformation coefficient, and quantizes the orthogonal transformation coefficient to calculate a quantization coefficient. An entropy coding unit 109 codes the input prediction mode and reference information, and codes the quantization coefficient. The coding method is not particularly limited. For example, Huffman coding, arithmetic coding, or Golomb coding may be used. A dequantizing/inverse-transforming unit 112 performs an inverse operation of the transforming/quantizing unit 108. That is, the dequantizing/inverse-transforming unit 112 receives the quantization coefficient, performs dequantization to reproduce the orthogonal transformation coefficient, and performs inverse orthogonal transformation to reproduce the prediction error. A pixel reproducing unit 113 generates a prediction pixel value with reference to the coded image based on the coding mode, the prediction mode, and the like, adds the reproduced prediction error to the prediction pixel value, and hence reproduces a pixel value of a decoded image. A frame memory 114 stores the reproduced pixel value. An integrating unit 110 integrates the coded data output from the header coding unit 104 and the coded data output from the entropy coding unit 109 in accordance with a coding data format, and hence generates a bit stream. An output unit 111 outputs the bit stream to an external device.

A coding operation of an image in the image coding device is described below. First, before coding an image, the user (not shown) sets luminance interpolation enable/disable information and chrominance interpolation enable/disable information with use of the linear-interpolation enable/disable determining unit 103. The set luminance interpolation enable/disable information and the set chrominance interpolation enable/disable information are input to the header coding unit 104 and the intra-prediction unit 105. The header coding unit 104 codes attributes such as the type and size of the image to be input, a coding profile, the luminance interpolation enable/disable information, and the chrominance interpolation enable/disable information. The header coding unit 104 performs coding in accordance with the format of a sequence parameter set including the above information, and generates a bit stream as shown in FIG. 2. The luminance interpolation enable/disable information is coded as strong_intra_smoothing_enable_flag. The chrominance interpolation enable/disable information is coded as strong_intra_smoothing_chroma_enable_flag. The coded data of the header is input to the integrating unit 110, and is output from the output unit 111 before coding the image.

Then, coding for the image is performed. Image data is input from the image input unit 101. The image data may be a still image or a video. In case of a still image, only intra-prediction is performed, and the inter-prediction unit 106 is not operated. The input image data is input to the block dividing unit 102 on the frame basis. The block dividing unit 102 first divides the image data into blocks each having 64×64 pixels, and, if required, divides each of the blocks into smaller blocks. The divided block and the block size are input to the intra-prediction unit 105 and the inter-prediction unit 106.

The intra-prediction unit 105 performs intra-prediction with reference to a coded neighboring pixel, and outputs an optimal intra-prediction mode, and a prediction error which is the error as the result of the intra-prediction. FIG. 3 shows a detailed block diagram of the intra-prediction unit 105.

In FIG. 3, an input unit 301 receives a luminance block size nT of a block to be coded from the block dividing unit 102 in FIG. 1. An input unit 302 receives the luminance interpolation enable/disable information from the linear-interpolation enable/disable determining unit 103 in FIG. 1. An input unit 303 receives coded pixel value to be referenced for predicting a pixel of the block being coded, from the frame memory 114 in FIG. 1. Regarding the input reference-pixel value, a luminance signal is stored in a memory 306, a first chrominance signal (Cb) is stored in a memory 307, and a second chrominance signal (Cr) is stored in a memory 308. An input unit 304 receives the chrominance interpolation enable/disable information. An input unit 305 receives a pixel value of the block being coded from the block dividing unit 102 in FIG. 1. Regarding the input pixel value of the block being coded, the luminance signal is stored in a memory 325, the first chrominance signal (Cb) is stored in a memory 326, and the second chrominance signal (Cr) is stored in a memory 327.

First, intra-prediction processing is described. A luminance reference-pixel generation-method selecting unit 309 judges whether or not reference-pixel correction processing is performed every intra-prediction mode based on the input block size nT of the luminance signal. The relationship between the block size nT and the direction of the intra-prediction may employ a method described in chapter 8.4.4.2.3 of NPL 2. That is, if each intra-prediction mode is intraPredMode, a smaller one of an absolute value obtained by subtracting 26 from intraPredMode and an absolute value obtained by subtracting 10 from intraPredMode is calculated as minDistVerHor. This minDistVerHor is compared with intraHorVerDistThresh[nT] defined in Table 1. If minDistVerHor is larger than intraHorVerDistThresh[nT] shown in Table 1, the reference-pixel correction processing of the luminance signal is performed. It is assumed that a flag representing whether the reference-pixel correction processing of each intra-prediction mode intraPredMode is performed or not is a reference-pixel correction-processing enable/disable flag filterFlag[intraPredMode]. In this case, it is assumed that the reference-pixel correction-processing enable/disable flag filterFlag[Intra_DC] is 0. If this value is 1 in each mode, the reference-pixel correction processing of the luminance signal is performed. If this value is 0, the processing is not performed.

TABLE 1

|  | nT = 8 | nT = 16 | nT = 32 |
|---|---|---|---|
| intraHorVerDistThresh[nT] | 7 | 1 | 0 |

A luminance linear-interpolation enable/disable judging unit 310 receives whether reference-pixel linear-interpolation processing of the luminance signal is enabled or disabled, which is determined on the sequence basis, from the input unit 302. Also, the luminance linear-interpolation enable/disable judging unit 310 receives the block size nT of the luminance signal of the block being coded from the input unit 301 and a pixel value of the luminance signal in the neighbor to be referenced from the memory 306. For the luminance signal, the luminance linear-interpolation enable/disable judging unit 310 determines whether the reference-pixel linear-interpolation processing of the luminance signal of the block being coded is performed or not from the luminance interpolation enable/disable information and the pixel value of the reference pixel of the luminance signal of the block being coded. It is assumed that information representing whether the reference-pixel linear-interpolation processing of the luminance signal on the block basis is performed or not is a luminance linear-interpolation processing flag biIntFlag. The value of the luminance linear-interpolation processing flag is 1 if the reference-pixel linear-interpolation processing is performed on the luminance signal, and the value is 0 if the processing is not performed. For judgment with the pixel value of the reference pixel of the luminance signal of the block being coded may employ a judgment method described in NPL 2. That is, if a coordinate of an upper left corner of the block being coded is an origin (0, 0), the luminance signal of a neighboring pixel to be referenced is Yp(x, y). FIG. 4A shows an arrangement example of pixels of a luminance signal. Each block represents a pixel, and a block of 32×32 pixels serves as a block being coded. At this time, if the luminance interpolation enable/disable information represents the enable state, if the block size nT of the luminance signal is 32, and if the following conditions are true, $$Yp(-1,-1)+Yp(2*nT-1,-1)-2*Yp(nT-1,-1)<Th1, \text{ and}$$

$$Yp(-1,-1)+Yp(-1,2*nT-1)-2*Yp(-1,nT-1)<Th2 \quad (1),$$

the luminance-signal linear-interpolation processing is performed, and the luminance linear-interpolation processing flag biIntFlag is set at 1. When Th1 and Th2 are thresholds and By is a bit depth of luminance, the following expressions are established, $$Th1=1<<(By-5), \text{ and}$$

$$Th2=1<<(By-5) \quad (2),$$

where the thresholds Th1 and Th2 in this embodiment are each 8, and a sign << represents a bit shift to the left.

If the luminance interpolation enable/disable information indicates the disable state, if the block size nT of the luminance signal is other than 32, or if at least one of Expressions (1) is false, the linear-interpolation processing of the luminance signal is not performed. At this time, the luminance linear-interpolation processing flag biIntFlag is set at 0. The luminance linear-interpolation processing flag biIntFlag is input to a selector 313.

A linear-interpolation unit 311 reads luminance neighboring reference pixel values of the block being coded from the memory 306. If a read pixel value is Yp(x, y) and if a pixel value after the linear-interpolation processing is Yp'(x, y), the values are obtained as follows:

$Yp'(-1,-1)=Yp(-1,-1),$ $Yp'(63,-1)=Yp(63,-1),$ $Yp'(-1,63)=Yp(-1,63),$ $Yp'(x,-1)=Yp(-1,-1)+(x+1)(Yp(63,-1)-Yp(-1,-1)+32)$
$>>6(\text{where } x=0 \text{ to } 62),$ and $Yp'(-1,y)=Yp(-1,-1)+(y+1)(Yp(-1,63)-Yp(-1,-1)+32)$
$>>6(\text{where, } y=0 \text{ to } 62)$ (3), where a sign >> represents a bit shift to the right.

A filter unit 312 reads the reference pixel value of the luminance signal in the neighbor of the block being coded from the memory 306, performs three-tap filter processing, and hence corrects the reference pixel value. The three-tap filter is expressed as follows:

$Yp'(63,-1)=Yp(63,-1),$ $Yp'(-1,63)=Yp(-1,63),$ $Yp'(-1,-1)=(Yp(-1,0)+2*Yp(-1,-1)+Yp(0,-1)+2)>>2,$ $Yp'(x,-1)=(Yp(x-1,-1)+2*Yp(x,-1)+Yp(x+1,-1)+2)$
$>>2, \text{ and}$ $Yp'(-1,y)=(Yp(-1,y+1)+2*Yp(-1,y)+Yp(-1,y-1)+2)>>2$ (4).

The luminance signal after the linear-interpolation processing and the luminance signal after the filter processing are input to the selector 313. If the luminance linear-interpolation processing flag biIntFlag is 1, the selector 313 outputs the luminance signal after the linear-interpolation processing by the linear-interpolation unit 311. In contrast, if 0, the selector 313 outputs the luminance signal after the filter processing by the filter unit 312. The reference pixel of the luminance signal after either of these corrections is input to a luminance-signal prediction-mode determining unit 314.

The luminance-signal prediction-mode determining unit 314 receives the reference pixel value of the luminance signal with the correction processing performed, from the selector 313, and the reference pixel value without the correction processing, from the memory 306. Also, the luminance-signal prediction-mode determining unit 314 receives filterFlag[0 . . . 34], which represents whether or not the reference-pixel correction processing of the luminance signal is performed every prediction mode, from the luminance reference-pixel generation-method selecting unit 309. Further, the luminance-signal prediction-mode determining unit 314 receives the pixel value of the luminance signal of the block being coded from the memory 325.

The luminance-signal prediction-mode determining unit 314 first calculates a prediction error every intra-prediction mode. To calculate the prediction error, the luminance-signal prediction-mode determining unit 314 selects whether the reference pixel value with the reference-pixel correction processing performed is used or the pixel value without the processing is used, as the reference pixel of the luminance signal, in accordance with filterFlag[0 . . . 34]. With use of the selected reference pixel value of the luminance signal, a luminance-signal prediction pixel value is calculated by using the reference pixel value according to the intra-prediction mode. The calculated luminance-signal prediction pixel value is compared with the pixel value of the block being coded, and the prediction error of the luminance signal is calculated. Further, prediction errors of the luminance signal of respective intra-prediction modes are compared, and a prediction mode that provides the smallest prediction error is used as the intra-prediction mode of the luminance signal of the block being coded. The intra-prediction mode of the luminance signal is input to the prediction determining unit 107 in FIG. 1 through an output unit 315. Also, the smallest prediction error of the luminance signal is output to the prediction determining unit 107 in FIG. 1 through an output unit 316.

Intra-prediction processing of the chrominance signal is performed in parallel to the intra-prediction processing of the luminance signal. A chrominance reference-pixel generation-method selecting unit 317 judges whether or not reference-pixel correction processing is performed every intra-prediction mode of the chrominance signal based on the input block size nT of the luminance signal. In this embodiment, since the signal is 4:2:0, the chrominance signal is a block of (nT/2)×(nT/2) pixels. That is, if each intra-prediction mode of the chrominance signal is intraPredModeC, a smaller one of an absolute value obtained by subtracting 26 from intraPredModeC and an absolute value obtained by subtracting 10 from intraPredModeC is calculated as minDistVerHor. This minDistVerHor is compared with intraHorVerDistThreshC[nT] defined in Table 2. If minDistVerHor is larger than intraHorVerDistThreshC[nT] shown in Table 2, the reference-pixel correction processing of the chrominance signal is performed. It is assumed that a flag representing whether the reference-pixel correction processing of the chrominance signal of each intra-prediction mode intraPredModeC is performed or not is a chrominance reference-pixel correction processing enable/disable flag filterFlagC[intraPredModeC]. If the value of each intra-prediction mode is 1, the reference-pixel correction processing of the chrominance signal is performed. If this value is 0, the processing is not performed.

TABLE 2

|  | nT = 8 | nT = 16 | nT = 32 |
|---|---|---|---|
| intraHorVerDistThreshC[nT] | 10 | 7 | 1 |

A chrominance linear-interpolation enable/disable judging unit 318 receives chrominance interpolation enable/disable information determined on the sequence basis from the input unit 304. Also, the chrominance linear-interpolation enable/disable judging unit 318 receives the block size nT of the luminance signal of the block being coded from the input unit 301. Further, the chrominance linear-interpolation enable/disable judging unit 318 receives a pixel value of a chrominance signal (Cb) in the neighbor to be referenced, from the memory 307, and a pixel value of a chrominance signal (Cr) in the neighbor to be referenced, from the memory 308. For the chrominance signal, the chrominance linear-interpolation enable/disable judging unit 318 determines whether the reference-pixel linear-interpolation processing of the chrominance signal of the block being coded is performed or not from the chrominance interpolation enable/disable information and the pixel value of the reference pixel of the chrominance signal of the block being coded. It is assumed that information representing whether the reference-pixel linear-interpolation processing of the chrominance signal on the block basis is performed or not is a chrominance linear-interpolation processing flag biIntFlagC. Judgment by the pixel value of the reference pixel of the chrominance signal of the block being coded is described below. If a coordinate of an upper left corner of the block being coded is an origin (0, 0), the chrominance signal (Cb) of a neighboring pixel to be referenced is Cbp(x, y), and the chrominance signal (Cr) of the neighboring pixel to be referenced is Crp(x, y). FIG. 4B shows an arrangement example of pixels of a chrominance signal. Each block represents a pixel, and a block of 16×16 pixels serves as a block being coded. At this time, if the chrominance interpolation enable/disable information represents the enable state, if the block size nT of the luminance signal is 32, and if all following conditions are true, $$Cbp(-1,-1)+Cbp(nT-1,-1)-2*Cbp((nT/2-1),-1)<Thc1,$$

$$Cbp(-1,-1)+Cbp(-1,nT-1)-2*Cbp(-1,(nT/2-1))<Thc2,$$

$$Crp(-1,-1)+Crp(nT-1,-1)-2*Crp((nT/2-1),-1)<Thc1, \text{ and}$$

$$Crp(-1,-1)+Crp(-1,nT-1)-2*Crp(-1,(nT/2-1))<Thc2 \qquad (5),$$

the chrominance signal (Cb, Cr) reference-pixel linear-interpolation processing is performed, and the chrominance linear-interpolation processing flag biIntFlagC is set at 1. When Th1 and Th2 are thresholds, and Bc is a bit depth of chrominance, the following expressions are established, $$Thc1=1<<(Bc-5), \text{ and}$$

$$Thc2=1<<(Bc-5) \qquad (6),$$

where the thresholds Thc1 and Thc2 in this embodiment are each 8.

If the chrominance interpolation enable/disable information indicates the disable state, if the block size nT of the luminance signal is other than 32, or at least one of Expressions (5) is false, the linear-interpolation processing of the chrominance signal is not performed. At this time, the chrominance linear-interpolation processing flag biIntFlagC is set at 0. The chrominance linear-interpolation processing flag biIntFlagC is input to selectors 323 and 324.

A linear-interpolation unit 319 reads a reference pixel value of a chrominance signal (Cb) in the neighbor of the block being coded from the memory 307. If the read pixel value is Cbp(x, y) and the pixel value after the linear-interpolation processing is Cbp'(x, y), the values are obtained as follows:

$$Cbp'(-1,-1)=Cbp(-1,-1),$$

$$Cbp'(31,-1)=Cbp(31,-1),$$

$$Cbp'(-1,31)=Cbp(-1,31),$$

$$Cbp'(x,-1)=Cbp(-1,-1)+(x+1)(Cbp(31,-1)-Cbp(-1,-1)+16)>>5(\text{where, } x=0 \text{ to } 30), \text{ and}$$

$$Cbp'(-1,y)=Cbp(-1,-1)+(y+1)(Cbp(-1,31)-Cbp(-1,-1)+16)>>5(\text{where, } y=0 \text{ to } 30) \qquad (7).$$

Similarly, a linear-interpolation unit 320 reads a reference pixel value of a chrominance signal (Cr) in the neighbor of the block being coded from the memory 308. If the read pixel value is Crp(x, y) and the pixel value after the linear-interpolation processing is Crp'(x, y), the values are obtained as follows:

$$Crp'(-1,-1)=Crp(-1,-1),$$

$$Crp'(31,-1)=Crp(31,-1),$$

$$Crp'(-1,31)=Crp(-1,31),$$

$$Crp'(x,-1)=Crp(-1,-1)+(x+1)(Crp(31,-1)-Crp(-1,-1)+16)>>5(\text{where } x=0 \text{ to } 30), \text{ and}$$

$$Crp'(-1,y)=Crp(-1,-1)+(y+1)(Crp(-1,31)-Crp(-1,-1)+16)>>5(\text{where } y=0 \text{ to } 30) \qquad (8).$$

A filter unit 321 reads the reference pixel value of the chrominance signal (Cb) in the neighbor of the block being coded from the memory 307, performs three-tap filter processing, and hence corrects the reference pixel value of the chrominance signal (Cb). Similarly, a filter unit 322 reads the reference pixel value of the chrominance signal (Cr) in the neighbor of the block being coded from the memory 308, performs three-tap filter processing, and hence corrects the reference pixel value of the chrominance signal (Cr).

The chrominance signal (Cb) after the linear-interpolation processing and the chrominance signal (Cb) after the filter processing are input to the selector 323. If the chrominance linear-interpolation processing flag biIntFlagC is 1, the selector 323 outputs the chrominance signal (Cb) after the linear-interpolation processing by the linear-interpolation unit 319. In contrast, if 0, the selector 323 outputs the chrominance signal (Cb) after the filter processing by the filter unit 321. The reference pixel of the chrominance signal (Cb) after either of these corrections is input to a chrominance-signal prediction-mode determining unit 328. Similarly, the chrominance signal (Cr) after the linear-interpolation processing and the chrominance signal (Cr) after the filter processing are input to the selector 324. If the chrominance linear-interpolation processing flag biIntFlagC is 1, the selector 324 outputs the chrominance signal (Cr) after the linear-interpolation processing by the linear-interpolation unit 320. In contrast, if 0, the selector 324 outputs the chrominance signal (Cr) after the filter processing by the filter unit 322. The reference pixel of the chrominance signal (Cr) after either of these corrections is input to the chrominance-signal prediction-mode determining unit 328.

The chrominance-signal prediction-mode determining unit 328 receives the reference pixel value of the chrominance signal (Cb) with the correction processing performed, from the selector 323, and the reference pixel value of the chrominance signal (Cb) without the correction processing, from the memory 307. The chrominance-signal prediction-mode determining unit 328 receives the reference pixel value of the chrominance signal (Cr) with the correction processing performed, from the selector 324, and the reference pixel value of the chrominance signal (Cr) without the correction processing, from the memory 308. Also, the chrominance-signal prediction-mode determining unit 328 receives filterFlagC[0 . . . 34], which represents whether or not the reference-pixel correction processing of the chrominance signal is performed every prediction mode, from the chrominance reference-pixel generation-method selecting unit 317. Further, the chrominance-signal prediction-mode determining unit 328 receives the pixel value of the chrominance signal (Cb) of the block being coded from the memory 326, and the pixel value of the chrominance signal (Cr) of the block being coded from the memory 327.

The chrominance-signal prediction-mode determining unit 328 first calculates a prediction error every intra-prediction mode. To calculate the prediction error, the chrominance-signal prediction-mode determining unit 328 selects whether the reference pixel values with the reference-pixel correction processing performed are used or the pixel values without the processing are used, as the reference pixels of the chrominance signal (Cb) and the chrominance signal (Cr), in accordance with filterFlagC[0 . . . 34]. By using the selected reference pixel values of the chrominance signal (Cb) and the chrominance signal (Cr), the chrominance-signal prediction-mode determining unit 328 calculates a prediction pixel value of the chrominance signal (Cb) and a prediction pixel value of the chrominance signal (Cr) according to the intra-prediction mode. The calculated prediction pixel value of the chrominance signal (Cb) and the calculated prediction pixel value of the chrominance signal (Cr) are compared, and a prediction mode that provides the smallest prediction errors are used as the intra-prediction mode of the chrominance signal of the block being coded. The comparing method is not particularly limited; however, the sums of absolute values of the prediction errors of the chrominance signal (Cb) and the prediction errors of the chrominance signal (Cr) in the respective intra-prediction modes may be compared. The intra-prediction mode of the chrominance signal is input to the prediction determining unit 107 in FIG. 1 through an output unit 329. Also, the smallest prediction errors of the chrominance signal (Cb) and the chrominance signal (Cr) are output to the prediction determining unit 107 in FIG. 1 through an output unit 330.

Referring back to FIG. 1, the calculated prediction errors of the luminance signal and the respective chrominance signals are input to the prediction determining unit 107. Also, the inter-prediction unit 106 reads the pixel value of the block being coded and the coded pixel value from the frame memory 114, and obtains a prediction error if the inter-prediction is performed by the motion compensation, and reference information, such as a motion vector and reference frame information. These are also input to the prediction determining unit 107.

The prediction determining unit 107 determines a coding mode in accordance with the information such as the prediction error input from the intra-prediction unit 105 and the inter-prediction unit 106, and outputs the coding mode to the entropy coding unit 109. The coding mode includes information required for prediction. That is, an intra-prediction coding mode includes an intra-prediction mode, and an inter-prediction coding mode includes reference information. Also, a prediction error of the selected coding mode is selected, and is output to the transforming/quantizing unit 108. The transforming/quantizing unit 108 performs orthogonal transformation on the input prediction errors of the respective signals and performs quantization to calculate quantization coefficients of the respective signals. The calculated quantization coefficients are input to the entropy coding unit 109 and the dequantizing/inverse-transforming unit 112. The entropy coding unit 109 codes information relating to the input block size of the block being coded, and the coding mode, codes the quantization coefficients of the prediction errors, and hence obtains coded data. The obtained coded data is input to the integrating unit 110, is integrated in accordance with the coding data format, and generates a bit stream. The generated bit stream is output from the output unit 111.

Meanwhile, the quantization coefficients input to the dequantizing/inverse-transforming unit 112 reproduce the prediction errors of the respective signals through dequantization and inverse-transformation. The reproduced prediction errors of the respective signals are input to the pixel reproducing unit 113. The pixel reproducing unit 113 generates prediction pixel values of the respective signals with reference to images of the coded respective signals based on the coding mode. The generated prediction pixel values of the respective signals are added to the reproduced prediction errors of the respective signals, and pixel values of a decoded image are reproduced. The reproduced image data is stored in the frame memory 114.

FIG. 5 is a flowchart representing coding processing in the image coding device according to the first embodiment.

In step S501, the linear-interpolation enable/disable determining unit 103 sets luminance interpolation enable/disable information. In step S502, the linear-interpolation enable/disable determining unit 103 sets chrominance interpolation enable/disable information. In step S503, the header coding unit 104 codes a sequence header. At this time, luminance interpolation enable/disable information strong_intra_smoothing_enable_flag is coded. Then, chrominance interpolation enable/disable information strong_intra_smoothing_chroma_enable_flag is coded. In step S504, the coding device inputs a single frame of image data to be coded. In step S505, the block dividing unit 102 first divides the input image data into blocks of 64×64 pixels, and, if required, further divides each of the blocks into smaller blocks.

In step S506, the intra-prediction unit 105 performs intra-prediction processing. FIG. 6 is a flowchart expressing a detailed operation of the intra-prediction processing.

First, processing for a luminance signal is performed. In step S601, the luminance reference-pixel generation-method selecting unit 309 determines a reference-pixel correction-processing enable/disable flag filterFlag[0 . . . 34] of the luminance signal expressing whether reference-pixel correction processing of each prediction mode of the luminance signal is enabled or disabled. The reference-pixel correction-processing enable/disable flag of the luminance signal is determined on the basis of the block size nT of the luminance signal of the block being coded.

In step S602, the luminance linear-interpolation enable/disable judging unit 310 judges the luminance interpolation enable/disable information of the block being coded set in step S501. If the luminance interpolation enable/disable information is set at the enable state, the process advances to step S603, and if not, the process advances to step S607. In step S603, the luminance linear-interpolation enable/disable judging unit 310 judges whether or not the block size nT of the luminance signal of the block being coded is 32, if 32, the process advances to step S604, and if not, the process advances to step S607. In step S604, the luminance linear-interpolation enable/disable judging unit 310 judges whether or not luminance-signal linear-interpolation processing is performed in accordance with Expressions (1) using the luminance signal in the neighbor, which is a reference pixel of the luminance signal of the block being coded. If Expressions (1) are true, the process advances to step S605, and if not, the process advances to step S607.

In step S605, the luminance linear-interpolation enable/disable judging unit 310 sets a luminance linear-interpolation processing flag biIntFlag at 1 to perform reference-pixel linear-interpolation processing. In step S606, the linear-interpolation unit 311 performs the reference-pixel linear-interpolation processing on the pixel value in the neighbor for performing intra-prediction of the luminance signal of the block being coded.

In step S607, the luminance linear-interpolation enable/disable judging unit 310 sets the luminance linear-interpolation processing flag biIntFlag at 0 not to perform the reference-pixel linear-interpolation processing. In step S608, the filter unit 312 performs the filter processing on the pixel value in the neighbor for performing the intra-prediction of the luminance signal of the block being coded.

In step S609, the luminance-signal prediction-mode determining unit 314 calculates prediction errors of a luminance signal in respective prediction modes. In step S610, the luminance-signal prediction-mode determining unit 314 compares the prediction errors of the luminance signal in the respective intra-prediction modes, and determines an intra-prediction mode with the smallest prediction error as an intra-prediction mode of the luminance signal of the block being coded. Also, the smallest prediction error is used as the prediction error of the luminance signal of the block being coded.

Then, processing for a chrominance signal is performed. In step S611, the chrominance reference-pixel generation-method selecting unit 317 determines a chrominance reference-pixel correction-processing enable/disable flag filter-FlagC[0 . . . 34] of the chrominance signal expressing whether reference-pixel correction processing of each intra-prediction mode of the chrominance signal is enabled or disabled. The chrominance reference-pixel correction-processing enable/disable flag of the chrominance signal is determined on the basis of the block size nT of the luminance signal of the block being coded.

In step S612, the chrominance linear-interpolation enable/disable judging unit 318 judges the chrominance interpolation enable/disable information set in step S502. If the chrominance interpolation enable/disable information is set at the enable state, the process advances to step S613, and if not, the process advances to step S617. In step S613, the chrominance linear-interpolation enable/disable judging unit 318 judges whether or not the block size nT of the luminance signal of the block being coded is 32, if 32, the process advances to step S614, and if not, the process advances to step S617. In step S614, the chrominance linear-interpolation enable/disable judging unit 318 judges whether or not reference-pixel linear-interpolation processing of the chrominance signal is performed in accordance with Expressions (5) using the chrominance signal in the neighbor, which is a reference pixel of the chrominance signal of the block being coded. If all Expressions (5) are true, the process advances to step S615, and if not, the process advances to step S617.

In step S615, the chrominance linear-interpolation enable/disable judging unit 318 sets a chrominance linear-interpolation processing flag biIntFlagC at 1 to perform the reference-pixel linear-interpolation processing of the chrominance signal. In step S616, the linear-interpolation unit 319 and the linear-interpolation unit 320 perform the linear-interpolation processing on the pixel value in the neighbor for performing intra-prediction of the chrominance signal of the block being coded.

In step S617, the chrominance linear-interpolation enable/disable judging unit 318 sets the chrominance linear-interpolation processing flag biIntFlagC at 0 not to perform the reference-pixel linear-interpolation processing of the chrominance signal. In step S618, the filter unit 321 and the filter unit 322 perform the filter processing on the pixel values in the neighbor for performing the intra-prediction of the chrominance signal of the block being coded.

In step S619, the chrominance-signal prediction-mode determining unit 328 calculates prediction errors of the chrominance signal in respective prediction modes. In step S620, the chrominance-signal prediction-mode determining unit 328 compares the prediction errors of the chrominance signal in the respective intra-prediction modes, and determines an intra-prediction mode with the smallest prediction error as an intra-prediction mode of the chrominance signal of the block being coded. Also, the smallest prediction error is used as the prediction error of the chrominance signal of the block being coded.

Referring back to FIG. 5, in step S507, the inter-prediction unit 106 performs motion compensation on the block being coded with reference to image data of other frame, and performs inter-prediction. In step S508, the prediction determining unit 107 determines the coding mode based on the result of the intra-prediction in step S506 and the result of the inter-prediction in step S507. In step S509, the entropy coding unit 109 codes the coding mode. In step S510, the transforming/quantizing unit 108 performs orthogonal transformation and quantization on the prediction error when the coding mode is selected, to calculate a quantization coefficient. In step S511, the entropy coding unit 109 performs entropy coding on the obtained quantization coefficient of each signal. In step S512, the integrating unit 110 integrates respective pieces of the coded data, generates a bit stream, and outputs the bit stream. In step S513, the dequantizing/inverse-transforming unit 112 dequantizes the quantization coefficient calculated in step S510, performs inverse transformation, and reproduces the prediction error. In step S514, the pixel reproducing unit 113 performs prediction based on the coding mode determined in step S508, obtains a prediction image, reproduces an image in accordance with the prediction error reproduced in step S513, and outputs the image to the frame memory 114. In step S515, the coding device judges whether or not the coding processing is completed for all divided blocks. If processing on all blocks is completed, the process advances to step S516. If not, the next block is input in step S505. In step S516, the coding device judges whether or not the coding processing is completed for all frames. If the coding processing on all frames is not completed, image data of the next frame is input in step S504. If the coding processing on all frames is completed, the coding processing is ended.

With the above-described configurations and operations, in the image coding, the linear-interpolation processing can be performed on the reference pixel of the intra-prediction of the chrominance signal in addition to the luminance signal. A noise like contouring in chrominance is reduced. Since it can be determined whether the reference-pixel linear-interpolation processing of the chrominance signal is enabled or disabled, regardless of the enable/disable state of the reference-pixel linear-interpolation processing of the luminance signal, a noise generated only in chrominance can be reduced.

This embodiment is described that an image signal is 4:2:0, and a pixel includes 8 bits. However, it is not limited thereto. For example, an image signal may be 4:2:2 or 4:4:4, and a pixel of image data may include 10 bits. Also, this embodiment is described that the maximum size of a divided block is 64×64 pixels, and the block size for performing the linear-interpolation processing is 32×32 pixels. However, it is not limited thereto. Also, the block is not limited to a square block, and may be a rectangular block.

Also, the luminance linear-interpolation processing flag biIntFlag and the chrominance linear-interpolation processing flag biIntFlagC are each a one-bit signal. However, it is not limited thereto. As shown in FIG. 7, the signal may be a signal for switching a plurality of linear-interpolation units. That is, a luminance linear-interpolation enable/disable judging unit 710 may make judgment to select one of the linear-interpolation unit 311 and an interpolation unit 711 with a different method of interpolation processing, as the linear-interpolation processing of the luminance signal. A selector 713 selects one of inputs of the filter unit 312, the linear-interpolation unit 311, and the interpolation unit 711, and inputs the selected input to the luminance-signal prediction-mode determining unit 314. This is similarly applied to chrominance. A chrominance linear-interpolation enable/disable judging unit 718 may make judgment to select one of the linear-interpolation unit 319 and an interpolation unit 719 with a different method of interpolation processing, and one of the linear-interpolation unit 320 and an interpolation unit 720 with a different method of interpolation processing. A selector 723 selects one of inputs of the filter unit 321, the linear-interpolation unit 319, and the interpolation unit 719, and inputs the selected input to the chrominance-signal prediction-mode determining unit 328. A selector 724 selects one of inputs of the filter unit 322, the linear-interpolation unit 320, and the interpolation unit 720, and inputs the selected input to the chrominance-signal prediction-mode determining unit 328. Accordingly, optimal linear interpolation can be applied.

In this embodiment, intraHorVerDistThreshC[nT] of the chrominance signal is determined in accordance with the block size nT of the luminance signal, as shown in Table 2. However, it is not limited thereto, and intraHorVerDistThreshC[nT] of the chrominance signal may be determined by using the block size of the chrominance signal.

Second Embodiment

FIG. 8 is a block diagram showing a configuration of an image decoding device according to a second embodiment of the invention. In this embodiment, decoding of the coded data generated in the first embodiment is described as an example.

An input unit 801 reads the bit stream generated in the first embodiment. A separating unit 802 separates coded data of a header and coded data of each block from the input bit stream. A header decoding unit 803 decodes the separated coded data of the header, and decodes information required for decoding, such as the size of an image. Also, the header decoding unit 803 decodes strong_intra_smoothing_enable_flag representing the luminance interpolation enable/disable information. Further, the header decoding unit 803 decodes strong_intra_smoothing_chroma_enable_flag representing the chrominance interpolation enable/disable information.

A linear-interpolation enable/disable setting unit 804 sets whether linear-interpolation processing is enabled or disabled in the entire sequence of each signal from these pieces of information. An entropy decoding unit 805 decodes coded data on the block basis. The entropy decoding unit 805 decodes a coding mode and information required for prediction, and decodes a quantization coefficient of a prediction error of each signal. An intra-prediction unit 806 performs intra-prediction by using decoded neighboring pixel value from the obtained intra-prediction mode of the luminance signal and the obtained intra-prediction mode of the chrominance signal, and calculates a prediction pixel value. An inter-prediction unit 807 performs prediction through motion compensation by using the decoded pixel value of a frame from reference information, such as a motion vector and reference frame information, obtained through decoding, and calculates a prediction pixel value of the luminance signal and a prediction pixel value of the chrominance signal. A dequantizing/inverse-transforming unit 808 receives the quantization coefficient, performs dequantization to reproduce an orthogonal transformation coefficient, and performs inverse orthogonal transformation to reproduce a prediction error of the luminance signal and a prediction error of the chrominance signal. A pixel reproducing unit 809 adds the input prediction pixel value of the luminance signal to the reproduced prediction error of the luminance signal to reproduce a pixel value of the luminance signal of a decoded image. Simultaneously, the pixel reproducing unit 809 adds the input prediction pixel value of the chrominance signal to the reproduced prediction error of the chrominance signal to reproduce a pixel value of the chrominance signal of the decoded image. The reproduced pixel values of each block are output to a frame memory 811 and a block integrating unit 810. The frame memory 811 stores reproduced image data as reference pixels for prediction. The block integrating unit 810 collects decoded image data on the block basis, and generates an image on the frame basis. The frame memory 811 holds the decoded image data, and provides the decoded image data as reference pixels for calculation of various prediction pixel values. An image output unit 812 outputs the decoded and reproduced image data to an external device.

A decoding operation of an image in the image decoding device is described below. The input unit 801 receives a bit stream and inputs the bit stream to the separating unit 802. The separating unit 802 first separates coded data of a header of the bit stream, and inputs the coded data to the header decoding unit 803. The header decoding unit 803 decodes attributes such as the type and size of an image to be decoded, a coding profile, luminance interpolation enable/disable information, and chrominance interpolation enable/disable information. The luminance interpolation enable/disable information is the decoded result of strong_intra_smoothing_enable_flag shown in FIG. 2. The chrominance interpolation enable/disable information is the decoded result of strong_intra_smoothing_chroma_enable_flag shown in FIG. 2. The luminance interpolation enable/disable information and the chrominance interpolation enable/disable information are input to and held in the linear-interpolation enable/disable setting unit 804.

Then, the separating unit 802 inputs the coded data on the block basis to the entropy decoding unit 805. The entropy decoding unit 805 decodes a coding mode, information required for prediction, and information relating to the block size. Further, the entropy decoding unit 805 decodes a quantization coefficient of a prediction error. The information required for prediction is input to the intra-prediction unit 806 and the inter-prediction unit 807. Also, the quantization coefficient of the prediction error is input to the dequantizing/inverse-transforming unit 808. The quantization coefficient input to the dequantizing/inverse-transforming unit 808 reproduces a prediction error of each signal through dequantization and inverse-transformation.

Meanwhile, the intra-prediction unit 806 receives the information required for prediction, and performs intra-prediction. FIG. 9 shows a detailed block diagram of the intra-prediction unit 806. An input unit 901 receives an intra-prediction mode intraPredMode of the luminance signal, which is information required for intra-prediction of the luminance signal, from the entropy decoding unit 805 in FIG. 8. An input unit 902 receives the luminance interpolation enable/disable information from the linear-interpolation enable/disable setting unit 804 in FIG. 8. An input unit 903 receives the block size of a block to be decoded from the entropy decoding unit 805 in FIG. 8. An input unit 904 receives a pixel value to be referenced for predicting a pixel, which is a decoded pixel and which is a pixel of a block being decoded, from the frame memory 811 in FIG. 8. An input unit 905 receives an intra-prediction mode intraPred-ModeC of the chrominance signal, which is information required for intra-prediction of the chrominance signal, from the entropy decoding unit 805 in FIG. 8. An input unit 906 receives the chrominance interpolation enable/disable information from the linear-interpolation enable/disable setting unit 804 in FIG. 8. Memories 907, 908, and 909 each receive a pixel value to be referenced for predicting a pixel, which is a decoded pixel and which is a pixel of the block being decoded, from the frame memory 811 in FIG. 8. The memory 907 holds a pixel value of the luminance signal. The memory 908 holds a pixel value of the chrominance signal (Cb). The memory 909 holds a pixel value of the chrominance signal (Cr).

A luminance linear-interpolation enable/disable judging unit 910 provides a function similar to the function of the luminance linear-interpolation enable/disable judging unit 310 shown in FIG. 3. For the luminance signal, the luminance linear-interpolation enable/disable judging unit 910 determines a luminance linear-interpolation processing flag biIntFlag of the block being decoded from the luminance interpolation enable/disable information and a pixel value of a reference pixel of the luminance signal of the block being decoded. A linear-interpolation unit 911 functions similarly to the linear-interpolation unit 311 in FIG. 3. A filter unit 912 functions similarly to the filter unit 312 in FIG. 3. A selector 913 selects an input target in accordance with the luminance linear-interpolation processing flag biIntFlag similarly to the selector 313 shown in FIG. 3. A luminance-signal predicting unit 914 generates a prediction pixel value by using the intra-prediction mode intraPredMode of the luminance signal input from the input unit 901, the output of the selector 913, and the output of the memory 907. An output unit 915 outputs the generated prediction pixel value of the luminance signal to the pixel reproducing unit 809 in FIG. 8.

The chrominance linear-interpolation enable/disable judging unit 916 provides a function similar to the function of the chrominance linear-interpolation enable/disable judging unit 318 shown in FIG. 3. For the chrominance signal, the chrominance linear-interpolation enable/disable judging unit 916 determines a chrominance linear-interpolation processing flag biIntFlagC of the block being decoded from the chrominance interpolation enable/disable information and a pixel value of a reference pixel of the chrominance signal of the block being decoded. For the chrominance signal (Cb), a linear-interpolation unit 917 functions similarly to the linear-interpolation unit 319 in FIG. 3, and a filter unit 919 functions similarly to the filter unit 321 in FIG. 3. A selector 921 selects an input target in accordance with the chrominance linear-interpolation processing flag biIntFlagC similarly to the selector 323 shown in FIG. 3. For the chrominance signal (Cr), a linear-interpolation unit 918 functions similarly to the linear-interpolation unit 320 in FIG. 3, and a filter unit 920 functions similarly to the filter unit 322 in FIG. 3. A selector 922 selects an input target in accordance with the chrominance linear-interpolation processing flag biIntFlagC similarly to the selector 324 shown in FIG. 3. A chrominance-signal predicting unit 923 generates prediction pixel values of the chrominance signal (Cb) and the chrominance signal (Cr) by using the intra-prediction mode of the chrominance signal input from the input unit 905, the outputs of the selectors 921 and 922, and the outputs of the memories 908 and 909. An output unit 924 outputs the generated prediction pixel values of the chrominance signal (Cb) and the chrominance signal (Cr) to the pixel reproducing unit 809 in FIG. 8.

With the above configuration, the luminance linear-interpolation enable/disable judging unit 910 receives the luminance interpolation enable/disable information input from the input unit 902, the block size input from the input unit 903, and the reference pixel value of the luminance signal in the neighbor of the block being decoded input from the memory 907. By using these values, the luminance linear-interpolation enable/disable judging unit 910 calculates the luminance linear-interpolation processing flag biIntFlag similarly to the luminance linear-interpolation enable/disable judging unit 310. The linear-interpolation unit 911 reads the reference pixel value of the luminance signal in the neighbor of the block being decoded from the memory 907, and calculates the reference pixel value of the luminance signal after the linear-interpolation processing by Expressions (3) similarly to the linear-interpolation unit 311. The filter unit 912 performs three-tap filter processing and corrects the reference pixel value similarly to the filter unit 312. If the luminance linear-interpolation processing flag biIntFlag is 1, the selector 913 outputs the luminance signal after the linear-interpolation processing by the linear-interpolation unit 911. In contrast, if 0, the selector 913 outputs the luminance signal after the filter processing by the filter unit 912. The reference pixel of the luminance signal after either of these corrections is input to the luminance-signal predicting unit 914.

The luminance-signal predicting unit 914 receives the reference pixel value of the luminance signal after the reference-pixel correction processing input from the selector 913. Further the luminance-signal predicting unit 914 receives the intra-prediction mode intraPredMode of the luminance signal input from the memory 907, and the block size nT of the luminance signal of the block being decoded from the input unit 903. The luminance-signal predicting unit 914 first calculates minDistVerHor from the input intraPredMode, similarly to the luminance reference-pixel generation-method selecting unit 309. The luminance-signal predicting unit 914 compares the block size nT of the luminance signal with intraHorVerDistThresh[nT] obtained from Table 1. If minDistVerHor is larger than intraHorVerDistThresh[nT], the luminance-signal predicting unit 914 performs the reference-pixel correction processing of the luminance signal, and performs intra-prediction in accordance with intraPredMode, which is the output from the selector 913 and input as the reference pixel value. Otherwise, the luminance-signal predicting unit 914 performs intra-prediction in accordance with intraPredMode by using the reference pixel value read from the memory 907. The prediction pixel value of the block being decoded obtained by the intra-prediction is output from the output unit 915.

The chrominance linear-interpolation enable/disable judging unit 916 receives the chrominance interpolation enable/disable information input from the input unit 906, the block size input from the input unit 903, and the reference pixel values of the chrominance signal in the neighbor of the block being decoded input from the memories 908 and 909. By using these values, the chrominance linear-interpolation enable/disable judging unit 916 calculates the chrominance linear-interpolation processing flag biIntFlagC similarly to the chrominance linear-interpolation enable/disable judging unit 318. The linear-interpolation unit 917 reads the reference pixel value of the chrominance signal (Cb) in the neighbor of the block being decoded from the memory 908, and calculates the reference pixel value of the chrominance signal (Cb) after the linear-interpolation processing by Expressions (7) similarly to the linear-interpolation unit 319.

The filter unit 919 performs three-tap filter processing and corrects the reference pixel value of the chrominance signal (Cb) similarly to the filter unit 321. If the chrominance linear-interpolation processing flag biIntFlagC is 1, the selector 921 outputs the chrominance signal (Cb) after the linear-interpolation processing by the linear-interpolation unit 917. In contrast, if 0, the selector 921 outputs the chrominance signal (Cb) after the filter processing by the filter unit 919. The reference pixel of the chrominance signal (Cb) after either of these corrections is input to the chrominance-signal predicting unit 923. Simultaneously, the linear-interpolation unit 918 reads the reference pixel value of the chrominance signal (Cr) in the neighbor of the block being decoded from the memory 909, and calculates the reference pixel value of the chrominance signal (Cr) after the linear-interpolation processing by Expressions (8) similarly to the linear-interpolation unit 320. The filter unit 920 performs three-tap filter processing and corrects the reference pixel value of the chrominance signal (Cr) similarly to the filter unit 322. If the chrominance linear-interpolation processing flag biIntFlagC is 1, the selector 922 outputs the chrominance signal (Cr) after the linear-interpolation processing by the linear-interpolation unit 918. In contrast, if 0, the selector 922 outputs the chrominance signal (Cr) after the filter processing by the filter unit 920. The reference pixel of the chrominance signal (Cr) after either of these corrections is input to the chrominance-signal predicting unit 923.

The chrominance-signal predicting unit 923 receives the reference pixel of the chrominance signal (Cb) after the reference-pixel correction processing input from the selector 921, and the reference pixel of the chrominance signal (Cr) after the reference-pixel correction processing input from the selector 922. Further the chrominance-signal predicting unit 923 receives the intra-prediction mode intraPredModeC of the chrominance signal input from the input unit 905, and the block size nT of the chrominance signal of the block being decoded from the input unit 903. The chrominance-signal predicting unit 923 calculates minDistVerHor from the input intraPredModeC and compares the block size nT with intraHorVerDistThreshC[nT] obtained from Table 2, similarly to the chrominance-signal prediction-mode determining unit 328. If minDistVerHor is larger than intraHorVerDistThreshC[nT], the reference-pixel correction processing of the chrominance signal is performed. For the chrominance signal (Cb), intra-prediction is performed in accordance with intraPredModeC, which is the output from the selector 921 and the input as the reference pixel value. If minDistVerHor is small, the intra-prediction is performed in accordance with intraPredModeC by using the reference pixel value read from the memory 908. For the chrominance signal (Cr), similarly to the chrominance signal (Cb), if minDistVerHor is larger than intraHorVerDistThreshC[nT], the chrominance-signal predicting unit 923 performs intra-prediction in accordance with intraPredModeC, which is the output from the selector 922 and input as the reference pixel value. If minDistVerHor is small, intra-prediction is performed in accordance with intraPredModeC by using the reference pixel value read from the memory 909. The prediction pixel value of the chrominance signal (Cb) and the prediction pixel value of the chrominance signal (Cr) of the block being decoded obtained by the intra-prediction are output from the output unit 924.

Referring back to FIG. 8, the calculated prediction pixel values of the luminance signal and the respective chrominance signals are input to the pixel reproducing unit 809.

Also, the inter-prediction unit 807 receives the reference information, such as the motion vector and the reference frame information, obtained through decoding by the entropy decoding unit 805. Also, the inter-prediction unit 807 receives the decoded pixel value of the frame from the frame memory 811. The inter-prediction unit 807 performs prediction by using these pieces of information, calculates the prediction pixel value of the luminance signal and the prediction pixel values of the chrominance signals, and inputs the calculated values to the pixel reproducing unit 809. The pixel reproducing unit 809 uses the prediction pixel value of the intra-prediction unit 806 for pixel reproduction if the coding mode is the intra-prediction coding mode, according to the coding mode decoded by the entropy decoding unit 805. Also, if the coding mode is the inter-prediction coding mode, the pixel reproducing unit 809 uses the prediction pixel value of the inter-prediction unit 807 for pixel reproduction. The pixel reproducing unit 809 reproduces the pixel value by using the input prediction pixel values of the respective signals and the prediction errors of the respective signals reproduced by the dequantizing/inverse-transforming unit 808. The reproduced pixel values are input to the frame memory 811 and the block integrating unit 810. The frame memory 811 stores reproduced image data as reference pixels for prediction. The block integrating unit 810 generates image data on the frame basis from the image data on the block basis, and outputs the image data to an external device.

FIG. 10 is a flowchart representing decoding processing in the image decoding device according to the second embodiment.

In step S1001, the separating unit 802 separates coded data of a header, and the header decoding unit decodes the coded data of the header. The header decoding unit decodes strong_intra_smoothing_enable_flag representing the luminance interpolation enable/disable information from among the coded data. Also, the header decoding unit decodes strong_intra_smoothing_chroma_enable_flag representing the chrominance interpolation enable/disable information.

In step S1002, the input unit 801 receives coded data on the frame basis. In step S1003, the separating unit 802 extracts coded data on the block basis. In step S1004, the entropy decoding unit 805 generates a block size of a luminance signal of a block being decoded. In step S1005, the entropy decoding unit 805 decodes a coding mode of the block being decoded. At this time, the entropy decoding unit 805 decodes the intra-prediction mode if the coding mode is the intra-prediction coding mode, and decodes reference information, such as a motion vector of each signal and reference frame information, if the coding mode is the inter-prediction coding mode. In step S1006, the entropy decoding unit 805 generates a quantization coefficient of each signal of the block being decoded. In step S1007, the dequantizing/inverse-transforming unit 808 performs dequantization on the quantization coefficient generated in step S1006 to reproduce an orthogonal transformation coefficient, and performs inverse orthogonal transformation to reproduce a prediction error of the luminance signal and prediction errors of the chrominance signals.

In step S1008, the pixel reproducing unit 809 judges whether the coding mode obtained in step S1005 is the intra-prediction coding mode or the inter-prediction coding mode. If the coding mode is the intra-prediction coding mode, the process advances to step S1010, and if not, the process advances to step S1009. In step S1009, the inter-prediction unit 807 performs motion compensation prediction by using the motion vector, the reference frame information, etc., decoded in step S1005, and calculates a prediction pixel value.

In step S1010, the intra-prediction unit 806 performs intra-prediction with the decoded intra-prediction mode or the like, and calculates a prediction pixel value. FIGS. 11A and 11B show a detailed flowchart of intra-prediction in decoding processing. In FIGS. 11A and 11B, the same numerals are applied to blocks having the same functions as those in FIG. 6, and the description is omitted. In step S1101, a reference-pixel correction-processing enable/disable flag filterFlag[intraPredMode] of the luminance signal is determined. The luminance-signal predicting unit 914 makes determination based on the decoded intra-prediction mode intraPredMode of the luminance signal and the decoded block size of the luminance signal. The luminance linear-interpolation processing flag biIntFlag is determined in step S605 or step S607 in accordance with the judgment from step S602 to step S604. If biIntFlag is 1, the reference pixel value of the block being decoded is the value as the result of reference-pixel correction processing by the linear-interpolation processing in step S606. If biIntFlag is 0, the reference pixel value of the block being decoded is the value as the result of reference-pixel correction processing by the filter processing in step S608.

In step S1102, if the reference-pixel correction-processing enable/disable flag filterFlag[intraPredMode] of the luminance signal is 1, the process advances to step S1103, and if not, the process advances to step S1104. In step S1103, the luminance-signal predicting unit 914 uses the reference pixel value of the luminance signal generated by the reference-pixel correction processing in step S606 or step S608 and performed with the reference-pixel correction processing. The intra-prediction of the luminance signal is performed in accordance with the intra-prediction mode intraPredMode, and the prediction pixel value of the luminance signal is generated. In step S1104, the luminance-signal predicting unit 914 does not perform the reference-pixel correction processing of the luminance signal, performs the intra-prediction of the luminance signal in accordance with the intra-prediction mode intraPredMode by using the input reference pixel value of the luminance signal, and generates the prediction pixel value of the luminance signal.

In step S1111, the chrominance-signal predicting unit 923 determines a chrominance reference-pixel correction-processing enable/disable flag filterFlagC[intraPredModeC] of the chrominance signal. The determination is made based on the decoded intra-prediction mode intraPredModeC of the chrominance signal and the decoded block size of the chrominance signal. The chrominance linear-interpolation processing flag biIntFlagC is determined in step S615 or step S617 in accordance with the judgment from step S612 to step S614. If biIntFlagC is 1, the reference pixel value of the block being decoded is the value as the result of reference-pixel correction processing by the linear-interpolation processing in step S616. If biIntFlagC is 0, the reference pixel value of the block being decoded is the value as the result of reference-pixel correction processing by the filter processing in step S618.

In step S1105, if the chrominance reference-pixel correction-processing enable/disable flag filterFlagC[intraPredModeC] of the chrominance signal is 1, the process advances to step S1106, and if not, the process advances to step S1107. In step S1106, the chrominance-signal predicting unit 923 uses the reference pixel value of the chrominance signal generated by the reference-pixel correction processing in step S616 or step S618. The intra-prediction of the chrominance signal is performed in accordance with the intra-prediction mode intraPredModeC, and the prediction pixel value of the chrominance signal is generated. In step S1107, the chrominance-signal predicting unit 923 does not perform the reference-pixel correction processing of the chrominance signal, performs the intra-prediction of the chrominance signal in accordance with the intra-prediction mode intraPredModeC by using the input reference pixel value of the chrominance signal, and generates the prediction pixel value of the chrominance signal.

Referring back to FIG. 10, in step S1011, the pixel reproducing unit 809 adds the prediction pixel value of each signal generated in accordance with the coding mode judged in step S1008 to the reproduced prediction error of the corresponding signal, to reproduce the pixel value of each signal of the decoded image.

In step S1012, the decoding device judges whether or not the decoding processing is completed for all coded data on the block basis. If decoding processing on all blocks is completed, the process advances to step S1013. If not, coded data of the next block is extracted in step S1003. In step S1013, the decoding device judges whether or not the decoding processing is completed for all frames. If the decoding processing on all frames is not completed, coded data of the next frame is input in step S1002. Otherwise, the decoding processing is ended.

With the above-described configurations and operations, in the image decoding, the linear-interpolation processing can be performed on the reference pixel of the chrominance signal in addition to the luminance signal. A noise like contouring in chrominance is reduced. Since it can be determined whether the linear-interpolation processing of the chrominance signal is enabled or disabled, regardless of the enable/disable state of the linear-interpolation processing of the luminance signal, a noise generated only in chrominance can be reduced.

This embodiment is described that an image signal is 4:2:0, and a pixel includes 8 bits. However, it is not limited thereto. For example, an image signal may be 4:2:2 or 4:4:4, and a pixel of image data may include 10 bits. Also, this embodiment is described that the maximum size of a divided block is 64×64 pixels, and the block size for performing the linear-interpolation processing is 32×32 pixels. However, it is not limited thereto. Also, the block is not limited to a square block, and may be a rectangular block.

Also, in the first embodiment, decoding of coded data in a manner that the luminance linear-interpolation processing flag biIntFlag and the chrominance linear-interpolation processing flag biIntFlagC are signals obtained by switching a plurality of linear-interpolation units as shown in FIG. 7. This may be realized by selecting a signal from a corresponding interpolation unit as the input of one of the selectors 913, 921, and 922 in FIG. 9.

Third Embodiment

An image coding device according to a third embodiment of the invention is described below. A general configuration of the coding device is similar to the block diagram in FIG. 1. In this embodiment, the image data is described as an image with luminance and chrominance signals being 4:2:2. However, it is not limited thereto. This embodiment differs from the first embodiment mainly for the configurations and operations of the header coding unit 104 and the intra-prediction unit 105.

The block dividing unit 102 divides the read image data into blocks. However, unlike the first embodiment, it is assumed that a luminance signal in this embodiment has a block of 64×64 pixels, and a chrominance signal accompanying the luminance signal has a block of 32×64 pixels. The block size is not limited thereto. Further, if required, the inside of the block is divided into smaller blocks.

The linear-interpolation enable/disable determining unit 103 recognizes information representing whether reference-pixel linear-interpolation processing is enabled or disabled simultaneously for both luminance and chrominance signals, for a sequence to be coded by a user (not shown) with the image coding device, as interpolation enable/disable information, unlike the first embodiment. The header coding unit 104 generates coded data of a header of a sequence and coded data of a header of each frame; however, unlike the first embodiment, codes the interpolation enable/disable information. Also, the intra-prediction unit 105 is controlled in accordance with the interpolation enable/disable information.

A coding operation of an image in the image coding device is described below. First, before coding the image, the user (not shown) sets interpolation enable/disable information with use of the linear-interpolation enable/disable determining unit 103. The set interpolation enable/disable information is input to the header coding unit 104 and the intra-prediction unit 105. The header coding unit 104 codes attributes such as the type and size of an image to be input, a coding profile, and the interpolation enable/disable information input similarly to the first embodiment. The header coding unit 104 performs coding in accordance with the format of a sequence parameter set including the above information, and generates a bit stream as shown in FIG. 12. The interpolation enable/disable information is coded as strong_intra_smoothing_enable_flag. The coded data of the header is input to the integrating unit 110, and is output from the output unit 111 before coding the image.

Then, coding for an image is performed. The input image data is input to the block dividing unit 102 on the frame basis. The block dividing unit 102 first divides the luminance signal into a block of 64×64 pixels and divides the chrominance signal into a block of 32×64 pixels. Further, if required, the block dividing unit 102 divides each of the blocks into smaller blocks by quadtree segmentation in accordance with features in the block. The divided block and the block size are input to the intra-prediction unit 105 and the inter-prediction unit 106.

FIG. 13 shows a detailed block diagram of the intra-prediction unit 105 according to this embodiment. In FIG. 13, the same numeral is applied to a block having the same function as that of the intra-prediction unit in FIG. 3 of the first embodiment, and the description is omitted. An input unit 1302 receives the interpolation enable/disable information from the linear-interpolation enable/disable determining unit 103 in FIG. 1. A linear-interpolation enable/disable judging unit 1310 determines whether reference-pixel linear-interpolation processing for a luminance signal and chrominance signals of a block being coded is performed or not. The linear-interpolation enable/disable judging unit 1310 makes judgment from the interpolation enable/disable information and a pixel value of a reference pixel of the luminance signal of the block being coded by using the luminance signal. It is assumed that information representing whether reference-pixel linear-interpolation processing of the luminance signal and the chrominance signals on the block basis are performed or not is linear-interpolation processing flag biIntFlag. The value of the linear-interpolation processing flag is 1 if the reference-pixel linear-interpolation processing is performed on the luminance signal and the chrominance signals, and the value is 0 if the processing is not performed. It is assumed that the judgment for pixel values of reference pixels of the luminance signal and the chrominance signals of the block being coded may use judgment with the luminance signal described in the first embodiment. That is, if the interpolation enable/disable information indicates the enable state, if the block size nT of the luminance signal is 32, and if all Expressions (1) are true, the reference-pixel linear-interpolation processing for the luminance signal and the chrominance signals is performed, and the linear-interpolation processing flag biIntFlag is set at 1. If the interpolation enable/disable information indicates the disable state, if the block size nT of the luminance signal is other than 32, or if at least one of Expressions (1) is false, the linear-interpolation processing of the luminance signal and the chrominance signals is not performed. At this time, the linear-interpolation processing flag biIntFlag is set at 0. The linear-interpolation processing flag biIntFlag is input to selectors 313, 1323, and 1324. In parallel to this, like the first embodiment, the linear-interpolation unit 311 performs the linear-interpolation processing of the reference pixel of the luminance signal, and the filter unit 312 performs filter processing of the reference pixel of the luminance signal.

A chrominance reference-pixel generation-method selecting unit 1317 judges whether or not reference-pixel correction processing is performed every intra-prediction mode of the chrominance signal based on the input block size nT of the luminance signal. In this embodiment, since the signal is 4:2:2, the chrominance signal is a block of (nT/2)×(nT) pixels. Like the first embodiment, it is assumed that each intra-prediction mode of the chrominance signal is intraPredModeC, and minDistVerHor is calculated. This minDistVerHor is compared with intraHorVerDistThreshC[nT] defined in Table 3.

TABLE 3

|  | nT = 8 | nT = 16 | nT = 32 |
| --- | --- | --- | --- |
| intraHorVerDistThreshC[nT] | 7 | 1 | 0 |

If minDistVerHor is larger than intraHorVerDistThreshC[nT] shown in Table 3, the reference-pixel correction processing of the chrominance signal is performed. Like the first embodiment, a chrominance reference-pixel correction processing enable/disable flag filterFlagC[intraPredModeC] is determined.

In parallel to this, like the first embodiment, for a chrominance signal (Cb), a linear-interpolation unit 1319 performs the linear-interpolation processing of the reference pixel, and the filter unit 321 performs filter processing of the reference pixel. The linear-interpolation unit 1319 reads a reference pixel value of the chrominance signal (Cb) in the neighbor of the block being coded from the memory 307. If the read pixel value is Cbp(x, y) and the pixel value after the linear-interpolation processing is Cbp'(x, y), the values are obtained as follows:

$$Cbp'(-1,-1)=Cbp(-1,-1),$$

$$Cbp'(31,-1)=Cbp(31,-1),$$

$$Cbp'(-1,63)=Cbp(-1,63),$$

$$Cbp'(x,-1)=Cbp(-1,-1)+(x+1)(Cbp(31,-1)-Cbp(-1,-1)+16)>>5 \text{(where, } x=0 \text{ to } 30\text{), and}$$

$$Cbp'(-1,y)=Cbp(-1,-1)+(y+1)(Cbp(-1,63)-Cbp(-1,-1)+32)>>6\text{(where, }y=0\text{ to 62)} \quad (9).$$

FIG. 14B represents an example arrangement of the chrominance signal, and a block having 16×32 pixels serves as a block being coded.

The chrominance signal (Cb) after the linear-interpolation processing and the chrominance signal (Cb) after the filter processing are input to the selector 1323. If the linear-interpolation processing flag biIntFlag is 1, the selector 1323 outputs the chrominance signal (Cb) after the linear-interpolation processing by the linear-interpolation unit 1319. In contrast, if 0, the selector 1323 outputs the chrominance signal (Cb) after the filter processing by the filter unit 321. The reference pixel of the chrominance signal (Cb) after either of these corrections is input to the chrominance-signal prediction-mode determining unit 328.

Like the first embodiment, for a chrominance signal (Cr), a linear-interpolation unit 1320 performs the linear-interpolation processing of the reference pixel, and the filter unit 322 performs filter processing of the reference pixel. The linear-interpolation unit 1320 reads a reference pixel value of the chrominance signal (Cr) in the neighbor of the block being coded from the memory 308. If the read pixel value is Crp(x, y) and the pixel value after the linear-interpolation processing is Crp'(x, y), the values are obtained as follows:

$$Crp'(-1,-1)=Crp(-1,-1),$$

$$Crp'(31,-1)=Crp(31,-1),$$

$$Crp'(-1,63)=Crp(-1,63),$$

$$Crp'(x,-1)=Crp(-1,-1)+(x+1)(Crp(31,-1)-Crp(-1,-1)+16)>>5\text{(where, }x=0\text{ to 30), and}$$

$$Crp'(-1,y)=Crp(-1,-1)+(y+1)(Crp(-1,63)-Crp(-1,-1)+32)>>6\text{(where, }y=0\text{ to 62)} \quad (10).$$

Similarly to the chrominance signal Cb, the chrominance signal (Cr) after the linear-interpolation processing and the chrominance signal (Cr) after the filter processing are input to the selector 1324. If the linear-interpolation processing flag biIntFlag is 1, the selector 1324 outputs the chrominance signal (Cr) after the linear-interpolation processing by the linear-interpolation unit 1320. In contrast, if 0, the selector 1324 outputs the chrominance signal (Cr) after the filter processing by the filter unit 322. The reference pixel of the chrominance signal (Cr) after either of these corrections is input to the chrominance-signal prediction-mode determining unit 328.

For the succeeding process, the luminance-signal prediction-mode determining unit 314 and the chrominance-signal prediction-mode determining unit 328 function similarly to the first embodiment. That is, the intra-prediction mode of the luminance signal is output from the output unit 315, and the prediction error thereof is output from the output unit 316 to an external device. The intra-prediction modes of the chrominance signals are output from the output unit 329, and the respective prediction errors thereof are output from the output unit 330 to an external device.

Referring back to FIG. 1, as described in the first embodiment, the prediction determining unit 107 determines the coding mode from information such as the prediction errors input from the intra-prediction unit 105 and the inter-prediction unit 106, and the entropy coding unit 109 codes the coding mode.

FIG. 15 is a flowchart representing coding processing in the image coding device according to the third embodiment. In the same figure, the same numerals are applied to blocks having the same functions as those in FIG. 5, and the description is omitted. In step S1501, the linear-interpolation enable/disable determining unit 103 sets interpolation enable/disable information. In step S1503, the header coding unit 104 codes a sequence header. At this time, interpolation enable/disable information strong_intra_smoothing_enable_flag is coded. In step S1506, the intra-prediction unit 105 performs intra-prediction processing. FIG. 16 is a flowchart expressing a detailed operation of the intra-prediction processing. In the same figure, the same numerals are applied to blocks having the same functions as those in FIG. 6, and the description is omitted. In step S1602, the linear-interpolation enable/disable judging unit 1310 judges the interpolation enable/disable information of the block being coded set in step S1501. If the interpolation enable/disable information is set at the enable state, the process advances to step S603, and if not, the process advances to step S1607. In step S1605, the linear-interpolation enable/disable judging unit 1310 sets a linear-interpolation processing flag biIntFlag at 1 to perform linear-interpolation processing. In step S1607, the linear-interpolation enable/disable judging unit 1310 sets the linear-interpolation processing flag biIntFlag at 0 not to perform linear-interpolation processing. In step S1613, the linear-interpolation enable/disable judging unit 1310 judges whether the linear-interpolation processing flag biIntFlag set in step S1605 or step S1606 is 1 or not. If the value is 1, the process advances to step S616, and if not, the process advances to step S618.

Referring back to FIG. 15, like the first embodiment, inter-prediction, determination and coding of a coding mode, and coding of a prediction error are performed.

With the above-described configurations and operations, in the image coding, the linear-interpolation processing can be performed on the reference pixel of the chrominance signal in addition to the luminance signal. A noise like contouring in chrominance is reduced. Since the enable/disable state of the linear-interpolation processing of the chrominance signal is determined in association with the enable/disable state of the linear-interpolation processing of the luminance signal, the amount of processing for judgment can be reduced. Further, mismatching, in which the linear-interpolation is performed only for the luminance signal but is not performed for the chrominance signal, does not occur. A noise can be further reduced in a decoded image. Also, a noise like contouring can be reduced not only for a square block of 4:2:0, but also for a rectangular block of 4:2:2.

In this embodiment, the block of chrominance has 32×64 pixels; however, it is not limited thereto. The block of chrominance may be horizontally long of 64×32 pixels, or may have other block size and shape.

Table 3 is used for the calculation of intraHorVerDistThreshC[nT]; however, Table 2 may be used, or other condition may be used. Also, in FIG. 16, step S611 may be omitted, and a reference-pixel correction-processing enable/disable flag filterFlag[0 . . . 34] of the luminance signal may be directly used for a reference-pixel correction-processing enable/disable flag filterFlagC[0 . . . 34] of the chrominance signal.

Also, in this embodiment, the linear-interpolation enable/disable judging unit 1310 makes the linear-interpolation enable/disable judgment of the chrominance signal; however, it is not limited thereto. As shown in FIG. 3, the chrominance linear-interpolation enable/disable judging unit 318 may be provided, and the chrominance linear-interpolation enable/disable judging unit 318 may use the linear-interpolation enable/disable information input from the input unit 302 instead of the chrominance interpolation enable/disable information from the input unit 304.

Fourth Embodiment

An image decoding device according to a fourth embodiment of the invention is described below. In this embodiment, decoding of the coded data generated in the third embodiment is described as an example. A general configuration of the image decoding device is similar to the block diagram in FIG. 8.

The input unit 801 reads the bit stream generated in the third embodiment. The separating unit 802 separates coded data of a header and coded data of each block from the input bit stream. The header decoding unit 803 decodes strong_intra_smoothing_enable_flag representing interpolation enable/disable information, and reproduces the interpolation enable/disable information.

The intra-prediction unit 806 performs intra-prediction. FIG. 17 shows a detailed block diagram of the intra-prediction unit 806. In the same figure, the same numerals are applied to blocks having the same functions as those in FIG. 9, and the description is omitted. An input unit 1702 receives the interpolation enable/disable information from the linear-interpolation enable/disable setting unit 804 in FIG. 8. The input interpolation enable/disable information is input to a linear-interpolation enable/disable judging unit 1710. The linear-interpolation enable/disable judging unit 1710 functions similarly to the linear-interpolation enable/disable judging unit 1310 shown in FIG. 13, and determines a linear-interpolation processing flag biIntFlag from the interpolation enable/disable information and a pixel value of a reference pixel of the luminance signal of the block being decoded by using the luminance signal. The linear-interpolation processing flag biIntFlag is input to selectors 913, 1721, and 1722. In parallel to this, like the third embodiment, the linear-interpolation unit 911 performs linear-interpolation processing of the reference pixel of the luminance signal, and the filter unit 912 performs filter processing of the reference pixel. If the linear-interpolation processing flag biIntFlag is 1, the selector 913 outputs the luminance signal after the linear-interpolation processing by the linear-interpolation unit 911. In contrast, if 0, the selector 913 outputs the luminance signal after the filter processing by the filter unit 912.

In parallel to this, prediction of the chrominance signal is performed. A linear-interpolation unit 1717 reads a reference pixel value of a chrominance signal (Cb) in the neighbor of the block being decoded from the memory 908, and calculates a reference pixel value of the chrominance signal (Cb) after the linear-interpolation processing by Expressions (9) similarly to the linear-interpolation unit 1319. Also, a linear-interpolation unit 1718 reads a reference pixel value of a chrominance signal (Cr) in the neighbor of the block being decoded from the memory 909, and calculates a reference pixel value of the chrominance signal (Cr) after the linear-interpolation processing by Expressions (10) similarly to the linear-interpolation unit 1320. The chrominance signal (Cb) after the linear-interpolation processing and the chrominance signal (Cb) after the filter processing are input to the selector 1721. If the linear-interpolation processing flag biIntFlag is 1, the selector 1721 outputs the chrominance signal (Cb) after the linear-interpolation processing by the linear-interpolation unit 1717. In contrast, if 0, the selector 1721 outputs the chrominance signal (Cb) after the filter processing by the filter unit 919. The reference pixel of the chrominance signal (Cb) after either of these corrections is input to a chrominance-signal predicting unit 1723. Similarly, the chrominance signal (Cr) after the linear-interpolation processing and the chrominance signal (Cr) after the filter processing are input to the selector 1722. If the linear-interpolation processing flag biIntFlag is 1, the selector 1722 outputs the chrominance signal (Cr) after the linear-interpolation processing by the linear-interpolation unit 1718. In contrast, if 0, the selector 1722 outputs the chrominance signal (Cr) after the filter processing by the filter unit 920. The reference pixel of the chrominance signal (Cr) after either of these corrections is input to the chrominance-signal predicting unit 1723. The chrominance-signal predicting unit 1723 performs prediction of the chrominance signal of 4:2:2. Like the second embodiment, the prediction pixel value of the luminance signal is output from the output unit 915, and the prediction error value of each chrominance signal is output from the output unit 924. Referring back to FIG. 8, as described in the second embodiment, a decoded image is reproduced from the prediction error reproduced by the pixel reproducing unit 809 and the calculated prediction pixel value.

FIG. 18 is a flowchart representing decoding processing in the image decoding device according to the fourth embodiment. In the same figure, the same numerals are applied to blocks having the same functions as those in FIG. 10, and the description is omitted. In step S1801, the separating unit 802 separates coded data of a header, and the header decoding unit 803 decodes the coded data of the header. The header decoding unit 803 decodes strong_intra_smoothing_enable_flag representing the interpolation enable/disable information from among the coded data. In step S1002 to step S1007, reproduction of a block size, decoding of a coding mode, and reproduction of a prediction error are performed. In step S1810, the intra-prediction unit 806 performs intra-prediction with the decoded intra-prediction mode or the like, and calculates a prediction pixel value. FIG. 19 shows a detailed flowchart of intra-prediction in decoding processing. In FIG. 19, the same numerals are applied to blocks having the same functions as those in FIGS. 11A and 11B, and the description is omitted.

In step S1901, the linear-interpolation enable/disable judging unit 1710 judges the interpolation enable/disable information of the block being decoded set in step S1801. If the interpolation enable/disable information indicates the enable state, the process advances to step S603, and if not, the process advances to step S1607. In step S1912, the linear-interpolation enable/disable judging unit 1710 judges the interpolation enable/disable information of the block being decoded set in step S1801. If the interpolation enable/disable information indicates the enable state, the process advances to step S1106, and if not, the process advances to step S1107.

Referring back to FIG. 18, in step S1011, the pixel reproducing unit 809 adds the prediction pixel value of each signal generated in accordance with the coding mode judged in step S1008 to the reproduced prediction error of the corresponding signal, to reproduce the pixel value of each signal of the decoded image.

With the above-described configurations and operations, in the image decoding, the linear-interpolation processing can be performed on the reference pixel of the chrominance signal in addition to the luminance signal. A noise like contouring in chrominance is reduced. Since the enable/disable state of the linear-interpolation processing of the chrominance signal is determined in association with the enable/disable state of the linear-interpolation processing of the luminance signal, the amount of processing for judgment can be reduced. Also, a noise like contouring can be reduced not only for a square block of 4:2:0, but also for a rectangular block of 4:2:2.

Fifth Embodiment

An image coding device according to a fifth embodiment of the invention is described below. A general configuration of the coding device is similar to the block diagram in FIG. 1. In this embodiment, the image data is described as an image with luminance and chrominance signals being 4:2:0. However, it is not limited thereto. This embodiment differs from the first embodiment mainly for the configurations and operations of the linear-interpolation enable/disable determining unit 103, the header coding unit 104, and the intra-prediction unit 105.

The linear-interpolation enable/disable determining unit 103 determines luminance interpolation enable/disable information and chrominance interpolation enable/disable information. It is to be noted that the enable/disable state of the chrominance interpolation enable/disable information can be selected only if the luminance interpolation enable/disable information indicates the enable state. If the luminance interpolation enable/disable information indicates the disable state, the chrominance interpolation enable/disable information indicates the disable state without exception.

The header coding unit 104 codes attributes such as the type and size of an image to be input, a coding profile, the luminance interpolation enable/disable information, and the chrominance interpolation enable/disable information. The header coding unit 104 performs coding in accordance with the format of a sequence parameter set including the above information, and generates a bit stream as shown in FIG. 20. The luminance interpolation enable/disable information is coded as strong_intra_smoothing_enable_flag. The chrominance interpolation enable/disable information is coded as strong_intra_smoothing_chroma_enable_flag only if the luminance interpolation enable/disable information indicates the enable state. It is to be noted that if strong_intra_smoothing_enable_flag is 0, the value of strong_intra_smoothing_chroma_enable_flag is set at 0, and this information is not coded. Similarly to the first embodiment, the coded data of the header is input to the integrating unit 110, and is output from the output unit 111 before coding the image.

Then, coding for an image is performed. The block dividing unit 102 performs block division like the first embodiment, and inputs the pixel values and block size of the block to the intra-prediction unit 105.

The intra-prediction unit 105 performs intra-prediction with reference to a coded neighboring pixel, and outputs an optimal intra-prediction mode, and a prediction error as the result of the intra-prediction. FIG. 21 shows a detailed block diagram of the intra-prediction unit 105. In FIG. 21, the same numeral is applied to a block having the same function as that of the intra-prediction unit in FIG. 3 of the first embodiment, and the description is omitted.

A chrominance linear-interpolation enable/disable judging unit 2118 differs from the chrominance linear-interpolation enable/disable judging unit 318 in FIG. 3 in that a luminance linear-interpolation processing flag biIntFlag is input from the luminance linear-interpolation enable/disable judging unit 310. In addition, the chrominance linear-interpolation enable/disable judging unit 2118 receives the chrominance interpolation enable/disable information from the input unit 304, and the block size nT of the luminance signal from the input unit 301. Further, the chrominance linear-interpolation enable/disable judging unit 2118 receives a pixel value of a chrominance signal (Cb) in the neighbor to be referenced, from the memory 307, and a pixel value of a chrominance signal (Cr) in the neighbor to be referenced, from the memory 308. The chrominance linear-interpolation enable/disable judging unit 2118 determines whether reference-pixel linear-interpolation processing for a chrominance signal of a block being coded is performed or not. The chrominance linear-interpolation enable/disable judging unit 2118 makes determination from the chrominance interpolation enable/disable information, the luminance linear-interpolation processing flag biIntFlag, the pixel value of the reference pixel of the chrominance signal of the block being coded, and the block size nT. If the luminance linear-interpolation processing flag biIntFlag is 1, if the chrominance interpolation enable/disable information indicates the enable state, if the block size nT of the luminance signal is 32, and if all Expressions (5) are true, chrominance-signal (Cb, Cr) reference-pixel linear-interpolation processing is performed. At this time, the chrominance linear-interpolation processing flag biIntFlagC is set at 1. If the chrominance interpolation enable/disable information indicates the disable state, if the luminance linear-interpolation processing flag biIntFlag is 0, if the block size nT of the luminance signal is other than 32, or if at least one of Expressions (5) is false, the linear-interpolation processing of the chrominance signal is not performed. At this time, the chrominance linear-interpolation processing flag biIntFlagC is set at 0. The chrominance linear-interpolation processing flag biIntFlagC thus determined is input to the selectors 323 and 324, and an input target is selected similarly to the first embodiment.

FIG. 22 is a flowchart representing coding processing in the image coding device according to the fifth embodiment. In the same figure, the same numerals are applied to blocks having functions similar to those in FIG. 5 of the first embodiment, and the description is omitted. In step S2201, if the linear-interpolation enable/disable determining unit 103 determines that the luminance interpolation enable/disable information indicates the enable state in step S501, the process advances to step S502. Otherwise, the process advances to step S2202. In step S502 and step S503, the header coding unit 104 codes the luminance interpolation enable/disable information and the chrominance interpolation enable/disable information. The luminance interpolation enable/disable information is coded as strong_intra_smoothing_enable_flag, and the chrominance interpolation enable/disable information is coded as strong_intra_smoothing_chroma_enable_flag. In step S2202, the linear-interpolation enable/disable determining unit 103 sets the chrominance interpolation enable/disable information at the disable state. In step S2203, the header coding unit 104 codes only strong_intra_smoothing_enable_flag, but does not code strong_intra_smoothing_chroma_enable_flag. In step S2206, the intra-prediction unit 105 performs intra-prediction processing. FIGS. 23A and 23B are a flowchart expressing a detailed operation of the intra-prediction processing. In the same figure, the same numerals are applied to blocks having the same functions as those in FIG. 6 of the first embodiment, and the description is omitted. In step S2301, the chrominance linear-interpolation enable/disable judging unit 2118 judges the input luminance linear-interpolation processing flag biIntFlag, if the value is 1, the process advances to step S613, and if not, the process advances to step S617. Then, intra-prediction of the chrominance signal is performed, and a prediction error of the chrominance signal is calculated, similarly to the first embodiment. Referring back to FIG. 22, coding is performed similarly to the first embodiment.

With the above-described configurations and operations, in the image coding, the linear-interpolation processing can be performed on the reference pixel of the chrominance signal in addition to the luminance signal. A noise like contouring in chrominance is reduced. Also, since the enable/disable state of the linear-interpolation processing of the chrominance signal is determined in association with the enable/disable state of the linear-interpolation processing of the luminance signal, a noise like contouring of which is dominant in image quality, the amount of processing for judgment can be reduced without a noticeable difference in image quality.

Also, in this embodiment, the judgment on the enable/disable state of the linear-interpolation of the chrominance signal is performed only if the luminance linear-interpolation enable/disable judging unit 310 indicates the enable state; however, it is not limited thereto, and a configuration similar to the configuration in FIG. 3 may be employed. In this case, since the operation of the chrominance linear-interpolation enable/disable judging unit 2118 is controlled in accordance with the chrominance interpolation enable/disable information input from the input unit 304, even though linear-interpolation is not performed with the luminance signal, an operation performed for the chrominance signal can be provided.

Sixth Embodiment

An image decoding device according to a sixth embodiment of the invention is described below. In this embodiment, decoding of the coded data generated in the fifth embodiment is described as an example. A general configuration of the image decoding device is similar to the block diagram in FIG. 8 of the second embodiment. This embodiment differs from the second embodiment mainly for the configurations and operations of the header decoding unit 803 and the intra-prediction unit 806.

Also, the header decoding unit 803 decodes strong_intra_smoothing_enable_flag representing the luminance interpolation enable/disable information. Then, the linear-interpolation enable/disable setting unit 804 reproduces the luminance interpolation enable/disable information in accordance with the value. If the value of strong_intra_smoothing_enable_flag is 1, the linear-interpolation enable/disable setting unit 804 further decodes strong_intra_smoothing_chroma_enable_flag which is the chrominance interpolation enable/disable information. Then, the linear-interpolation enable/disable setting unit 804 stores the chrominance interpolation enable/disable information in accordance with the value. Also, if the value of strong_intra_smoothing_enable_flag is 0, the value of intra_smoothing_chroma_enable_flag is set at 0. The linear-interpolation enable/disable setting unit 804 sets the chrominance interpolation enable/disable information at the disable state.

The intra-prediction unit 806 performs intra-prediction. FIG. 24 shows a detailed block diagram of the intra-prediction unit 806. In the same figure, the same numerals are applied to blocks having the same functions as those in FIG. 9 of the second embodiment, and the description is omitted.

A chrominance linear-interpolation enable/disable judging unit 2416 differs from the chrominance linear-interpolation enable/disable judging unit 916 in FIG. 9 in that a luminance linear-interpolation processing flag biIntFlag is input from the luminance linear-interpolation enable/disable judging unit 910. The chrominance linear-interpolation enable/disable judging unit 2416 receives the chrominance interpolation enable/disable information from the input unit 906, and the block size nT of the luminance signal from the input unit 903. Also, the chrominance linear-interpolation enable/disable judging unit 2416 receives a pixel value of a chrominance signal (Cb) in the neighbor to be referenced, from the memory 908, and a pixel value of a chrominance signal (Cr) in the neighbor to be referenced, from the memory 909. The chrominance linear-interpolation enable/disable judging unit 2416 determines whether reference-pixel linear-interpolation processing for a chrominance signal of a block being coded is performed or not. For the chrominance signal, the chrominance linear-interpolation enable/disable judging unit 2416 makes determination based on the chrominance interpolation enable/disable information, the luminance linear-interpolation processing flag biIntFlag, and the pixel value of the reference pixel of the chrominance signal of the block being coded. If the luminance linear-interpolation processing flag biIntFlag is 1, if the chrominance interpolation enable/disable information indicates the enable state, if the block size nT of the luminance signal is 32, and if all Expressions (5) are true, chrominance-signal (Cb, Cr) reference-pixel linear-interpolation processing is performed. At this time, the chrominance linear-interpolation processing flag biIntFlagC is set at 1. If the chrominance interpolation enable/disable information indicates the disable state, if the luminance linear-interpolation processing flag biIntFlag is 0, if the block size nT of the luminance signal is other than 32, or if at least one of Expressions (5) is false, the linear-interpolation processing of the chrominance signal is not performed. At this time, the chrominance linear-interpolation processing flag biIntFlagC is set at 0. The chrominance linear-interpolation processing flag biIntFlagC thus determined is input to the selectors 921 and 922, and an input target is selected similarly to the second embodiment.

FIG. 25 is a flowchart representing decoding processing in the image decoding device according to the sixth embodiment. In the same figure, the same numerals are applied to blocks having the same functions as those in FIG. 18 of the fourth embodiment, and the description is omitted. In step S2501, the header decoding unit 803 determines the luminance interpolation enable/disable information decoded in step S1801, if the luminance interpolation enable/disable information indicates the enable state, the process advances to step S2502, and if not, the process advances to step S2503. In step S2502, the header decoding unit 803 decodes strong_intra_smoothing_chroma_enable_flag, and reproduces the chrominance interpolation enable/disable information. In step S2503, the linear-interpolation enable/disable setting unit 804 sets the chrominance interpolation enable/disable information at the disable state.

Also, in step S2510, the intra-prediction unit 806 performs intra-prediction processing. FIGS. 26A and 26B are a flowchart expressing a detailed operation of the intra-prediction processing. In the same figure, the same numerals are applied to blocks having the same functions as those in FIGS. 11A and 11B of the second embodiment, and the description is omitted. In step S2601, the chrominance linear-interpolation enable/disable judging unit 2118 judges the input luminance linear-interpolation processing flag biIntFlag, if the value is 1, the process advances to step S613, and if not, the process advances to step S617. Then, intra-prediction of the chrominance signal is performed, and a prediction error of the chrominance signal is calculated, similarly to the first embodiment. Referring back to FIG. 25, decoding is performed similarly to the second embodiment.

With the above-described configurations and operations, in the image decoding, the linear-interpolation processing can be performed on the reference pixel of the chrominance signal in addition to the luminance signal. A noise like contouring in chrominance is reduced. Also, the enable/disable state of the linear-interpolation processing of the chrominance signal is determined in association with the enable/disable state of the linear-interpolation processing of the luminance signal, a noise like contouring of which is dominant in image quality. Accordingly, mismatching, in which the linear-interpolation is performed only for the chrominance signal but is not performed for the luminance signal, does not occur. A noise can be further reduced in a decoded image.

Seventh Embodiment

An image coding device according to a seventh embodiment of the invention is described below. A general configuration of the coding device is similar to the block diagram in FIG. 1. This embodiment differs from the first embodiment mainly for the configurations and operations of the linear-interpolation enable/disable determining unit 103, the header coding unit 104, and the intra-prediction unit 105.

In this embodiment, chrominance interpolation enable/disable information is set every chrominance signal. That is, the chrominance interpolation enable/disable information is separated into chrominance (Cb) interpolation enable/disable information and chrominance (Cr) interpolation enable/disable information. The chrominance (Cb) interpolation enable/disable information serves as strong_intra_smoothing_cb_enable_flag. The chrominance (Cr) interpolation enable/disable information serves as strong_intra_smoothing_cr_enable_flag. The linear-interpolation enable/disable determining unit 103 determines the luminance interpolation enable/disable information, the chrominance (Cb) interpolation enable/disable information, and the chrominance (Cr) interpolation enable/disable information. It is to be noted that the enable/disable state of the chrominance (Cb) interpolation enable/disable information and the enable/disable state of the chrominance (Cr) interpolation enable/disable information can be selected only if the luminance interpolation enable/disable information indicates the enable state. If the luminance interpolation enable/disable information indicates the disable state, the chrominance (Cb) interpolation enable/disable information and the chrominance (Cr) interpolation enable/disable information indicate the disable state without exception. The header coding unit 104 codes attributes such as the type and size of an image to be input, a coding profile, the luminance interpolation enable/disable information, the chrominance (Cb) interpolation enable/disable information, and the chrominance (Cr) interpolation enable/disable information. The header coding unit 104 performs coding in accordance with the format of a sequence parameter set including the above information, and generates a bit stream as shown in FIG. 27. The luminance interpolation enable/disable information is coded as strong_intra_smoothing_enable_flag. The chrominance (Cb) interpolation enable/disable information is coded as strong_intra_smoothing_cb_enable_flag only if the luminance interpolation enable/disable information indicates the enable state. It is to be noted that if strong_intra_smoothing_enable_flag is 0, the value of strong_intra_smoothing_cb_enable_flag is set at 0, and this information is not coded. Similarly, the chrominance (Cr) interpolation enable/disable information is coded as strong_intra_smoothing_cr_enable_flag only if the luminance interpolation enable/disable information indicates the enable state. It is to be noted that if strong_intra_smoothing_enable_flag is 0, the value of strong_intra_smoothing_cr_enable_flag is set at 0, and this information is not coded. Similarly to the first embodiment, the coded data of the header is input to the integrating unit 110, and is output from the output unit 111 before coding the image.

Then, coding for an image is performed. The block dividing unit 102 performs block division like the first embodiment, and inputs the pixel values and block size of the block to the intra-prediction unit 105.

The intra-prediction unit 105 performs intra-prediction with reference to a coded neighboring pixel, and outputs an optimal intra-prediction mode, and a prediction error as the result of the intra-prediction. FIG. 28 shows a detailed block diagram of the intra-prediction unit 105. In FIG. 28, the same numeral is applied to a block having the same function as that of the intra-prediction unit in FIG. 3 of the first embodiment, and the description is omitted. An input unit 2801 receives the chrominance (Cb) interpolation enable/disable information. An input unit 2802 receives the chrominance (Cr) interpolation enable/disable information.

A chrominance linear-interpolation enable/disable judging unit 2818 differs from the chrominance linear-interpolation enable/disable judging unit 318 in FIG. 3 in that the chrominance linear-interpolation enable/disable judging unit 2818 receives the chrominance (Cb) interpolation enable/disable information and the chrominance (Cr) interpolation enable/disable information instead of the chrominance interpolation enable/disable information. Also, the difference is that outputs are individually given to the selectors 323 and 324. The chrominance linear-interpolation enable/disable judging unit 2818 receives the chrominance (Cb) interpolation enable/disable information from the input unit 2801, the chrominance (Cr) interpolation enable/disable information from the input unit 2802, and the block size nT of the luminance signal from the input unit 301. Further, the chrominance linear-interpolation enable/disable judging unit 2818 receives a pixel value of a chrominance signal (Cb) in the neighbor to be referenced, from the memory 307, and a pixel value of a chrominance signal (Cr) in the neighbor to be referenced, from the memory 308. The chrominance linear-interpolation enable/disable judging unit 2818 determines whether reference-pixel linear-interpolation processing for a chrominance signal of a block being coded is performed or not. The chrominance linear-interpolation enable/disable judging unit 2818 makes determination based on the chrominance (Cb) interpolation enable/disable information, the chrominance (Cr) interpolation enable/disable information, the pixel value of the reference pixel of the chrominance signal of the block being coded, and the block size nT of the luminance signal.

If the chrominance (Cb) interpolation enable/disable information indicates the enable state, if the block size nT of the luminance signal is 32, and if both two expressions relating to the chrominance signal (Cb) in Expressions (5) are true, reference-pixel linear-interpolation processing of the chrominance signal (Cb) is performed. At this time, the chrominance (Cb) linear-interpolation processing flag biInt-FlagCb is set at 1. If the chrominance (Cb) interpolation enable/disable information indicates the disable state, if the block size nT of the luminance signal is other than 32, or if at least one of the two expressions relating to the chrominance signal (Cb) in Expressions (5) is false, linear-interpolation processing of the chrominance signal (Cb) is not performed. At this time, the chrominance (Cb) linear-interpolation processing flag biIntFlagCb is set at 0. The chrominance (Cb) linear-interpolation processing flag biIntFlagCb is input to the selector 323.

Similarly, if the chrominance (Cr) interpolation enable/disable information indicates the enable state, if the block size nT of the luminance signal is 32, and if both two expressions relating to the chrominance signal (Cr) in Expressions (5) are true, reference-pixel linear-interpolation processing of the chrominance signal (Cr) is performed. At this time, the chrominance (Cr) linear-interpolation processing flag biIntFlagCr is set at 1. If the chrominance (Cr) interpolation enable/disable information indicates the disable state, if the block size nT of the luminance signal is other than 32, or if at least one of the two expressions relating to the chrominance signal (Cr) in Expressions (5) is false, linear-interpolation processing of the chrominance signal (Cr) is not performed. At this time, the chrominance (Cr) linear-interpolation processing flag biIntFlagCr is set at 0. The chrominance (Cr) linear-interpolation processing flag biIntFlagCr is input to the selector 324.

If the chrominance (Cb) linear-interpolation processing flag biIntFlagCb is 1, the selector 323 outputs the chrominance signal (Cb) after the linear-interpolation processing by the linear-interpolation unit 319. In contrast, if 0, the selector 323 outputs the chrominance signal (Cb) after the filter processing by the filter unit 321. The reference pixel of the chrominance signal (Cb) after either of these corrections is input to the chrominance-signal prediction-mode determining unit 328. If the chrominance (Cr) linear-interpolation processing flag biIntFlagCr is 1, the selector 324 outputs the chrominance signal (Cr) after the linear-interpolation processing by the linear-interpolation unit 320. In contrast, if 0, the selector 324 outputs the chrominance signal (Cr) after the filter processing by the filter unit 322. The reference pixel of the chrominance signal (Cr) after either of these corrections is input to the chrominance-signal prediction-mode determining unit 328.

FIG. 29 is a flowchart representing coding processing in the image coding device according to the seventh embodiment. In the same figure, the same numerals are applied to blocks having the same functions as those in FIG. 5 of the first embodiment, and the description is omitted.

In step S2901, if the linear-interpolation enable/disable determining unit 103 determines that the luminance interpolation enable/disable information indicates the enable state in step S501, the process advances to step S2904. Otherwise, the process advances to step S2902. In step S2902, the linear-interpolation enable/disable determining unit 103 sets both the chrominance (Cb) interpolation enable/disable information and the chrominance (Cr) interpolation enable/disable information at the disable states. In step S2903, only strong_intra_smoothing_enable_flag is coded. However, strong_intra_smoothing_cb_enable_flag and strong_intra_smoothing_cr_enable_flag are not coded. In step S2904, the linear-interpolation enable/disable determining unit 103 sets both the chrominance (Cb) interpolation enable/disable information and the chrominance (Cr) interpolation enable/disable information. In step S2905, the header coding unit 104 codes a sequence header. At this time, luminance interpolation enable/disable information strong_intra_smoothing_enable_flag is coded. Then, chrominance (Cb) interpolation enable/disable information strong_intra_smoothing_cb_enable_flag is coded. Further, chrominance (Cr) interpolation enable/disable information strong_intra_smoothing_cr_enable_flag is coded.

Also, in step S2906, the intra-prediction unit 105 performs intra-prediction processing. FIGS. 30A and 30B are a flowchart expressing a detailed operation of the intra-prediction processing. In the same figure, the same numerals are applied to blocks having the same functions as those in FIG. 6 of the first embodiment, and the description is omitted.

In step S3012, the chrominance linear-interpolation enable/disable judging unit 2818 judges the chrominance (Cb) interpolation enable/disable information set in step S2902 or step S2904. If the chrominance (Cb) interpolation enable/disable information is set at the enable state, the process advances to step S3013, and if not, the process advances to step S3017. In step S3013, the chrominance linear-interpolation enable/disable judging unit 2818 judges whether or not the block size nT of the luminance signal of the block being coded is 32, if 32, the process advances to step S3014, and if not, the process advances to step S3017. In step S3014, the chrominance linear-interpolation enable/disable judging unit 2818 judges whether or not chrominance (Cb) linear-interpolation processing is performed in accordance with two expressions relating to the chrominance signal (Cb) in Expressions (5) using the chrominance signal (Cb) in the neighbor, which is a reference pixel of the chrominance signal (Cb) of the block being coded. If all the two expressions in Expressions (5) are true, the process advances to step S3015, and if not, the process advances to step S3017. In step S3015, the chrominance linear-interpolation enable/disable judging unit 2818 sets a chrominance (Cb) linear-interpolation processing flag biIntFlagCb at 1 to perform chrominance (Cb) linear-interpolation processing. In step S3016, the linear-interpolation unit 319 performs linear-interpolation processing on the pixel value in the neighbor for performing intra-prediction of the chrominance signal (Cb) of the block being coded. In step S3017, the chrominance linear-interpolation enable/disable judging unit 2818 sets the chrominance (Cb) linear-interpolation processing flag biIntFlagCb at 0 not to perform the chrominance (Cb) linear-interpolation processing. In step S3018, the filter unit 321 performs the filter processing on the pixel value in the neighbor for performing the intra-prediction of the chrominance signal (Cb) of the block being coded.

In step S3019-1, the chrominance linear-interpolation enable/disable judging unit 2818 judges the chrominance (Cr) interpolation enable/disable information set in step S2904. If the chrominance (Cr) interpolation enable/disable information is set at the enable state, the process advances to step S3019-2, and if not, the process advances to step S3022. In step S3019-2, the chrominance linear-interpolation enable/disable judging unit 2818 judges whether or not the block size nT of the luminance signal of the block being coded is 32, if 32, the process advances to step S3019-3, and if not, the process advances to step S3022. In step S3019-3, the chrominance linear-interpolation enable/disable judging unit 2818 judges whether or not chrominance-signal (Cr) linear-interpolation processing is performed in accordance with two expressions relating to the chrominance signal (Cr) in Expressions (5) using the chrominance signal (Cr) in the neighbor, which is a reference pixel of the chrominance signal (Cr) of the block being coded. If all the two expressions in Expressions (5) are true, the process advances to step S3020, and if not, the process advances to step S3022. In step S3020, the chrominance linear-interpolation enable/disable judging unit 2818 sets a chrominance (Cr) linear-interpolation processing flag biIntFlagCr at 1 to perform chrominance (Cr) linear-interpolation processing. In step S3021, the linear-interpolation unit 320 performs linear-interpolation processing on the pixel value in the neighbor for performing intra-prediction of the chrominance signal (Cr) of the block being coded. In step S3022, the chrominance linear-interpolation enable/disable judging unit 2818 sets the chrominance (Cr) linear-interpolation processing flag biIntFlagCr at 0 not to perform the chrominance (Cr) linear-interpolation processing. In step S3023, the filter unit 322 performs the filter processing on the pixel value in the neighbor for performing the intra-prediction of the chrominance signal (Cr) of the block being coded. Then, an intra-prediction mode of the chrominance signal is determined, and a prediction error of each chrominance signal is calculated, similarly to the first embodiment. Referring back to FIG. 29, coding is performed similarly to the first embodiment.

With the above-described configurations and operations, in the image coding, the linear-interpolation processing can be performed individually on the reference pixels of the chrominance signals in addition to the luminance signal. A noise like contouring in chrominance is further reduced. For example, if the chrominance signal is expanded to 4:4:4, the three primary colors of RGB may be directly treated as Cr, Y, and Cb instead of the chrominance signal, like H.264. At this time, a noise can be removed only from a color dominant in noise. At this time, the processing may be performed not for all colors, and hence the amount of processing can be reduced.

In this embodiment, the chrominance linear-interpolation enable/disable judging unit 2818 is described to collectively perform the judgment on the enable/disable state of the linear-interpolation processing of the chrominance signal (Cb) and the chrominance signal (Cr). However, it is not limited thereto. A linear-interpolation enable/disable judging unit for the chrominance signal (Cb) and a linear-interpolation enable/disable judging unit for the chrominance signal (Cr) may be separately configured.

Eighth Embodiment

An image decoding device according to an eighth embodiment of the invention is described below. In this embodiment, decoding of the coded data generated in the seventh embodiment is described as an example. A general configuration of the image decoding device is similar to the block diagram in FIG. 8 of the second embodiment. This embodiment differs from the second embodiment mainly for the configurations and operations of the header decoding unit 803, the linear-interpolation enable/disable setting unit 804, and the intra-prediction unit 806.

The header decoding unit 803 decodes strong_intra_smoothing_enable_flag representing luminance interpolation enable/disable information, and reproduces the luminance interpolation enable/disable information. The linear-interpolation enable/disable setting unit 804 holds the luminance interpolation enable/disable information. If the value of strong_intra_smoothing_enable_flag is 1, that is, if the luminance interpolation enable/disable information indicates the enable state, strong_intra_smoothing_cb_enable_flag is decoded. Chrominance (Cb) interpolation enable/disable information, which is the result of decoding, is held in the linear-interpolation enable/disable setting unit 804. Similarly, strong_intra_smoothing_cr_enable_flag is decoded. Chrominance (Cr) interpolation enable/disable information, which is the result of decoding, is held in the linear-interpolation enable/disable setting unit 804. Also, if the value of strong_intra_smoothing_enable_flag is 0, the value of intra_smoothing_cb_enable_flag is set at 0. That is, the chrominance (Cb) interpolation enable/disable information indicates the disable state. Similarly, the value of intra_smoothing_cr_enable_flag is set at 0. That is, the chrominance (Cr) interpolation enable/disable information indicates the disable state. The linear-interpolation enable/disable setting unit 804 holds these pieces of information.

The intra-prediction unit 806 performs intra-prediction. FIG. 31 shows a detailed block diagram of the intra-prediction unit 806. In the same figure, the same numerals are applied to blocks having the same functions as those in FIG. 9 of the second embodiment, and the description is omitted. An input unit 3101 receives the chrominance (Cb) interpolation enable/disable information from the linear-interpolation enable/disable setting unit 804 in FIG. 8. An input unit 3102 receives the chrominance (Cr) interpolation enable/disable information from the linear-interpolation enable/disable setting unit 804 in FIG. 8.

A chrominance (Cb) linear-interpolation enable/disable judging unit 3103 determines whether reference-pixel linear-interpolation processing for a chrominance signal (Cb) is performed or not. The chrominance (Cb) linear-interpolation enable/disable judging unit 3103 receives the chrominance (Cb) interpolation enable/disable information from the input unit 3101, and the block size nT of the luminance signal from the input unit 903. Also, the chrominance (Cb) linear-interpolation enable/disable judging unit 3103 receives a pixel value of the chrominance signal (Cb) in the neighbor to be referenced, from the memory 908. The linear-interpolation enable/disable judging unit 3103 determines whether reference-pixel linear-interpolation processing for a chrominance signal (Cb) of a block being coded is performed or not. For the chrominance signal (Cb), the linear-interpolation enable/disable judging unit 3103 makes determination based on the chrominance (Cb) interpolation enable/disable information, the block size of the block being decoded, and the pixel value of the reference pixel of the chrominance signal of the block being decoded. If the chrominance (Cb) interpolation enable/disable information indicates the enable state, if the block size nT of the luminance signal is 32, and if two expressions relating to the chrominance signal (Cb) in Expressions (5) are true, reference-pixel linear-interpolation processing of the chrominance signal (Cb) is performed. At this time, the chrominance (Cb) linear-interpolation processing flag biIntFlagCb is set at 1. If the chrominance (Cb) interpolation enable/disable information indicates the disable state, if the block size nT of the luminance signal is other than 32, or if at least one of the two expressions relating to the chrominance signal (Cb) in Expressions (5) is false, linear-interpolation processing of the chrominance signal (Cb) is not performed. At this time, the chrominance (Cb) linear-interpolation processing flag biIntFlagCb is set at 0. The chrominance (Cb) linear-interpolation processing flag biIntFlagCb thus determined is input to the selector 921, and an input target is selected similarly to the second embodiment.

A chrominance (Cr) linear-interpolation enable/disable judging unit 3104 determines whether reference-pixel linear-interpolation processing for a chrominance signal (Cr) is performed or not. The chrominance (Cr) linear-interpolation enable/disable judging unit 3104 receives the chrominance (Cr) interpolation enable/disable information from the input unit 3102, and the block size nT of the luminance signal from the input unit 903. Also, the chrominance (Cr) linear-interpolation enable/disable judging unit 3104 receives a pixel value of the chrominance signal (Cb) in the neighbor to be referenced, from the memory 909. The linear-interpolation enable/disable judging unit 3104 determines whether reference-pixel linear-interpolation processing for a chrominance signal (Cr) of a block being decoded is performed or not. For the chrominance signal (Cr), the linear-interpolation enable/disable judging unit 3104 makes determination based on the chrominance (Cr) interpolation enable/disable information, the block size of the block being decoded, and the pixel value of the reference pixel of the chrominance signal of the block being decoded. If the chrominance (Cr) interpolation enable/disable information indicates the enable state, if the block size nT of the luminance signal is 32, and if two expressions relating to the chrominance signal (Cr) in Expressions (5) are true, reference-pixel linear-interpolation processing of the chrominance signal (Cr) is performed. At this time, the chrominance (Cr) linear-interpolation processing flag biIntFlagCr is set at 1. If the chrominance (Cr) interpolation enable/disable information indicates the disable state, if the block size nT of the luminance signal is other than 32, or if at least one of the two expressions relating to the chrominance signal (Cr) in Expressions (5) is false, linear-interpolation processing of the chrominance signal (Cr) is not performed. At this time, the chrominance (Cr) linear-interpolation processing flag biIntFlagCr is set at 0. The chrominance (Cr) linear-interpolation processing flag biIntFlagCr thus determined is input to the selector 922, and an input target is selected similarly to the second embodiment. Decoding processing and intra-prediction are performed similarly to the eighth embodiment, and the decoded image is reproduced.

FIG. 32 is a flowchart representing decoding processing in the image decoding device according to the eighth embodiment. In the same figure, the same numerals are applied to blocks having the same functions as those in FIG. 18 of the fourth embodiment, and the description is omitted. In step S3201, if the luminance interpolation enable/disable information indicates the enable state in step S1801, the process advances to step S3202. Otherwise, the process advances to step S3203. In step S3202, the header decoding unit 803 decodes strong_intra_smoothing_cb_enable_flag. Then, the linear-interpolation enable/disable setting unit 804 sets the chrominance (Cb) interpolation enable/disable information in accordance with the value. Further, the header decoding unit 803 decodes strong_intra_smoothing_cr_enable_flag. Then, the linear-interpolation enable/disable setting unit 804 sets the chrominance (Cr) interpolation enable/disable information in accordance with the value. In step S3203, the linear-interpolation enable/disable setting unit 804 sets both the chrominance (Cb) interpolation enable/disable information and the chrominance (Cr) interpolation enable/disable information at the disable states.

Also, in step S3210, the intra-prediction unit 806 performs intra-prediction processing. FIGS. 33A and 33B are a flowchart expressing a detailed operation of the intra-prediction processing. In the same figure, the same numerals are applied to blocks having the same functions as those in FIGS. 11A and 11B of the second embodiment, and the description is omitted.

In step S3301, the chrominance (Cb) linear-interpolation enable/disable judging unit 3103 judges the chrominance (Cb) interpolation enable/disable information. If the chrominance (Cb) interpolation enable/disable information indicates the enable state, the process advances to step S3302, and if not, the process advances to step S3306. In step S3302, the chrominance (Cb) linear-interpolation enable/disable judging unit 3103 judges whether the block size nT of the luminance signal is 32 or not. If the block size nT of the luminance signal is 32, the process advances to step S3303, and if not, the process advances to step S3306.

In step S3303, if the chrominance signal (Cb) of the reference pixel satisfies both the two expressions relating to the chrominance signal (Cb) in Expressions (5), the process advances to step S3304, and if not, the process advances to step S3306. In step S3304, the chrominance (Cb) linear-interpolation processing flag biIntFlagCb is set at 1. In step S3305, linear-interpolation processing is performed as reference-pixel correction processing of the chrominance signal (Cb). Actually, the selector 921 selects the output of the linear-interpolation unit 917. In step S3306, the chrominance (Cb) linear-interpolation processing flag biIntFlagCb is set at 0. In step S3307, filter processing is performed as reference-pixel correction processing of the chrominance signal (Cb). Actually, the selector 921 selects the output of the filter unit 919. In step S3308, the chrominance-signal predicting unit 923 judges whether filterFlagC[interPredModeC] obtained in accordance with the decoded interPredModeC determined in step S1111 is 1 or not. If the filterFlagC[interPredModeC] indicates the enable state, the process advances to step S3309, and if not, the process advances to step S3310.

In step S3309, the chrominance-signal predicting unit 923 performs intra-prediction without the reference pixel value of the chrominance signal (Cb) with the correction processing performed, and generates a prediction pixel value. In step S3310, the chrominance-signal predicting unit 923 performs intra-prediction by using the reference pixel value of the chrominance signal (Cb) with the correction processing performed, and generates a prediction pixel value of the chrominance signal (Cb).

In step S3311, the chrominance (Cr) linear-interpolation enable/disable judging unit 3104 judges the chrominance (Cr) interpolation enable/disable information. If the chrominance (Cr) interpolation enable/disable information indicates the enable state, the process advances to step S3312, and if not, the process advances to step S3313.

In step S3312, the chrominance (Cr) linear-interpolation enable/disable judging unit 3104 judges whether the block size nT of the luminance signal is 32 or not. If the block size nT is 32, the process advances to step S3313, and if not, the process advances to step S3316.

In step S3313, if the chrominance signal (Cr) of the reference pixel satisfies both the two expressions relating to the chrominance signal (Cr) in Expressions (5), the process advances to step S3314, and if not, the process advances to step S3316. In step S3314, the chrominance (Cr) linear-interpolation processing flag biIntFlagCr is set at 1. In step S3315, linear-interpolation processing is performed as reference-pixel correction processing of the chrominance signal (Cr). Actually, the selector 922 selects the output of the linear-interpolation unit 918. In step S3316, the chrominance (Cr) linear-interpolation processing flag biIntFlagCr is set at 0. In step S3317, filter processing is performed as reference-pixel correction processing of the chrominance signal (Cr). Actually, the selector 922 selects the output of the filter unit 920. In step S3318, the chrominance-signal predicting unit 923 judges whether filterFlagC[interPredModeC] obtained in accordance with the decoded interPredModeC determined in step S1111 is 1 or not. If the filterFlagC[interPredModeC] indicates the enable state, the process advances to step S3319, and if not, the process advances to step S3320. In step S3319, the chrominance-signal predicting unit 923 performs intra-prediction without the reference pixel value of the chrominance signal (Cr) with the correction processing performed, and generates a prediction pixel value of the chrominance signal (Cr). In step S3320, the chrominance-signal predicting unit 923 performs intra-prediction without the reference pixel value of the chrominance signal (Cr) with the correction processing performed, and generates a prediction pixel value of the chrominance signal (Cr).

Then, intra-prediction of each chrominance signal is performed, and a prediction error of each chrominance signal is calculated, similarly to the second embodiment. Referring back to FIG. 32, decoding is performed similarly to the second embodiment.

With the above-described configurations and operations, in the image decoding, the linear-interpolation processing can be performed on the reference pixel of the chrominance signal in addition to the luminance signal. A noise like contouring in chrominance is reduced. Also, the enable/disable state of the linear-interpolation processing of the chrominance signal is determined in association with the enable/disable state of the linear-interpolation processing of the luminance signal, a noise like contouring of which is dominant in image quality. The linear-interpolation processing is performed only on the luminance signal. Accordingly, mismatching, in which the linear-interpolation processing is not performed for the chrominance signal, does not occur. A noise can be further reduced in a decoded image. For example, if the chrominance signal is expanded to 4:4:4, the three primary colors of RGB may be directly treated as Cr, Y, and Cb instead of the chrominance signal, like H.264. At this time, a noise can be removed only from a color dominant in noise.

Ninth Embodiment

An image coding device according to a ninth embodiment of the invention is described below. A general configuration of the coding device is similar to the block diagram in FIG. 1. In this embodiment, the image data is described as an image with luminance and chrominance signals being 4:4:4. However, it is not limited thereto. This embodiment differs from the first embodiment mainly for the configurations and operations of the linear-interpolation enable/disable determining unit 103, the header coding unit 104, and the intra-prediction unit 105. In this embodiment, chrominance interpolation (Cb) enable/disable information and chrominance (Cr) interpolation enable/disable information are provided, similarly to the seventh embodiment. Also, strong_intra_smoothing_cb_enable_flag and strong_intra_smoothing_cr_enable_flag are used as codes indicative of these pieces of information. The linear-interpolation enable/disable determining unit 103 determines the luminance interpolation enable/disable information, the chrominance (Cb) interpolation enable/disable information, and the chrominance (Cr) interpolation enable/disable information, similarly to the seventh embodiment. In this case, it is assumed that the luminance interpolation enable/disable information, the chrominance (Cb) interpolation enable/disable information, and the chrominance (Cr) interpolation enable/disable information can be individually selected. The header coding unit 104 codes attributes such as the type and size of an image to be input, a coding profile, the luminance interpolation enable/disable information, the chrominance (Cb) interpolation enable/disable information, and the chrominance (Cr) interpolation enable/disable information. The header coding unit 104 performs coding in accordance with the format of a sequence parameter set including the above information, and generates a bit stream as shown in FIG. 34. The luminance interpolation enable/disable information is coded as strong_intra_smoothing_enable_flag. Then, the chrominance (Cb) interpolation enable/disable information is coded as strong_intra_smoothing_cb_enable_flag. Further, the chrominance (Cr) interpolation enable/disable information is coded as strong_intra_smoothing_cr_enable_flag. Similarly to the first embodiment, the coded data of the header is input to the integrating unit 110, and is output from the output unit 111 before coding the image.

Then, coding for an image is performed. The block dividing unit 102 performs block division like the first embodiment, and inputs the pixel values and block size of the block to the intra-prediction unit 105. The intra-prediction unit 105 performs intra-prediction with reference to a coded neighboring pixel, and outputs an optimal intra-prediction mode, and a prediction error as the result of the intra-prediction. FIG. 35 shows a detailed block diagram of the intra-prediction unit 105. In FIG. 35, the same numeral is applied to a block having the same function as that of the intra-prediction unit in FIG. 28 of the seventh embodiment, and the description is omitted.

A chrominance (Cb) linear-interpolation enable/disable judging unit 3501 receives chrominance (Cb) interpolation enable/disable information, and a reference pixel of the chrominance signal (Cb) from the memory 307. A chrominance (Cb) linear-interpolation processing flag biIntFlagCb is determined from these pieces of information and the block size. Similarly, if the chrominance (Cb) interpolation enable/disable information indicates the enable state, if the block size nT of the luminance signal is 32, and if both two expressions relating to the chrominance signal (Cb) in Expressions (5) are true, reference-pixel linear-interpolation processing of the chrominance signal (Cb) is performed. At this time, the chrominance (Cb) linear-interpolation processing flag biIntFlagCb is set at 1. If the chrominance interpolation enable/disable information indicates the disable state, if the block size nT of the luminance signal is other than 32, or if at least one of the two expressions relating to the chrominance signal (Cb) in Expressions (5) is false, linear-interpolation processing of the chrominance signal (Cb) is not performed. At this time, the chrominance (Cb) linear-interpolation processing flag biIntFlagCb is set at 0. The chrominance (Cb) linear-interpolation processing flag biIntFlagCb is input to the selector 323.

Also, a chrominance (Cr) linear-interpolation enable/disable judging unit 3502 receives chrominance (Cr) interpolation enable/disable information, and a reference pixel of the chrominance signal (Cr) from the memory 308. A chrominance (Cr) linear-interpolation processing flag biIntFlagCr is determined from these pieces of information and the block size. If the chrominance (Cr) interpolation enable/disable information indicates the enable state, if the block size nT of the luminance signal is 32, and if both two expressions relating to the chrominance signal (Cr) in Expressions (5) are true, reference-pixel linear-interpolation processing of the chrominance signal (Cr) is performed. At this time, the chrominance (Cr) linear-interpolation processing flag biIntFlagCr is set at 1. If the chrominance interpolation enable/disable information indicates the disable state, if the block size nT of the luminance signal is other than 32, or if at least one of the two expressions relating to the chrominance signal (Cr) in Expressions (5) is false, linear-interpolation processing of the chrominance signal (Cr) is not performed. At this time, the chrominance (Cr) linear-interpolation processing flag biIntFlagCr is set at 0. The chrominance (Cr) linear-interpolation processing flag biIntFlagCr is input to the selector 324. The selector 323 and the selector 324 are operated similarly to the seventh embodiment. The output of the selector 323 is input to a chrominance-signal (Cb) prediction-mode determining unit 3503, and the output of the selector 324 is input to a chrominance-signal (Cr) prediction-mode determining unit 3504.

The chrominance-signal (Cb) prediction-mode determining unit 3503 differs from the chrominance-signal prediction-mode determining unit 328 in the seventh embodiment in that the chrominance-signal (Cb) prediction-mode determining unit 3503 determines an intra-prediction mode and calculates a prediction error only for the chrominance signal (Cb). The chrominance-signal (Cb) prediction-mode determining unit 3503 receives the reference pixel value of the chrominance signal (Cb) with the correction processing performed, from the selector 323, and the reference pixel value of the chrominance signal (Cb) without the correction processing, from the memory 307. Also, the chrominance-signal (Cb) prediction-mode determining unit 3503 receives filterFlagC[0 . . . 34], which represents whether or not the reference-pixel correction processing of the chrominance signal is performed every prediction mode, from the chrominance reference-pixel generation-method selecting unit 317. Further, the chrominance-signal (Cb) prediction-mode determining unit 3503 receives the pixel value of the chrominance signal (Cb) of the block being coded from the memory 326. The chrominance-signal (Cb) prediction-mode determining unit 3503 calculates a prediction error every intra-prediction mode. To calculate the prediction error, the chrominance-signal (Cb) prediction-mode determining unit 3503 selects whether the reference pixel value with the reference-pixel correction processing performed is used or the pixel value without the processing is used, as the reference pixel of the chrominance signal (Cb), in accordance with filterFlagC[0 . . . 34]. With use of the selected reference pixel value of the chrominance signal (Cb), a prediction pixel value of the chrominance signal (Cb) is calculated by using the reference pixel value according to the intra-prediction mode. Calculated prediction pixel values of the chrominance signal (Cb) are compared, and an intra-prediction mode that provides the smallest prediction error is used as the intra-prediction mode of the chrominance signal (Cb) of the block being coded. The intra-prediction mode of the chrominance signal (Cb) is output to the prediction determining unit 107 in FIG. 1 through an output unit 3505. The smallest prediction error of the chrominance signal (Cb) is output to the prediction determining unit 107 in FIG. 1 through an output unit 3506.

The chrominance-signal (Cr) prediction-mode determining unit 3504 differs from the chrominance-signal prediction-mode determining unit 328 in the seventh embodiment in that the chrominance-signal (Cr) prediction-mode determining unit 3504 determines an intra-prediction mode and calculates a prediction error only for the chrominance signal (Cr). The chrominance-signal (Cr) prediction-mode determining unit 3504 receives the reference pixel value of the chrominance signal (Cr) with the correction processing performed, from the selector 324, and the reference pixel value of the chrominance signal (Cr) without the correction processing, from the memory 308. Also, the chrominance-signal (Cr) prediction-mode determining unit 3504 receives filterFlagC[0 . . . 34], which represents whether or not the reference-pixel correction processing of the chrominance signal is performed every prediction mode, from the chrominance reference-pixel generation-method selecting unit 317. Further, the prediction-mode determining unit 3504 receives the pixel value of the chrominance signal (Cr) of the block being coded from the memory 327. The chrominance-signal (Cr) prediction-mode determining unit 3504 calculates a prediction error every intra-prediction mode. To calculate the prediction error, the chrominance-signal (Cr) prediction-mode determining unit 3504 selects whether the reference pixel value with the reference-pixel correction processing performed is used or the pixel value without the processing is used, as the reference pixel of the chrominance signal (Cr), in accordance with filterFlagC[0 . . . 34]. With use of the selected reference pixel value of the chrominance signal (Cr), a prediction pixel value of the chrominance signal (Cr) is calculated by using the reference pixel value according to the intra-prediction mode. Calculated prediction pixel values of the chrominance signal (Cr) are compared, and an intra-prediction mode that provides the smallest prediction error is used as the intra-prediction mode of the chrominance signal (Cr) of the block being coded. The intra-prediction mode of the chrominance signal (Cr) is output to the prediction determining unit 107 in FIG. 1 through an output unit 3507. The smallest prediction error of the chrominance signal (Cr) is output to the prediction determining unit 107 in FIG. 1 through an output unit 3508. If the prediction determining unit 107 causes the coding mode to be the intra-coding mode, the entropy coding unit 109 codes the intra-prediction mode of the chrominance signal (Cb) and the intra-prediction mode of the chrominance signal (Cr) instead of the chrominance intra-prediction mode unlike the first embodiment.

FIG. 36 is a flowchart representing coding processing in the image coding device according to the ninth embodiment. In the same figure, the same numerals are applied to blocks having the same functions as those in FIG. 29 of the seventh embodiment, and the description is omitted. In step S3601, the linear-interpolation enable/disable determining unit 103 determines the enable/disable state of reference-pixel linear-interpolation processing of the chrominance signal (Cb). In step S3602, the linear-interpolation enable/disable determining unit 103 determines the enable/disable state of reference-pixel linear-interpolation processing of the chrominance signal (Cr). In step S3603, the header coding unit 104 codes strong_intra_smoothing_enable_flag. Then, the header coding unit 104 codes strong_intra_smoothing_cb_enable_flag and strong_intra_smoothing_cr_enable_flag.

Also, in step S2906, the intra-prediction unit 105 performs intra-prediction processing. The operation of the intra-prediction in this embodiment is similar to the seventh embodiment, and hence the description is omitted. Coding is performed like the first embodiment.

With the above-described configurations and operations, in the image coding, the linear-interpolation processing can be individually performed on the reference pixels of the luminance signal and the respective chrominance signals. A noise is efficiently reduced in a signal, which is likely affected by a noise like contouring.

In this embodiment, the intra-prediction mode of the chrominance signal is coded for each of the chrominance signal (Cb) and the chrominance signal (Cr); however, it is not limited thereto. For example, the intra-prediction mode of the chrominance signal as shown in FIG. 28 may be commonly used.

Tenth Embodiment

An image decoding device according to a tenth embodiment of the invention is described below. In this embodiment, decoding of the coded data generated in the ninth embodiment is described as an example. A general configuration of the image decoding device is similar to the block diagram in FIG. 8 of the second embodiment. This embodiment differs from the second embodiment mainly for the configurations and operations of the header decoding unit 803, the linear-interpolation enable/disable setting unit 804, the entropy decoding unit 805, and the intra-prediction unit 806.

The header decoding unit 803 decodes strong_intra_smoothing_enable_flag representing luminance interpolation enable/disable information, and reproduces the luminance interpolation enable/disable information. The linear-interpolation enable/disable setting unit 804 holds the luminance interpolation enable/disable information. Then, the header decoding unit 803 decodes strong_intra_smoothing_cb_enable_flag representing chrominance (Cb) interpolation enable/disable information, and reproduces the chrominance (Cb) interpolation enable/disable information. The linear-interpolation enable/disable setting unit 804 holds the chrominance (Cb) interpolation enable/disable information. Further, the header decoding unit 803 decodes strong_intra_smoothing_cr_enable_flag representing chrominance (Cr) interpolation enable/disable information, and reproduces the chrominance (Cr) interpolation enable/disable information. The linear-interpolation enable/disable setting unit 804 holds the chrominance (Cr) interpolation enable/disable information.

The entropy decoding unit 805 decodes and reproduces the intra-prediction mode of the chrominance signal (Cb) and the intra-prediction mode of the chrominance signal (Cr) if the coding mode of a block being decoded is an intra-prediction mode.

The intra-prediction unit 806 performs intra-prediction. FIG. 37 shows a detailed block diagram of the intra-prediction unit 806. In the same figure, the same numerals are applied to blocks having the same functions as those in FIG. 31 of the eighth embodiment, and the description is omitted. An input unit 3701 receives an intra-prediction mode of the chrominance signal (Cb) reproduced by the entropy decoding unit 805. An input unit 3702 receives an intra-prediction mode of the chrominance signal (Cr) reproduced by the entropy decoding unit 805.

A chrominance-signal (Cb) predicting unit 3703 receives the block size nT from the input unit 903, and an intra-prediction mode intraPredModeCb of the chrominance signal (Cb) from the input unit 3701. Further, the chrominance-signal (Cb) predicting unit 3703 receives a reference pixel with the reference-pixel correction processing of the chrominance signal (Cb) performed, from the selector 921, and the decoded reference pixel value of the chrominance signal (Cb) in the neighbor of the block being decoded, from the memory 908. The chrominance-signal (Cb) predicting unit 3703 calculates minDistVerHor from the input intraPredModeCb and compares the block size nT with intraHorVerDistThreshC[nT] obtained from Table 2. If minDistVerHor is larger than intraHorVerDistThreshC[nT], the reference-pixel correction processing of the chrominance signal is performed. For the chrominance signal (Cb), intra-prediction is performed in accordance with intraPredModeCb, which is the output from the selector 921 and the input as the reference pixel value. If minDistVerHor is small, the intra-prediction is performed in accordance with intraPredModeCb by using the reference pixel value read from the memory 908. The prediction pixel value of the chrominance signal (Cb) obtained by the intra-prediction is output from an output unit 3705 to the pixel reproducing unit 809 in FIG. 8.

Similarly, a chrominance-signal (Cr) predicting unit 3704 receives the block size nT from the input unit 903, and an intra-prediction mode intraPredModeCr of the chrominance signal (Cr) from the input unit 3702. Further, the chrominance-signal (Cr) predicting unit 3704 receives the reference pixel with the reference-pixel correction processing of the chrominance signal (Cr) performed, from the selector 922, and the decoded reference pixel value of the chrominance signal (Cr) in the neighbor of the block being decoded, from the memory 909. The chrominance-signal (Cr) predicting unit 3704 calculates minDistVerHor from the input intraPredModeCr and compares the block size nT with intraHorVerDistThreshC[nT] obtained from Table 2. If minDistVerHor is larger than intraHorVerDistThreshC[nT], the reference-pixel correction processing of the chrominance signal is performed. For the chrominance signal (Cr), the chrominance-signal (Cr) predicting unit 3704 performs intra-prediction in accordance with intraPredModeCr, which is the output from the selector 921 and input as the reference pixel value. If minDistVerHor is small, intra-prediction is performed in accordance with intraPredModeCr by using the reference pixel value read from the memory 909. The prediction pixel value of the chrominance signal (Cr) obtained by the intra-prediction is output from an output unit 3706 to the pixel reproducing unit 809 in FIG. 8. Decoding processing is performed similarly to the eighth embodiment, and the decoded image is reproduced.

FIG. 38 is a flowchart representing decoding processing in the image decoding device according to the tenth embodiment. In the same figure, the same numerals are applied to blocks having the same functions as those in FIG. 18 of the fourth embodiment, and the description is omitted. In step S3802, the header decoding unit 803 decodes strong_intra_smoothing_enable_flag. Then, the header decoding unit 803 decodes strong_intra_smoothing_cb_enable_flag representing chrominance (Cb) interpolation enable/disable information. Further, the header decoding unit 803 decodes strong_intra_smoothing_cr_enable_flag representing chrominance (Cr) interpolation enable/disable information.

Also, in step S3810, the intra-prediction unit 806 performs intra-prediction processing. FIGS. 39A and 39B are a flowchart expressing a detailed operation of the intra-prediction processing. In the same figure, the same numerals are applied to blocks having the same functions as those in FIGS. 33A and 33B of the eighth embodiment, and the description is omitted. In step S3901, the predicting unit 3703 calculates filterFlagCb[interPredModeCb] from interPredModeCb and the block size nT by using Table 2. In step S3902, the predicting unit 3704 calculates filterFlagCr[interPredModeCr] from interPredModeCr and the block size nT by using Table 2.

In step S3903, if filterFlagCb[interPredModeCb] obtained in step S3901 is 1, the process advances to step S3904, and if not, the process advances to step S3905. In step S3904, the prediction unit 3703 performs intra-prediction in accordance with an intra-prediction mode interPredModeCb of the chrominance signal (Cb) by using the reference pixel with the reference-pixel correction processing of the chrominance signal (Cb) performed. In step S3905, the prediction unit 3703 performs intra-prediction in accordance with an intra-prediction mode interPredModeCb of the chrominance signal (Cb) by using the reference pixel value without the reference-pixel correction processing of the chrominance signal (Cb).

In step S3906, if filterFlagCr[interPredModeCr] obtained in step S3902 is 1, the process advances to step S3907, and if not, the process advances to step S3908. In step S3907, the prediction unit 3704 performs intra-prediction in accordance with an intra-prediction mode interPredModeCr of the chrominance signal (Cr) by using the reference pixel with the reference-pixel correction processing of the chrominance signal (Cr) performed. In step S3908, the prediction unit 3704 performs intra-prediction in accordance with an intra-prediction mode interPredModeCr of the chrominance signal (Cr) by using the reference pixel value without the reference-pixel correction processing of the chrominance signal (Cr). Referring back to FIG. 38, decoding is performed similarly to the second embodiment.

With the above-described configurations and operations, in the image decoding, the linear-interpolation processing can be individually performed on the reference pixels of the luminance signal and the respective chrominance signals. A noise is efficiently reduced in a signal, which is likely affected by a noise like contouring.

Eleventh Embodiment

An image coding device according to an eleventh embodiment of the invention is described below. A general configuration of the coding device is similar to the block diagram in FIG. 1. In this embodiment, the image data is described as an image with luminance and chrominance signals being 4:4:4. However, it is not limited thereto. This embodiment differs from the first embodiment mainly for the configurations and operations of the linear-interpolation enable/disable determining unit 103, the header coding unit 104, and the intra-prediction unit 105. In this embodiment, information representing whether reference-pixel linear-interpolation processing is enabled/disabled simultaneously for both a luminance signal and chrominance signals serves as interpolation enable/disable information, similarly to the third embodiment. Also, the code representing the interpolation enable/disable information is strong_intra_smoothing_enable_flag, similarly to the third embodiment. The linear-interpolation enable/disable determining unit 103 determines the interpolation enable/disable information similarly to the third embodiment. The header coding unit 104 codes attributes such as the type and size of an image to be input, a coding profile, and the interpolation enable/disable information. The header coding unit 104 performs coding in accordance with the format of a sequence parameter set including the above information, and generates a bit stream as shown in FIG. 12. The interpolation enable/disable information is coded as strong_intra_smoothing_enable_flag. Similarly to the first embodiment, the coded data of the header is input to the integrating unit 110, and is output from the output unit 111 before coding an image.

Then, coding for an image is performed. The block dividing unit 102 performs block division like the first embodiment, and inputs the pixel values and block size of the block to the intra-prediction unit 105.

The intra-prediction unit 105 performs intra-prediction with reference to a coded neighboring pixel, and outputs an optimal intra-prediction mode, and a prediction error as the result of the intra-prediction. FIG. 40 shows a detailed block diagram of the intra-prediction unit 105. In FIG. 40, the same numeral is applied to a block having the same function as that of the intra-prediction unit in FIG. 35 of the ninth embodiment, and the description is omitted.

A chrominance (Cb) linear-interpolation enable/disable judging unit 4101 receives interpolation enable/disable information input from the input unit 1302, and a reference pixel of the chrominance signal (Cb) from the memory 307. A chrominance (Cb) linear-interpolation processing flag biIntFlagCb is determined from these pieces of information and the block size. If the interpolation enable/disable information indicates the enable state, if the block size nT of the chrominance signal is 32, and if both two expressions relating to the chrominance signal (Cb) in Expressions (5) are true, reference-pixel linear-interpolation processing of the chrominance signal (Cb) is performed. At this time, the chrominance (Cb) linear-interpolation processing flag biIntFlagCb is set at 1. If the interpolation enable/disable information indicates the disable state, if the block size nT of the chrominance signal (Cb) is other than 32, or if at least one of the two expressions relating to the chrominance signal (Cb) in Expressions (5) is false, linear-interpolation processing of the chrominance signal (Cb) is not performed. At this time, the chrominance (Cb) linear-interpolation processing flag biIntFlagCb is set at 0. The chrominance (Cb) linear-interpolation processing flag biIntFlagCb is input to the selector 323.

A chrominance (Cr) linear-interpolation enable/disable judging unit 4102 receives interpolation enable/disable information input from the input unit 1302, and a reference pixel of the chrominance signal (Cr) from the memory 308. A chrominance (Cr) linear-interpolation processing flag biIntFlagCr is determined from these pieces of information and the block size. If the interpolation enable/disable information indicates the enable state, if the block size nT of the chrominance signal is 32, and if both two expressions relating to the chrominance signal (Cr) in Expressions (5) are true, reference-pixel linear-interpolation processing of the chrominance signal (Cr) is performed. At this time, the chrominance (Cr) linear-interpolation processing flag biIntFlagCr is set at 1. If the interpolation enable/disable information indicates the disable state, if the block size nT of the chrominance signal (Cr) is other than 32, or if at least one of the two expressions relating to the chrominance signal (Cr) in Expressions (5) is false, linear-interpolation processing of the chrominance signal (Cr) is not performed. At this time, the chrominance (Cr) linear-interpolation processing flag biIntFlagCr is set at 0. The chrominance (Cr) linear-interpolation processing flag biIntFlagCr is input to the selector 324.

The selector 323 and the selector 324 are operated similarly to the ninth embodiment. The output of the selector 323 is input to the chrominance-signal (Cb) prediction-mode determining unit 3503, and the output of the selector 324 is input to the chrominance-signal (Cr) prediction-mode determining unit 3504.

A chrominance (Cb) reference-pixel generation-method selecting unit 4103 judges whether or not reference-pixel correction processing is performed every intra-prediction mode based on the input block size nT of the chrominance signal (Cb). A chrominance (Cr) reference-pixel generation-method selecting unit 4104 judges whether or not reference-pixel correction processing is performed every intra-prediction mode based on the input block size nT of the chrominance signal (Cr). The relationship between the block size nT and the direction of the intra-prediction may employ a method described in chapter 8.4.4.2.3 of NPL 2. Similarly to the chrominance signal (Cb), the chrominance (Cr) reference-pixel generation-method selecting unit 4104 judges whether or not reference-pixel correction processing is performed every intra-prediction mode based on the input block size nT of the chrominance signal (Cr).

The chrominance-signal (Cb) prediction-mode determining unit 3503 determines an intra-prediction mode and calculates a prediction error only for the chrominance signal (Cb) similarly to the ninth embodiment. Also, the chrominance-signal (Cr) prediction-mode determining unit 3504 determines an intra-prediction mode and calculates a prediction error only for the chrominance signal (Cr) similarly to the ninth embodiment.

A flowchart of coding processing in the image coding device according to the eleventh embodiment is similar to FIG. 15 of the third embodiment. A different point is the content of processing of intra-prediction in step S1506. FIGS. 41A and 41B are a flowchart expressing a detailed operation of the intra-prediction processing. In the same figure, the same numerals are applied to blocks having the same functions as those in FIGS. 30A and 30B of the ninth embodiment, and the description is omitted.

In step S4101, the luminance linear-interpolation enable/disable judging unit 310 judges the interpolation enable/disable information of the block being coded set in step S1501. If the interpolation enable/disable information is set at the enable state, the process advances to step S603, and if not, the process advances to step S607. In step S4102, the chrominance (Cb) linear-interpolation enable/disable judging unit 4101 judges the interpolation enable/disable information of the block being coded set in step S1501. If the interpolation enable/disable information is set at the enable state, the process advances to step S3013, and if not, the process advances to step S3017. In step S4103, the chrominance (Cr) linear-interpolation enable/disable judging unit 4102 judges the interpolation enable/disable information of the block being coded set in step S1501. If the interpolation enable/disable information is set at the enable state, the process advances to step S3019-2, and if not, the process advances to step S3022.

With the above-described configurations and operations, in the image coding, the judgment on the enable/disable state can be collectively performed for the luminance signal and the respective chrominance signals. Accordingly, codes can be switched in accordance with the presence of the function of linear-interpolation at the decoding side. Further, the judgment on whether the linear-interpolation is performed or not is made individually for the luminance signal and the respective chrominance signals. Accordingly, the linear-interpolation processing can be performed on a reference pixel every signal. That is, coded data with a noise appropriately reduced can be generated for a signal, which is likely affected by a noise like contouring in each signal.

In this embodiment, the intra-prediction mode of the chrominance signal is coded for each of the chrominance signal (Cb) and the chrominance signal (Cr); however, it is not limited thereto. For example, the intra-prediction mode of the chrominance signal may be commonly used like the chrominance-signal prediction-mode determining unit 328 shown in FIG. 28.

In this embodiment, the interpolation enable/disable information is coded while being included in a sequence parameter set; however, it is not limited thereto. The interpolation enable/disable information may be included in coded data of a header, such as a picture parameter set or a slice header.

This embodiment is described based on an example of 4:4:4. Hence, the luminance signal and the chrominance signal have the same block size. At this time, the output of the luminance reference-pixel generation-method selecting unit 309 may be input to the chrominance-signal (Cb) prediction-mode determining unit 3503 instead of the output of the chrominance (Cb) reference-image generation-method selecting unit 4103. Similarly, the output of the luminance reference-pixel generation-method selecting unit 309 may be input to the chrominance-signal (Cr) prediction-mode determining unit 3504 instead of the output of the chrominance (Cr) reference-image generation-method selecting unit 4104.

In FIGS. 41A and 41B, the processing of step S3901 and step S3902 is performed before step S3301; however, it is not limited thereto. The processing of step S3901 is only required to be performed before step S3303, and may be performed after step S3302. The processing of step S3902 is only required to be performed before step S3313, and may be performed after step S3312.

This embodiment is described that an image signal is 4:4:4. However, it is not limited thereto. For example, an image signal may be 4:2:0, or 4:2:2. And the three primary colors of RGB may be directly treated as Cr, Y, and Cb instead of the chrominance signal, like H.264. Furthermore, color space of input image signal is not limited there to. For example, color space of XYZ, L*a*b* or L*u*v* may also be used. Also, this embodiment is described that the maximum size of a divided block is 64×64 pixels, and the block size for performing the linear-interpolation processing is 32×32 pixels. However, it is not limited thereto. Also, the block is not limited to a square block, and may be a rectangular block.

Also, the luminance linear-interpolation processing flag biIntFlag and the respective chrominance linear-interpolation processing flags biIntFlagCb and biIntFlagCr are each a one-bit signal. However, it is not limited thereto. A multi-bit signal may be used, and a plurality of linear-interpolation units may be switched. Alternatively, a signal indicative of not performing interpolation may be used.

Twelfth Embodiment

An image decoding device according to a twelfth embodiment of the invention is described below. In this embodiment, decoding of the coded data generated in the eleventh embodiment is described as an example. In this embodiment, the image data is described as an image with luminance and chrominance signals being 4:4:4. However, it is not limited thereto. A general configuration of the image decoding device is similar to the block diagram in FIG. 8 of the second embodiment. This embodiment differs from the second embodiment mainly for the configurations and operations of the header decoding unit 803, the linear-interpolation enable/disable setting unit 804, the entropy decoding unit 805, and the intra-prediction unit 806.

The header decoding unit 803 decodes strong_intra_smoothing_enable_flag representing interpolation enable/disable information, and reproduces the interpolation enable/disable information. The linear-interpolation enable/disable setting unit 804 holds the luminance interpolation enable/disable information.

The entropy decoding unit 805 decodes and reproduces intra-prediction modes of the luminance signal, the chrominance signal (Cb), and the chrominance signal (Cr) if the coding mode of a block being decoded is an intra-prediction mode.

The intra-prediction unit 806 performs intra-prediction. FIG. 42 shows a detailed block diagram of the intra-prediction unit 806. In the same figure, the same numerals are applied to blocks having the same functions as those in FIG. 37 of the tenth embodiment, and the description is omitted. An input unit 4302 receives interpolation enable/disable information from the linear-interpolation enable/disable setting unit 804 in FIG. 8 similarly to the input unit 1702 in FIG. 17 according to the fourth embodiment. The input interpolation enable/disable information is input to the luminance linear-interpolation enable/disable judging unit 910, a chrominance (Cb) linear-interpolation enable/disable judging unit 4303, and a chrominance (Cr) linear-interpolation enable/disable judging unit 4304.

The chrominance (Cb) linear-interpolation enable/disable judging unit 4303 receives the interpolation enable/disable information input from the input unit 4302, the block size input from the input unit 903, and the reference pixel value of the chrominance signal (Cb) in the neighbor of the block being decoded input from the memory 908. By using these values, the chrominance (Cb) linear-interpolation enable/disable judging unit 4303 calculates the chrominance linear-interpolation processing flag biIntFlagCb similarly to the chrominance (Cb) linear-interpolation enable/disable judging unit 4101 of the eleventh embodiment. If the chrominance interpolation enable/disable information indicates the enable state, if the block sizes nT of the luminance signal and the chrominance signal are 32, and if both two expressions relating to the chrominance signal (Cb) in Expressions (5) are true, the chrominance (Cb) linear-interpolation processing flag biIntFlagCb is set at 1 for the chrominance signal (Cb). Hence, reference-pixel linear-interpolation processing is performed with the chrominance signal (Cb). Otherwise, biIntFlagCb is set at 0, and reference-pixel linear-interpolation processing is not performed with the chrominance signal (Cb).

Similarly, the chrominance (Cr) linear-interpolation enable/disable judging unit 4304 receives the interpolation enable/disable information input from the input unit 4302, the block size input from the input unit 903, and the reference pixel value of the chrominance signal (Cr) in the neighbor of the block being decoded input from the memory 909. By using these pieces of information, the value of the chrominance (Cr) linear-interpolation processing flag biIntFlagCr is calculated.

The selector 913 selects an input target in accordance with the luminance linear-interpolation processing flag biIntFlag similarly to the selector 313 shown in FIG. 40. That is, if the luminance linear-interpolation processing flag biIntFlag is 1, the output of the linear-interpolation unit 911 is selected as an input target, and if 0, the filter unit 912 is selected as an input target. The selector 921 selects an input target in accordance with the chrominance (Cb) linear-interpolation processing flag biIntFlagCb similarly to the selector 921 shown in FIG. 37. That is, if the chrominance (Cb) linear-interpolation processing flag biIntFlagCb is 1, the output of the linear-interpolation unit 917 is selected as an input target, and if 0, the filter unit 919 is selected as an input target. The selector 922 selects an input target in accordance with the chrominance (Cr) linear-interpolation processing flag biIntFlagCr similarly to the selector 922 shown in FIG. 37. That is, if the chrominance (Cr) linear-interpolation processing flag biIntFlagCr is 1, the output of the linear-interpolation unit 918 is selected as an input target, and if 0, the filter unit 920 is selected as an input target.

The luminance-signal predicting unit 914 generates a prediction pixel value by using the intra-prediction mode intraPredMode of the luminance signal input from the input unit 901, the output of the selector 913, and the output of the memory 907. The output unit 915 outputs the generated prediction pixel value of the luminance signal to the pixel reproducing unit 809 in FIG. 8. The chrominance-signal (Cb) predicting unit 3703 receives the block size nT from the input unit 903, and an intra-prediction mode intraPredModeCb of the chrominance signal (Cb) from the input unit 3701. Further, the chrominance-signal (Cb) predicting unit 3703 receives the reference pixel with the reference-pixel correction processing of the chrominance signal (Cb) performed, from the selector 921, and the decoded reference pixel value of the chrominance signal (Cb) in the vicinity of the block being decoded, from the memory 908. The intra-prediction is performed in accordance with the intra-prediction mode intraPredModeCb, and the prediction pixel value of the chrominance signal (Cb) is output from the output unit 3705 to the pixel reproducing unit 809 in FIG. 8. The chrominance-signal (Cr) predicting unit 3704 receives the block size nT from the input unit 903, and an intra-prediction mode intraPredModeCr of the chrominance signal (Cr) from the input unit 3702. Further, the chrominance-signal (Cr) predicting unit 3704 receives the reference pixel with the reference-pixel correction processing of the chrominance signal (Cr) performed, from the selector 922, and the decoded reference pixel value of the chrominance signal (Cr) in the neighbor of the block being decoded, from the memory 909. The intra-prediction is performed in accordance with the intra-prediction mode intraPredModeCr, and the prediction pixel value of the chrominance signal (Cr) is output from the output unit 3706 to the pixel reproducing unit 809 in FIG. 8.

A flowchart of decoding processing in the image decoding device according to the twelfth embodiment is similar to FIG. 18 of the fourth embodiment. A different point is the content of processing of intra-prediction in step S1810. FIGS. 43A and 43B are a flowchart expressing a detailed operation of the intra-prediction processing. In the same figure, the same numerals are applied to blocks having the same functions as those in FIGS. 39A and 39B, and the description is omitted. In step S4301, the luminance linear-interpolation enable/disable judging unit 910 judges the interpolation enable/disable information of the block being decoded set in step S1801. If the interpolation enable/disable information is set at the enable state, the process advances to step S603, and if not, the process advances to step S607. In step S4302, the chrominance (Cb) linear-interpolation enable/disable judging unit 4303 judges the interpolation enable/disable information of the block being decoded set in step S1801. If the interpolation enable/disable information is set at the enable state, the process advances to step S3302, and if not, the process advances to step S3306. In step S4303, the chrominance (Cr) linear-interpolation enable/disable judging unit 4304 judges the interpolation enable/disable information of the block being decoded set in step S1801. If the interpolation enable/disable information is set at the enable state, the process advances to step S3312, and if not, the process advances to step S3316.

With the above-described configurations and operations, in the image decoding, the judgment on the enable/disable state can be collectively performed for the luminance signal and the respective chrominance signals. Accordingly, codes can be switched in accordance with the presence of the function of linear-interpolation at the decoding side. The judgment on whether the linear-interpolation is performed or not is made individually for each of the luminance signal and the respective chrominance signals. Accordingly, the linear-interpolation processing can be performed on a reference pixel every signal. That is, a noise can be appropriately reduced for a signal, which is likely affected by a noise like contouring in each signal.

In this embodiment, the interpolation enable/disable information is coded while being included in a sequence parameter set; however, it is not limited thereto. The interpolation enable/disable information may be included in a picture parameter set or coded data of a header, such as a slice header, may be decoded.

In FIGS. 43A and 43B, the processing of step S3901 and step S3902 is performed before step S3301; however, it is not limited thereto. The processing of step S3901 is only required to be performed before step S3303, and may be performed after step S3302. The processing of step S3902 is only required to be performed before step S3313, and may be performed after step S3312.

This embodiment is described that an image signal is 4:4:4. However, it is not limited thereto. For example, an image signal may be 4:2:0, or 4:2:2. And the three primary colors of RGB may be directly treated as Cr, Y, and Cb instead of the chrominance signal, like H.264. Furthermore, color space of input image signal is not limited there to. For example, color space of XYZ, L*a*b* or L*u*v* may also be used. Also, this embodiment is described that the maximum size of a divided block is 64×64 pixels, and the block size for performing the linear-interpolation processing is 32×32 pixels. However, it is not limited thereto. Also, the block is not limited to a square block, and may be a rectangular block.

Also, the luminance linear-interpolation processing flag biIntFlag and the respective chrominance linear-interpolation processing flags biIntFlagCb and biIntFlagCr are each a one-bit signal. However, it is not limited thereto. A multi-bit signal may be used, and a plurality of linear-interpolation units may be switched. Alternatively, a signal indicative of not performing interpolation may be used.

In this embodiment, the coded intra-prediction mode of the chrominance signal (Cb) and the coded intra-prediction mode of the chrominance signal (Cr) are separately decoded. However, it is not limited thereto. For example, the common intra-prediction mode of the chrominance signal may be used like the chrominance-signal predicting unit 923 in FIG. 31.

Thirteenth Embodiment

In the first to twelfth embodiments, the processing unit shown in FIGS. 1, 3, 7, 8, 9, 13, 17, 21, 24, 28, 31, 35, 37, 40, and 42 are each formed of hardware. However, processing that is performed by each of the processing units shown in these figures may be formed of a computer program.

FIG. 44 is a block diagram showing a configuration example of hardware of a computer that can be applied to any of the image coding devices and the image decoding devices according to the first to tenth embodiments (hereinafter, referred to as image processing apparatus).

A central processing unit (CPU) 4001 controls the entire computer by using computer programs and data stored in a random-access memory (RAM) 4002 and a read-only memory (ROM) 4003. Also, the CPU 4001 executes the above-described processing that is performed by any of image processing apparatuses according to the first to fifth embodiments. That is, the CPU 4001 functions as each of the processing units shown in FIGS. 1, 3, 7, 8, 9, 13, 17, 21, 24, 28, 31, 35, 37, 40, and 42.

The RAM 4002 has an area for temporarily storing computer programs and data loaded from an external storage 4006, and data such as data acquired from an external device through an interface (I/F) 4007. Further, the RAM 4002 has a work area that is used when the CPU 4001 executes various kinds of processing. That is, for example, the RAM 4002 can assign an area as a frame memory, or provide other areas appropriately.

The ROM 4003 stores setting data, a boot program, etc., of the computer.

An operation unit 4004 includes, for example, a keyboard and a mouse. The operation unit 4004 can input various kinds of instructions to the CPU 4001 when being operated by a user. An output unit 4005 displays a processing result by the CPU 4001. Also, the output unit 4005 is formed of, for example, a liquid crystal display.

The external storage 4006 is a mass information storage. The external storage 4006 stores an operating system (OS), and a computer program that allows the CPU 4001 to execute the functions of the respective units shown in FIGS. 1 and 6. Further, the external storage 4006 may store images as processing subjects.

The computer program and data stored in the external storage 4006 are loaded to the RAM 4002 in accordance with the control by the CPU 4001, and become processing subjects for the CPU 4001.

The OF 4007 can be connected with networks, such as a local-area network (LAN) and the Internet, and other devices, such as a projector and a display. The computer can acquire and send various pieces of information through the OF 4007.

A Bus 4008 connects the above-described respective units with each other.

Operation with the above-described configuration, which is described with the above-described flowcharts, is mainly controlled by the CPU 4001.

Also, the invention is implemented by executing the following processing. That is, the processing supplies software (program) that provides the functions of the above-described embodiments to a system or an apparatus through a network or any of various kinds of storage media, and allows a computer (or CPU, MPU, etc.) of the system or the apparatus to read and execute the software.

With the invention, a noise like contouring in a chrominance signal is reduced by performing reference-pixel linear-interpolation processing even on a chrominance signal. Also, particularly in a chrominance signal of 4:4:4, a noise like contouring is reduced. Further, since reference-pixel linear-interpolation processing of a luminance signal and reference-pixel linear-interpolation processing of a chrominance signal are performed in an associated manner, regions to be processed are matched with each other. Accordingly, noise feeling can be reduced. Also, if an RGB signal is used with 4:4:4, reference-pixel linear-interpolation processing can be performed with a color signal assigned to a chrominance signal regardless of a color signal assigned to a luminance signal. Further, the configuration may be applied to a rectangular block of a chrominance signal with 4:2:2.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-287786, filed Dec. 28, 2012 and No. 2013-213990 filed Oct. 11, 2013, which are hereby incorporated by reference herein in their entirety.

The invention claimed is:

1. An image decoding device configured to decode coded data, which is generated by coding pixel values of a block being decoded from pixels in the neighbor of the block being decoded, the device comprising:
a decoding unit configured to decode the coded data and reproduce a prediction errors;
a determining unit configured to determine whether or not correction processing is performed on a chrominance signal of decoded pixels in the neighbor of the block being decoded, the decoded pixels being reference pixels for intra prediction for the block being decoded, the correction processing including linear-interpolation processing using at least two of first, second, and third values, wherein the first value is a value of a pixel located in left of a bottom left end of the block being decoded, the second value is a value of a pixel located above left of a top left end of the block being decoded, the third value is a value of a pixel located above a top right end of the block being decoded, the first, second, and third values are not adjacent to each other, and the first, second, and third values are in the neighbor of the block being decoded;

a correction unit configured to perform the correction processing on the chrominance signal based on a result of the determination by the determining unit;

a predicting unit configured to predict, using the intra prediction, a chrominance signal of the block being decoded from the chrominance signal corrected by the correction unit using the correction processing or the chrominance signal of the decoded pixel in the neighbor without the correction processing; and a reproducing unit configured to reproduce pixel values of the block being decoded using a result of the prediction for the chrominance signal predicted by the predicting unit and the prediction errors reproduced by the decoding unit.

2. The image decoding device according to claim 1, further comprising a generating unit configured to generate chrominance correction information representing whether or not the correction processing is performed on the chrominance signal of decoded pixels in the neighbor of the block being decoded, wherein the correction unit performs the linear-interpolation processing or a different correction processing from the linear-interpolation processing on the chrominance signal, the chrominance correction information includes information according to a selected correction processing from the linear-interpolation processing and the different correction processing, in addition to information according to an enable/disable state of the correction processing, and the predicting unit predicts the chrominance signal of a pixel of the block being decoded from a chrominance signal corrected based on the information according to the selected correction processing.

3. The image decoding device according to claim 2, wherein the correction unit performs the correction processing on the chrominance signal based on the chrominance correction information and luminance correction information representing whether or not correction processing is performed on a luminance signal of decoded pixels in the neighbor of the block being decoded.

4. The image decoding device according to claim 3, wherein the correction unit performs the linear-interpolation processing on the chrominance signal in a case where the luminance correction information indicates that the linear-interpolation processing is performed on the luminance signal and the chrominance correction information indicates that the linear-interpolation processing is performed on the chrominance signal.

5. The image decoding device according to claim 3, wherein the correction unit performs the different correction processing on the chrominance signal in a case where the luminance correction information indicates that the different correction processing is performed on the luminance signal and the chrominance correction information indicates that the linear-interpolation processing is performed on the chrominance signal.

6. An image decoding method of decoding coded data, which is generated by coding pixel values of a block being decoded from pixels in the neighbor of the block being decoded, the method comprising:

a decoding step of decoding the coded data and reproducing prediction errors;

a determining step of determining whether or not correction processing is performed on a chrominance signal of decoded pixels in the neighbor of the block being decoded, the decoded pixels being reference pixels for intra prediction for the block being decoded, the correction processing including linear-interpolation processing using at least two of first, second, and third values, wherein the first value is a value of a pixel located in left of a bottom left end of the block being decoded, the second value is a value of a pixel located above left of a top left end of the block being decoded, the third value is a value of a pixel located above a top right end of the block being decoded, the first, second, and third values are not adjacent to each other, and the first, second, and third values are in the neighbor of the block being decoded;

a correction step of performing the correction processing on the chrominance signal based on a result of the determination step;

a predicting step of predicting, using the intra prediction, a chrominance signal of the block being decoded from the chrominance signal corrected by the correction step using the correction processing or the chrominance signal of the decoded pixel in the neighbor without the correction processing; and a reproducing step of reproducing pixel values of the block being decoded using a result of the prediction for the chrominance signal predicted by the predicting step and the prediction errors reproduced by the decoding step.

7. A non-transitory computer-readable medium storing a program configured to cause a computer to function as the image decoding device configured to decode coded data, which is generated by coding pixel values of a block being decoded from pixels in the neighbor of the block being decoded, the device comprising:

a decoding unit configured to decode the coded data and reproduce a prediction errors;

a determining unit configured to determine whether or not correction processing is performed on a chrominance signal of decoded pixels in the neighbor of the block being decoded, the decoded pixels being reference pixels for intra prediction for the block being decoded, the correction processing including linear-interpolation processing using at least two of first, second, and third values, wherein the first value is a value of a pixel located in left of a bottom left end of the block being decoded, the second value is a value of a pixel located above left of a top left end of the block being decoded, the third value is a value of a pixel located above a top right end of the block being decoded, the first, second, and third values are not adjacent to each other, and the first, second, and third values are in the neighbor of the block being decoded;

a correction unit configured to perform the correction processing on the chrominance signal based on a result of the determination by the determining unit;

a predicting unit configured to predict, using the intra prediction, a chrominance signal of the block being decoded from the chrominance signal corrected by the correction unit using the correction processing or the chrominance signal of the decoded pixel in the neighbor without the correction processing; and a reproducing unit configured to reproduce pixel values of the block being decoded sing a result of the prediction for the chrominance signal predicted by the predicting unit and the prediction errors reproduced by the decoding unit.

* * * * *